US009990349B2

(12) United States Patent
Campbell et al.

(10) Patent No.: US 9,990,349 B2
(45) Date of Patent: Jun. 5, 2018

(54) STREAMING DATA ASSOCIATED WITH CELLS IN SPREADSHEETS

(71) Applicant: Microsoft Technology Licensing, LLC, Redmond, WA (US)

(72) Inventors: John Campbell, Woodinville, WA (US); Carlos Augusto Otero, Seattle, WA (US); Christian Canton, Bellevue, WA (US); Matthew Hart Fichtner, Seattle, WA (US); Samuel C. Radakovitz, Bellevue, WA (US); Benjamin Edward Rampson, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days. days.

(21) Appl. No.: 15/281,885

(22) Filed: Sep. 30, 2016

(65) Prior Publication Data
US 2017/0124046 A1 May 4, 2017

Related U.S. Application Data

(60) Provisional application No. 62/249,884, filed on Nov. 2, 2015, provisional application No. 62/249,869, filed
(Continued)

(51) Int. Cl.
*G06F 17/00* (2006.01)
*G06F 17/24* (2006.01)
*G06F 17/21* (2006.01)
*H04N 5/272* (2006.01)
(Continued)

(52) U.S. Cl.
CPC ............ *G06F 17/246* (2013.01); *G06F 3/165* (2013.01); *G06F 17/212* (2013.01);
(Continued)

(58) Field of Classification Search
CPC .................................................... G06F 17/246
See application file for complete search history.

(56) References Cited

U.S. PATENT DOCUMENTS

| 5,717,939 A | 2/1998 | Bricklin et al. |
| 5,850,629 A | 12/1998 | Holm et al. |

(Continued)

FOREIGN PATENT DOCUMENTS

| CN | 101796829 | 8/2010 |
| CN | 102842323 | 12/2012 |

(Continued)

OTHER PUBLICATIONS

"Customizing Points", May 25, 2014, https://developers.google.com/chart/interactive/docs/points, 9 pages.
(Continued)

*Primary Examiner* — Laurie A Ries

(57) ABSTRACT

Systems for associating streaming data with cells of a spreadsheet are provided. Both dynamic data and static data may be associated with a single cell of the spreadsheet. Upon association, parameters (including stream attributes, image attributes and audio attributes) may be viewed and/or manipulated by a user, providing stream processing functionality within a spreadsheet. Controls may be provided for playing the streaming data and/or playing the streaming data in response to spreadsheet data satisfying a condition. Spreadsheet operations (e.g., sort and/or filter operations) may also be performed on a range of cells based on parameters of associated streaming data.

20 Claims, 29 Drawing Sheets

Related U.S. Application Data on Nov. 2, 2015, provisional application No. 62/357,363, filed on Jun. 30, 2016, provisional application No. 62/357,292, filed on Jun. 30, 2016, provisional application No. 62/357,284, filed on Jun. 30, 2016.

(51) Int. Cl.

| | | |
|---|---|---|
| *G06F 3/16* | (2006.01) | |
| *G06T 11/20* | (2006.01) | |
| *H04L 12/26* | (2006.01) | |
| *H04L 29/06* | (2006.01) | |
| *H04L 29/08* | (2006.01) | |
| *G11B 27/031* | (2006.01) | |
| *G06F 3/0484* | (2013.01) | |
| *G06F 3/0482* | (2013.01) | |

(52) U.S. Cl.
CPC .......... *G06T 11/206* (2013.01); *G11B 27/031* (2013.01); *H04L 43/045* (2013.01); *H04L 65/607* (2013.01); *H04L 65/608* (2013.01); *H04L 67/02* (2013.01); *H04L 67/42* (2013.01); *H04N 5/272* (2013.01); *G06F 3/0482* (2013.01); *G06F 3/04847* (2013.01)

(56) References Cited

U.S. PATENT DOCUMENTS

| | | | |
|---|---|---|---|
| 6,055,549 | A | 4/2000 | Takano |
| 6,262,736 | B1 | 7/2001 | Nelson |
| 6,289,312 | B1 | 9/2001 | Raman |
| 6,377,965 | B1 | 4/2002 | Hachamovitch et al. |
| 6,415,305 | B1 | 7/2002 | Agrawal et al. |
| 6,496,832 | B2 | 12/2002 | Chi et al. |
| 6,701,485 | B1 | 3/2004 | Igra et al. |
| 6,779,151 | B2 | 8/2004 | Cahill et al. |
| 6,785,660 | B1 | 8/2004 | Fedor et al. |
| 6,988,241 | B1 | 1/2006 | Guttman et al. |
| 7,047,484 | B1 | 5/2006 | Becker et al. |
| 7,350,141 | B2 | 3/2008 | Kotler et al. |
| 7,424,668 | B2 | 9/2008 | DeSpain |
| 7,594,172 | B2 | 9/2009 | Fish |
| 7,639,873 | B2 | 12/2009 | Qian |
| 7,647,551 | B2 | 1/2010 | Vigesaa et al. |
| 7,761,782 | B1 | 7/2010 | Warren et al. |
| 7,849,395 | B2 | 12/2010 | Ellis et al. |
| 7,853,867 | B2 | 12/2010 | Egilsson |
| 7,885,811 | B2 | 2/2011 | Zimmerman et al. |
| 7,962,436 | B2 | 6/2011 | Brelage et al. |
| 8,091,024 | B2 | 1/2012 | Graeber |
| 8,121,842 | B2 | 2/2012 | Shih et al. |
| 8,161,372 | B2 | 4/2012 | Ellis et al. |
| 8,166,385 | B2 | 4/2012 | Garcia-Molina et al. |
| 8,375,019 | B2* | 2/2013 | Salinas ............. G06F 17/30781 707/706 |
| 8,418,075 | B2* | 4/2013 | Gallo .................... G06F 3/0481 715/760 |
| 8,515,241 | B2 | 8/2013 | Forsyth et al. |
| 8,516,389 | B2 | 8/2013 | Fujimoto et al. |
| 8,527,866 | B2 | 9/2013 | Sutter et al. |
| 8,640,022 | B2 | 1/2014 | Waldman et al. |
| 8,645,832 | B2 | 2/2014 | Pea et al. |
| 8,788,928 | B2 | 7/2014 | McColl et al. |
| 8,862,646 | B1 | 10/2014 | Murayama et al. |
| 9,020,999 | B2 | 4/2015 | Rai Bhatti |
| 9,042,653 | B2 | 5/2015 | Lin et al. |
| 9,066,145 | B2 | 6/2015 | Kilar et al. |
| 9,098,484 | B2 | 8/2015 | Viry |
| 9,124,856 | B2 | 9/2015 | Deshpande et al. |
| 9,129,234 | B2 | 9/2015 | Campbell et al. |
| 9,141,938 | B2 | 9/2015 | Goldberg |
| 9,256,589 | B2 | 2/2016 | Chitilian et al. |
| 9,270,728 | B2 | 2/2016 | Duncker et al. |
| 9,280,533 | B2 | 3/2016 | Rochelle et al. |
| 2004/0246376 | A1 | 12/2004 | Sekiguchi et al. |
| 2005/0125401 | A1* | 6/2005 | Carr ....................... G06Q 30/02 |
| 2005/0246642 | A1 | 11/2005 | Valderas et al. |
| 2006/0012568 | A1* | 1/2006 | Halcrow ............... G06F 3/0421 345/157 |
| 2006/0072848 | A1 | 4/2006 | Razzano |
| 2006/0106618 | A1 | 5/2006 | Racovolis et al. |
| 2006/0179012 | A1 | 8/2006 | Jacobs |
| 2006/0212469 | A1 | 9/2006 | Babanov et al. |
| 2006/0270395 | A1* | 11/2006 | Dhawan ............. H04M 1/7253 455/418 |
| 2007/0124319 | A1 | 5/2007 | Platt et al. |
| 2007/0136652 | A1 | 6/2007 | Ellis et al. |
| 2008/0016436 | A1 | 1/2008 | Liu et al. |
| 2008/0156171 | A1 | 7/2008 | Guldi |
| 2008/0215959 | A1* | 9/2008 | Lection ................ G11B 27/034 715/201 |
| 2008/0235625 | A1 | 9/2008 | Holm et al. |
| 2008/0276159 | A1 | 11/2008 | Narayanaswami et al. |
| 2009/0006939 | A1 | 1/2009 | DeSpain et al. |
| 2009/0164880 | A1* | 6/2009 | Lection ................ G06F 3/0481 715/212 |
| 2010/0058163 | A1 | 3/2010 | Garcia-Molina et al. |
| 2010/0128855 | A1 | 5/2010 | Demo et al. |
| 2010/0211575 | A1* | 8/2010 | Collins ............. G06F 17/30044 707/749 |
| 2010/0214299 | A1 | 8/2010 | Robertson et al. |
| 2011/0035652 | A1 | 2/2011 | McGarry |
| 2011/0252299 | A1 | 10/2011 | Lloyd et al. |
| 2012/0013539 | A1 | 1/2012 | Hogan et al. |
| 2012/0013540 | A1 | 1/2012 | Hogan |
| 2012/0066574 | A1 | 3/2012 | Lee et al. |
| 2012/0069028 | A1 | 3/2012 | Bouguerra |
| 2012/0189203 | A1 | 7/2012 | Lin et al. |
| 2012/0313957 | A1 | 12/2012 | Fisher et al. |
| 2013/0016193 | A1* | 1/2013 | Nepveu ................ G02B 27/017 348/51 |
| 2013/0035075 | A1* | 2/2013 | Seetharaman ...... H04M 1/7255 455/413 |
| 2013/0151599 | A1* | 6/2013 | Santoro ................. G06F 3/0481 709/203 |
| 2014/0047312 | A1* | 2/2014 | Ruble ..................... G06T 15/10 715/212 |
| 2014/0104279 | A1 | 4/2014 | Albrecht |
| 2014/0122516 | A1 | 5/2014 | Brewer et al. |
| 2014/0164890 | A1 | 6/2014 | Fox et al. |
| 2014/0244668 | A1 | 8/2014 | Barrus et al. |
| 2014/0359417 | A1 | 12/2014 | Bar-On |
| 2014/0372850 | A1 | 12/2014 | Campbell et al. |
| 2014/0372857 | A1 | 12/2014 | Otero et al. |
| 2014/0372858 | A1 | 12/2014 | Campbell et al. |
| 2014/0372952 | A1 | 12/2014 | Otero et al. |
| 2015/0033131 | A1 | 1/2015 | Igor et al. |
| 2015/0050010 | A1 | 2/2015 | Lakhani et al. |
| 2015/0100880 | A1 | 4/2015 | Matas et al. |
| 2015/0161250 | A1 | 6/2015 | Elbaz |
| 2015/0378979 | A1* | 12/2015 | Hirzel ................... G06F 17/246 715/220 |
| 2017/0124047 | A1 | 5/2017 | Campbell et al. |
| 2017/0124048 | A1 | 5/2017 | Campbell et al. |
| 2017/0124049 | A1 | 5/2017 | Campbell et al. |
| 2017/0124050 | A1 | 5/2017 | Campbell et al. |
| 2017/0124741 | A1 | 5/2017 | Campbell et al. |
| 2017/0126772 | A1 | 5/2017 | Campbell et al. |

FOREIGN PATENT DOCUMENTS

| | | |
|---|---|---|
| KR | 20140146350 | 12/2014 |
| WO | 157744 | 8/2001 |
| WO | 2005050973 | 6/2005 |
| WO | 2017079056 | 5/2017 |

OTHER PUBLICATIONS

"Google Spreadsheets—Google Charts—Google Developments," May 8, 2015, 6 pages, http://web.archive.org/web/

(56) References Cited

OTHER PUBLICATIONS

20151008210800/https://google-developers.appspot.com/chart/interactive/docs/spreadsheets.

"How to add image as background into chart in Excel?" Jul. 2, 2012, https://www.extendoffice.com/documents/excel/1435-excel-add-image-background-to-chart.html, 10 pages.

"Use a Picture in a Chart", Apr. 22, 2016, https://support.office.com/en-ie/article/use-a-picture-in-a-chart-c53cf530-160b-4a3e-9b38-efe6cb858d10, 3 pages.

Chang, et al., "Creating interactive web data applications with spreadsheets", In Proceedings of the 27th annual ACM symposium on User interface software and technology, Oct. 5, 2014, pp. 87-96.

Lee, "Tips and Tricks: Images in cells", Nov. 30, 2010, https://drive.googleblog.com/2010/11/tips-and-tricks-images-in-cells.html, 6 pages.

PCT International Search Report in PCT/US2016/059389, dated Feb. 16, 2017, 16 pages.

PCT International Search Report in PCT/US2016/059947, dated Feb. 16, 2017, 17 pages.

PCT International Search Report in PCT/US2016/060025, dated Apr. 7, 2017, 23 pages.

Bakke et al., "A spreadsheet-based user interface for managing plural relationships in structured data", Human Factors in Computing Systems, May 7, 2011, 10 pages.

PCT Invitation to Pay Additional Fees in PCT/US2016/060180, dated Feb. 9, 2017, 8 pages.

Brian C. Whitmer, "Brigham Young University Improving Spreadsheets for Complex Problems", All These and Dissertations, Paper 1713, Apr. 8, 2008, http://scholarsarchive.byu.edu/cgi/viewcontent.cgI?artcile=2712&context=etd, pp. 1-7, 15-26.

PCT International Search Report and Written Opinion in PCT/US2016/060180, dated Jul. 12, 2017, 22 pages.

Han et al., "Situational data integration with data services and nested table", Service Oriented Computing and Applications, vol. 7, No. 2, Apr. 27, 2012, pp. 129-150.

5 Ways to Extract Video Frames and Save to Images, Published on: Apr. 7, 2016, https://www.raymond.cc/blog/extract-video-frames-to-images-using-vlc-media-player/, 12 pages.

An Introduction to Data Validation in Excel, Published on: Mar. 15, 2014, http://trumpexcel.com/2014/03/learn-all-about-data-validation-in-excel/, 4 pages.

Anchor image to a cell, Published on: Jan. 14, 2012, http://apache-poi.1045710.n5.nabble.com/Anchor-image-to-a-cell-td4302682.html, 14 pages.

Azzarello, Pat, "Group Report: Improving Computer Audio and Music Production Systems User Interfaces", In Proceedings of Tenth Annual Interactive Music Conference, Oct. 13, 2005, 12 pages.

Canton et al., "Compound Data Types", Oct. 2, 2015, 16 pages.

Canton et al., "Condensed Core Design", Jul. 30, 2015, 312 pages.

Canton et al., "Rich Data Types", Jul. 30, 2015, 217 pages.

Chang, et al., "A Spreadsheet Model for Handling Streaming Data", In Proceedings of the 33rd Annual ACM Conference on Human Factors in Computing Systems, Apr. 18, 2015, 4 pages.

Chang, et al., "A spreadsheet model for using web service data", In Proceedings of IEEE Symposium on Visual Languages and Human-Centric Computing, Jul. 28, 2014, 8 pages.

Chang, et al., "A Spreadsheet Tool for Creating Web Applications Using Online Data", In Proceedings of CHI Workshop on End User Development in the Internet of Things Era, vol. 12, Issue 2, Apr. 18, 2015, 6 pages.

Combine the contents of multiple cells, Retrieved on: Jan. 25, 2016, https://support.office.com/en-us/article/Combine-the-contents-of-multiple-cells-3A86C317-6B91-4F1D-8781-203320AEFDCE, 3 pages.

Create an Excel Drop Down list with Search Suggestions, Published on: Oct. 19, 2013, http://trumpexcel.com/2013/10/excel-drop-down-list-with-search-suggestions/, 11 pages.

Dalgleish, Debra, "Excel List of All MP3 Files in a Directory", Published on: May 5, 2009, http://blog.contextures.com/archives/2009/05/05/excel-list-of-all-mp3-files-in-a-directory/, 3 pages.

Deliver content using spreadsheet templates, Published on: Sep. 21, 2015, https://support.google.com/youtube/answer/6066171?hl=en, 3 pages.

Eastonz, Trevor, "Embed a Video in Microsoft Excel—It's a breeze", Published on: Jul. 18, 2013.

Embedded Metadata in WAVE Files, Retrieved on: Apr. 25, 2016, http://www.avpreserve.com/wp-content/uploads/2014/04/EmbeddedMetadata.pdf, 10 pages.

French, Ted, "Concatenate Text Data in Google Spreadsheets", Published on: Jun. 15, 2014, http://spreadsheets.about.com/od/exceltextfunctions/ss/2014-06-15-google-spreadsheets-concatenate-text-strings.htm#step1, 6 pages.

French, Ted, "Convert Measurements in Excel", Published on: Mar. 18, 2011, http://spreadsheets.about.com/od/exce12010functions/ss/2011-03-18-Convert-Measurements-In-Excel-2010.htm, 4 pages.

Hacid, et al., "A Database Approach for Modeling and Querying Video Data", In Proceedings of the 15th International Conference on Data Engineering, vol. 12, No. 5, Sep. 2000, 22 pages.

Harvey, Greg, "How to Edit and Format Inserted Pictures in Excel 2013", Published on: Jan. 2013, http://www.dummies.com/how-to/content/how-to-edit-and-format-inserted-pictures-in-excel-.html, 3 pages.

How To Concatenate Cells in Excel, Published on: Jul. 9, 2007, https://wagda.lib.washington.edu/gishelp/tutorial/concatenate.pdf, 6 pages.

How to insert multiple pictures and resize them at once in Excel?, Published on: Oct. 9, 2014, http://www.extendoffice.com/documents/excel/1156-excel-insert-multiple-pictures.html, 18 pages.

How to insert picture into excel cell, Published on: May 30, 2013, http://trumpexcel.com/2013/05/insert-picture-into-excel-cell/, 9 page.

How to resize pictures to fit cells in Excel?, Published on: Jan. 15, 2013, http://www.extendoffice.com/documents/excel/1060-excel-resize-picture-to-fit-cell.html, 11 pages.

How to: Use Text-to-Speech in Excel 2002, Retrieved on: Jul. 7, 2016, https://support.microsoft.com/en-us/kb/288986, 4 pages.

Høydahl, Jan, "Cominvent AS—Enterprise Search Consultants", Published on: Jan. 25, 2012, http://www.cominvent.com/2012/01/25/super-flexible-autocomplete-with-solr/, 4 pages.

In-Cell Dropdown and Validation in Spreadsheets, Published on: Aug. 26, 2010, http://googledrive.blogspot.in/2010/08/in-cell-dropdown-and-validation-in.html, 27 pages.

Insert Images into Google Spreadsheet Cells, Published on: Apr. 15, 2016, https://www.bettercloud.com/monitor/the-academy/insert-images-into-google-spreadsheet-cells/, 3 pages.

Javaid, Usman, "Excel 2010: Merge Cells (Concatenation)", Published on: Mar. 25, 2010, http://www.addictivetips.com/microsoft-office/exce1-2010-merge-cells-concatenation/, 19 pages.

Keng, Kuek Ser Kuang, "Edit video using spreadsheet—GS Video", Published on: Dec. 24, 2015, https://www.youtube.com/watch?v=-bwFdhJg1MA, 2 pages.

Klement, Scott, "Load Images into Your HSSF Spreadsheets", Published on: Dec. 11, 2008, http://www.easy400.net/hssfcgi/documentation/20081211.html, 9 pages.

Levoy, Marc, "Spreadsheets for Images", In Proceedings of 21st International ACM Conference on Computer Graphics and Interactive Techniques, Jul. 24, 1994, 8 pages.

Lim, Jon, "Google Spreadsheets: COUNT with Multiple Values in Cells", Published on: Apr. 7, 2014, http://jonlim.ca/2014/04/google-spreadsheets-count-multiple-values-cells/, 5 pages.

Machlis, Sharon, "How to create an automatically updating Google spreadsheet", Published on: Dec. 8, 2013, http://www.computerworld.com/article/2469616/business-intelligence/business-intelligence-79661-how-to-create-an-automatically-updating-spreadsheet.html, 2 pages.

Powerful transcription that's ready for work, Published on: Dec. 17, 2015, http://australia.nuance.com/dragon/transcription-solutions/index.htm, 5 pages.

(56) References Cited

OTHER PUBLICATIONS

Puls, Ken, "Using Vlookup to return a picture", Published on: Feb. 7, 2014, http://www.cga-pdnet.org/pdf/vlookupforpictures.pdf, 7 pages.
Reynolds, Janine, "New in Smartsheet: See Images in Your Sheets", Published on: Jan. 15, 2016, https://www.smartsheet.com/blog/new-in-smartsheet-embed-images, 16 pages.
Rivendell—Scenario: breakaway from normal progaming to playout audiobook chapters, for a length of time and rejoing normal programming. And how to load and playout the audiobook discs/tracks in order, published on: Apr. 3, 2016, https://thebrettblog.wordpress.com/, 31 pages.
Sartain, JD., "How to create relational databases in Excel 2013", Published on: Aug. 7, 2014, http://www.pcworld.com/article/2462281/how-to-create-relational-databases-in-excel-2013.html, 11 pages.
Singh, et al., "Transforming Spreadsheet Data Types using Examples", In Proceedings of Annual Symposium on Principles of Programming Languages, Oct. 26, 2015, 13 pages.
Trevi, Javier, "Showing all available MySQL data types when creating a new table with MySQL for Excel", Published on: Jul. 23, 2014, https://blogs.oracle.com/MySqlOnWindows/entry/showing_all_available_mysql_data, 8 pages.
Trying to open audio files from spreadsheet using windows API, Retrieved on: Apr. 25, 2016, http://stackoverflow.com/questions/34459965/trying-to-open-audio-files-from-spreadsheet-using-windows-api, 3 pages.
Use Formula AutoComplete, Retrieved on: Oct. 26, 2015, https://support.office.com/en-us/article/Use-Formula-AutoComplete-6d13daa5-e003-4431-abab-9edef51fae6b, 4 pages.
Vaziri, et al., "Stream Processing with a Spreadsheet", In Proceedings of European Conference on Object-Oriented Programming, Jul. 28, 2014, 25 pages.
Virostek, Paul, "The Power User's Guide to Soundminer Metadata", Published on: Jun. 24, 2014, http://www.creativefieldrecording.com/2014/06/24/the-power-users-guide-to-soundminer-metadata/, 12 pages.
Wyatt, Allen, "Conditionally Playing an Audio File", Published on: Oct. 10, 2011 http://excel.tips.net/T006559_Conditionally_Playing_an_Audio_File.html, 2 pages.
Wyatt, Allen, "Displaying Images based on a Result", Published on: Apr. 10, 2011, http://excel.tips.net/T003128_Displaying_Images_based_on_a_Result.html, 10 pages.
Wyatt, Allen, "Displaying Images based on a Result", Published on: Oct. 28, 2011, http://excel.tips.net/T003128_Displaying_Images_based_on_a_Result.html, 9 pages.
Wyatt, Allen, "Hiding Graphics when Filtering", Retrieved on: Jul. 8, 2016, http://excel.tips.net/T003866_Hiding_Graphics_when_Filtering.html, 2 pages.
Wyatt, Allen, "Inserting a Sound File in Your Worksheet", Published on: Apr. 10, 2011, http://excel.tips.net/T002864_Inserting_a_Sound_File_in_Your Worksheet.html, 2 pages.
Wyatt, Allen, "Inserting a Voice Annotation in Your Worksheet", Published on: Oct. 19, 2011, http://excel.tips.net/T002870_Inserting_a_Voice_Annotation_in_Your Worksheet.html, 2 pages.
Wyatt, Allen, "Sorting with Graphics", Published on: Oct. 28, 2011, http://excel.tips.net/T002954_Sorting_with_Graphics.html, 2 pages.
U.S. Appl. No. 15/282,114, Office Action dated Oct. 19, 2017, 19 pages.
PCT Second Written Opinion in PCT/US2016/059389, dated Sep. 13, 2017, 11 pages.
U.S. Appl. No. 15/282,269, Office Action dated Sep. 19, 2017, 17 pages.
"International Search Report and Written Opinion Issued in PCT Application No. PCT/US2017/039609", dated Oct. 13, 2017, 15 Pages.
PCT International Search Report and Written Opinion in PCT/U2017/053854, dated Dec. 14, 2017, 17 pages.
U.S. Appl. No. 15/282,269, Notice of Allowance dated Jan. 31, 2018, 10 pages.
PCT International Preliminary Report on Patentability in PCT/US2016/059389, dated Feb. 12, 2018, 12 pages.
U.S. Appl. No. 15/282,114, Amendment and Response dated Feb. 20, 2018, 25 pages.

* cited by examiner

FIG. 12B

STREAMING DATA ASSOCIATED WITH CELLS IN SPREADSHEETS

RELATED APPLICATIONS

This application claims priority to U.S. Provisional Application No. 62/249,884, entitled "Compound Data Types," filed on Nov. 2, 2015; U.S. Provisional Application No. 62/249,869, entitled "Rich Data Types," filed Nov. 2, 2015; U.S. Provisional Application No. 62/357,363, entitled "Dynamic Data Associated with Cells in Spreadsheets," filed Jun. 30, 2016; U.S. Provisional Application No. 62/357,292, entitled "Compound Data Objects," filed on Jun. 30, 2016; and U.S. Provisional Application No. 62/357,284, entitled "Rich Data Types," filed on Jun. 30, 2016; the entire disclosures of which are hereby incorporated in their entireties herein by reference.

BACKGROUND

Today, there is no notion of making streaming data a native part of a spreadsheet. More importantly, properties of streaming data cannot currently be accessed or operated on by a spreadsheet application. Accordingly, spreadsheets cannot analyze streaming data, retrieve real-time data from live feeds, play streaming data in response to business logic, or otherwise integrate stream processing or recognition into the spreadsheet logic. Additionally, current spreadsheets are ill-suited for providing new features in a touch- or mobile-first world where streaming data is increasing viewed and recorded.

It is with respect to these and other general considerations that embodiments have been described. Also, although relatively specific problems have been discussed, it should be understood that the embodiments should not be limited to solving the specific problems identified in the background.

SUMMARY

The disclosure generally relates to a system and methods for associated dynamic data with one or more cells of a spreadsheet. In aspects, when dynamic data is associated with one or more cells, the dynamic data may be treated as a value in the one or more cells. In further aspects, dynamic data may be defined and/or constructed as a complex or "rich" type of data with some or all of the following characteristics: a name, a media-type (e.g., video, video stream, internet sensor stream, etc.), metadata (e.g., codec, length, resolution, etc.), an audio track (mono/stereo with metadata), a subtitle track (e.g., with supported languages), a label (e.g., for storing the dynamic data's connection to its source), and the like. As used herein, a "rich data type" is defined as a type of data that has established relationships to other types of data. In further examples, rules may define how to display the object in the spreadsheet and what happens when the object is rendered on a card, e.g., display frame #xx when loaded; in some cases, these rules may be customizable.

Dynamic data may comprise any type of "moving" or "changing" data, including moving images, real-time data feeds, etc. For instance, dynamic data may include videos, with or without audio tracks, accessed locally or via links to remote storage; additionally, dynamic data may include streaming data, streaming audio, or streaming videos accessed over a communications channel. In aspects, dynamic data may be associated with one or more cells of a spreadsheet. Streaming data may refer to any real-time data feed, including Twitter® feeds, stock price feeds (or tickers), news feeds (or tickers), and the like. In aspects, streaming video may refer to moving images, with or without an audio track, which are transmitted over a network or via a directly connected device. Streaming audio may refer to music, podcasts, or other types of audio that may be transmitted over a network and/or by a directly connected device. A video file may be embedded in a cell of a spreadsheet or otherwise stored in a local cache associated with a spreadsheet and/or may be accessed from a file location in memory, either locally or remotely. Video files may encode data for rendering moving images, with or without an audio track.

Streaming data may be provided over a network and/or from directly connected devices, such as a wearable device to a mobile phone over a wired, wireless, Bluetooth, or other connection. In some cases, multiple streaming sources may be communicating substantially simultaneously, e.g., "Internet of Things" type devices such as building sensors, appliances, etc., may each broadcast data streams. In further cases, the streaming data may be read and/or may trigger actions based on functions returning to the devices, such as "turn-off." As another example, a camera may be capturing video live and may have a connection that allows communication back to the camera. In this case, upon some detected event in the stream, an action may be sent to trigger an action, e.g., such as "pause" or "turn off" the camera. The logic for watching and analyzing the stream for triggering actions may be bundled into a user defined function (UDF) that is attached to a cell containing the streaming data "object," in this case, a video stream transmitted by the camera. As a further example, logic in the spreadsheet can be triggered when conditions in a stream are met, e.g., when a particular individual is identified in streaming video (such as CCTV footage), add one to a counter in cell B2.

In some aspects, dynamic data may be displayed with additional data (e.g., static data or other dynamic data) within a single cell of the spreadsheet. In some aspects, compound data types may include dynamic data and additional data and may be associated with a single cell of a spreadsheet. For instance, dynamic data (e.g., stock ticker data for real-time stock prices) for a company may be displayed in the same cell with static data (e.g., alphanumeric data or a visual representation such as an image) designating the company. Alternatively, a video clip of a movie (e.g., dynamic data) may be displayed in the same cell with reviews for the movie (e.g., static data) and/or live Twitter® feeds relating to the movie (e.g., dynamic data). In aspects, associated dynamic data (e.g., videos, data feeds, etc.) may be embedded within a cell or a range of cells, may be anchored to a cell or a range of cells, may be referenced within a cell but allowed to float over the grid, may be referenced within a cell but not displayed in the spreadsheet until a condition is satisfied, etc.

Upon associating a video with a spreadsheet, various video parameters (e.g., video attributes, image attributes, audio attributes, etc.) may be surfaced for viewing and/or manipulation by a user. For instance, by exposing operations for adjusting image and/or audio attributes, video processing functionality may be provided. Additionally, user interface (UI) controls may be provided for playing dynamic data within a cell (e.g., playing a video, playing a stock ticker, etc.), as well as logic for playing the dynamic data when certain conditions in spreadsheet data are met (e.g., play video clip for "Top Guns" movie when revenue numbers hit threshold level) and/or triggering logic in the spreadsheet when conditions in the dynamic data are met. Spreadsheet operations (e.g., sort and/or filter operations) may also be performed on a range of cells based on data attributes, video attributes, image attributes and/or audio attributes of associated dynamic data.

In an aspect, a system is provided. The system includes a processing unit and a memory storing computer executable instructions that, when executed by the processing unit, cause the system to perform a method. The method includes receiving streaming data and associating the streaming data with at least one cell of a spreadsheet. The method further includes dynamically displaying the streaming data in the at least one cell and, in response to associating the streaming data with the at least one cell, retrieving one or more parameters for the streaming data.

In another aspect, a method for associating streaming data with a cell of a spreadsheet is provided. The method includes providing a user interface for associating streaming data with the cell of the spreadsheet and receiving streaming data. The method further includes associating the streaming data with the cell and dynamically displaying the streaming data in the cell.

In yet another aspect, a computer-readable storage medium is provided. The computer-readable storage medium stores computer executable instructions that, when executed by a processing unit, cause a computing device to receive streaming data for association with a cell of a spreadsheet and receive additional data for association with the cell of the spreadsheet. The computer executable instructions further causing the computing device to create a compound data type including the streaming data and the additional data and associate the compound data type with the cell. The computer executable instructions further causing the computing device to display the streaming data and at least a portion of the additional data within the cell.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 12B illustrates an interface showing one or more video files and additional data associated with one or more cells of a spreadsheet, according to a second example embodiment.

DETAILED DESCRIPTION

Figure 1:
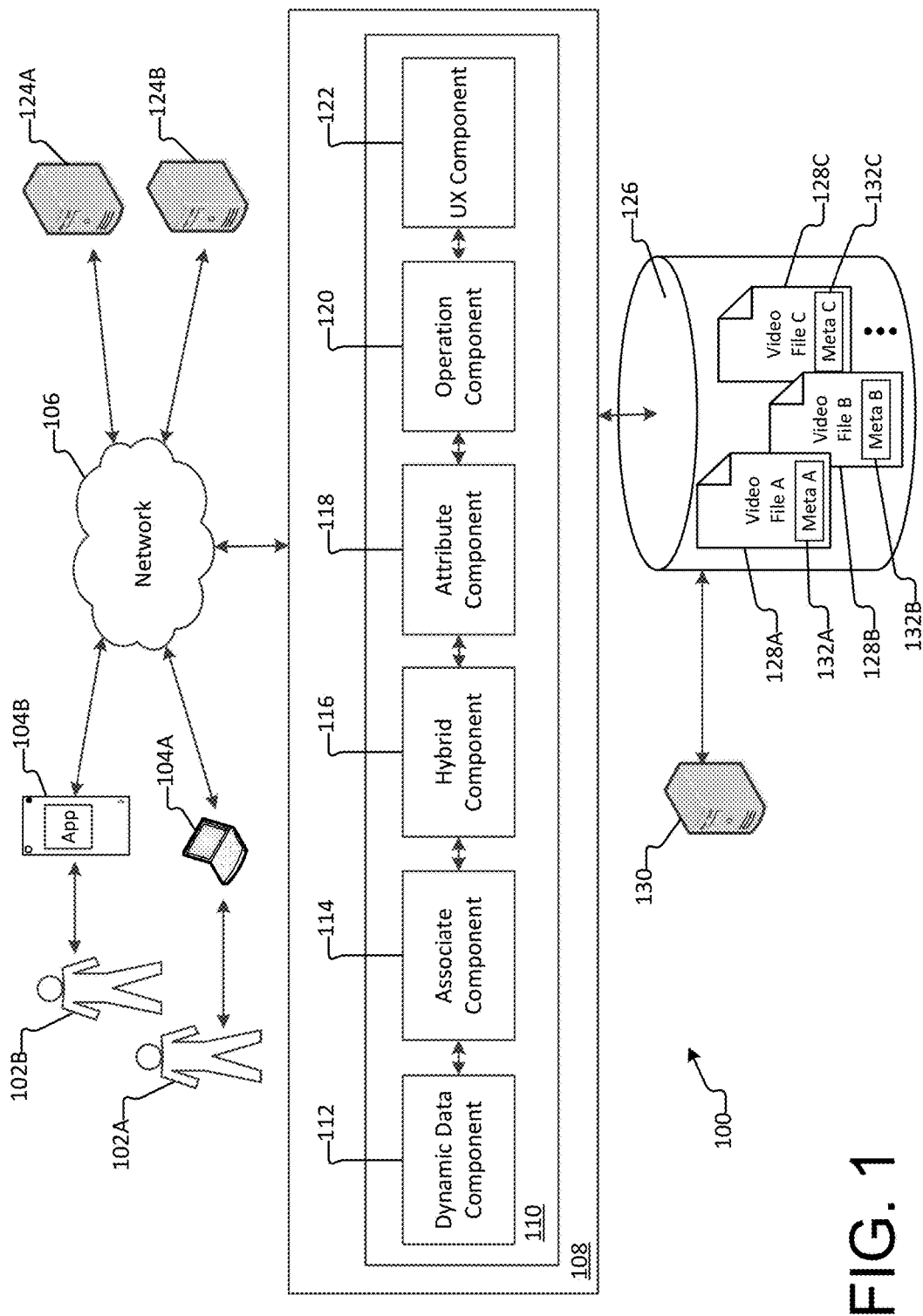
FIG. 1 illustrates a system for associating dynamic data with one or more cells in a spreadsheet, according to an example embodiment.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As described above, the disclosure generally relates to a system and methods for associated dynamic data with one or more cells of a spreadsheet. Dynamic data may comprise any type of "moving" or "changing" data, including moving images, real-time data feeds, etc. This type of data often includes a "time/date" component and a sample rate (e.g., how often the data is captured) and whether it is live or 'locked/paused' and requiring refresh. Moreover, dynamic data can be attached to another object to describe an activity and/or action. For example, you might have a "van" object that is part of a fleet of vehicles. Attaching a location data stream allows you to understand its movement. Additional processing of that data tells you if the vehicle stopped, how long the vehicle stopped, where the vehicle stopped and what time the vehicle (re)commenced moving.

In aspects, links to streaming data, streaming audio or streaming videos, as well as video files, may be associated with one or more cells of a spreadsheet. Streaming data may refer to any real-time data feed, including Twitter® feeds, stock price feeds (or tickers), news feeds (or tickers), and the like. In aspects, a streaming video may refer to moving images, with or without an audio track, that are transmitted over a network. Streaming audio may refer to music, podcasts, or other types of audio that may be transmitted over a network. A video file may be accessed from a file location and may encode data for rendering moving images, with or without an audio track. In aspects, a streaming video refers to moving images transmitted over a network based on a video file stored in a remote location.

In some aspects, dynamic data may be displayed with static data within a single cell of a spreadsheet. For instance, dynamic data (e.g., ticker data for real-time stock prices for a company) may be displayed in the same cell with static data (e.g., alphanumeric data or a visual representation designating the company). Similarly, a video clip of a movie (e.g., dynamic data) may be displayed in the same cell with reviews for the movie (e.g., static data) and/or live Twitter® feeds relating to the movie (e.g., dynamic data). In some cases, data feeds may be combined within a cell. For instance, a service may return values such as names of people, when they are smiling etc., as additional data that can be timestamped and appended to a video. Additionally, a live feed of stock prices can be appended during an earnings report and overlaid as a chart onto the video to show the immediate effect of the results on stock price.

In aspects, dynamic data (e.g., videos, data feeds, etc.) may be embedded within a cell or a range of cells, anchored to a cell or a range of cells, referenced within a cell but allowed to float over the grid, referenced within a cell but not displayed in the spreadsheet until a condition is satisfied, etc. Upon associating a video with a spreadsheet, various video parameters (e.g., video attributes, image attributes, audio attributes, etc.) may be surfaced for viewing and/or manipulation by a user. For instance, by exposing operations for adjusting video, image and/or audio attributes, video processing functionality may be provided. Additionally, user interface (UI) controls may be provided for playing dynamic data within a cell (e.g., playing a video, streaming a stock ticker, streaming music, etc.), as well as logic for playing the dynamic data when certain conditions in spreadsheet data are met (e.g., play video clip for "Top Guns" movie when revenue numbers hit threshold level). Spreadsheet operations (e.g., sort and/or filter operations) may also be performed on a range of cells based on data attributes, video attributes, image attributes and/or audio attributes of associated dynamic data.

It is with respect to these and other general considerations that embodiments have been made.

FIG. 1 illustrates a system for associating dynamic data with one or more cells in a spreadsheet, according to an example embodiment.

System 100 may include one or more client computing devices 104 (e.g., client computing devices 104A and 104B) that may execute a client version of a spreadsheet application capable of associating dynamic data with cells in a spreadsheet. In some examples, the client spreadsheet application may execute locally on a client computing device 104. In other examples, a client spreadsheet application (e.g., a mobile app on a thin client computing device 104) may operate in communication (e.g., via network 106) with a corresponding server version of spreadsheet application 110 executing on one or more server computing devices, e.g., server computing device 108. In still other aspects, rather than executing a client version of a spreadsheet application, the one or more client computing devices 104 may remotely access, e.g., via a browser over network 106, the spreadsheet application 110 implemented on the server computing device 108 or multiple server computing devices (e.g., in a distributed computing environment such as a cloud computing environment).

As illustrated by FIG. 1, a server version of spreadsheet application 110 is implemented by server computing device 108. As should be appreciated, the server version of spreadsheet application 110 may also be implemented in a distributed environment (e.g., cloud computing environment) across a plurality of server computing devices (not shown). Moreover, as should be appreciated, either a client or a server version of the spreadsheet application 110 may be capable of associating dynamic data with cells of a spreadsheet. While a server version of the spreadsheet application 110 and associated components 112-122 are shown and described, this should not be understood as limiting. Rather, a client version of spreadsheet application 110 may similarly implement components 112-122 on a client computing device 104.

In a basic configuration, the one or more client computing devices 104 are personal or handheld computers having both input elements and output elements operated by one or more users 102 (e.g., user 102A and user 102B). For example, the one or more client computing devices 104 may include one or more of: a mobile telephone; a smart phone; a tablet; a phablet; a smart watch; a wearable computer; a personal computer; a desktop computer; a laptop computer; a gaming device/computer (e.g., Xbox®); a television; and the like. This list is exemplary only and should not be considered as limiting. Any suitable client computing device for executing a client spreadsheet application and/or remotely accessing spreadsheet application 110 may be utilized.

In some aspects, network 106 is a computer network such as an enterprise intranet and/or the Internet. In this regard, the network 106 may include a Local Area Network (LAN), a Wide Area Network (WAN), the Internet, wireless and wired transmission mediums. In further aspects, server computing device 108 may communicate with some components of the system via a local network (e.g., an enterprise intranet), whereas server computing device 108 may communicate with other components of the system via a wide area network (e.g., the Internet). In addition, the aspects and functionalities described herein may operate over distributed systems (e.g., cloud computing systems), where application functionality, memory, data storage and retrieval, and various processing functions may be operated remotely from each other over a distributed computing network, such as the Internet or an intranet.

As described above, the spreadsheet application 110 may be implemented on a server computing device 108. In a basic configuration, server computing device 108 may include at least a processing unit and a system memory for executing computer-readable instructions. In some aspects, server computing device 108 may comprise one or more server computing devices 108 in a distributed environment (e.g., cloud computing environment). Server computing device 108 may provide data, including dynamic data (and associated data attributes, image attributes, video attributes and/or audio attributes) associated with cells of a spreadsheet to and from the one or more client computing devices 104 and/or one or more other server computing devices (e.g., server computing devices 124A and/or 124B) via network 106.

The spreadsheet application 110 may include various components for associating dynamic data with one or more cells of a spreadsheet, including a dynamic data component 112, an associate component 114, a hybrid component 116, an attribute component 118, an operation component 120, a UX component 122, and the like. In aspects, each component may communicate and pass data between the other components. The various components may be implemented using hardware, software, or a combination of hardware and software. Moreover, the various components may be executed on a single server computing device (e.g., server computing device 108), on multiple server computing devices (e.g., server computing devices 124A, 124B and/or 130), or locally on a client computing device (e.g., client computing device 102A or 102B).

In aspects, dynamic data component 112 may identify dynamic data for association with one or more cells of a spreadsheet. As described above, dynamic data may comprise any type of "moving" or "changing" data, including images, live data feeds, streaming audio, streaming video, etc. For example, streaming data may refer to any live data feed, including Twitter® feeds, stock-price feeds (or tickers), news feeds (or tickers), and the like. In aspects, a video may refer to moving images, with or without an audio track, and a video file may encode data for rendering the moving images and playing the audio track, if included. In aspects, a streaming video refers to transmitting moving images over a network from a video file stored in a remote location. The term "moving images" generally refers to an array of images (e.g., individual frames) that are shot in sequence over a time period (e.g., capture rate) and are then spliced together and "played" (or displayed) consecutively at a certain rate (e.g., frame rate). However, in aspects, any array of images (whether related or not) may be spliced together and played at a frame rate to create a video (or a slideshow). An audio track refers to any type of audio, e.g., speech, music, sounds, or any combination thereof, that is associated with a video, whether synchronized with individual frames or not. In some cases, an audio track may be recorded with a video (e.g., on a mobile device, video recorder, movie camera, etc.). In other aspects, an audio track may be added to a video at a later time and may be synchronized with individual frames of the video, or not. Streaming audio may refer to playing an audio file that is transmitted over a network (e.g., hosted by third parties such as Pandora®, Spotify®, etc.). Streaming audio may be associated with streaming video (e.g., an audio track) or may be independent (e.g., streamed music, podcasts, sportscasts, newscasts, etc.).

As noted above, streaming data may refer to any live data feed, which may be streamed over a network, but also streamed from directly connected devices, e.g., a wearable device connected to a mobile device. In aspects, a user may be carrying both devices during a stream and the connection may be wired, wireless, or even Bluetooth, etc. In fact, multiple streaming sources may be communicating simultaneously. For instance, "Internet of Things" type items such as building sensors may all individually be broadcasting data streams. In some cases, the data streams may be merely read, but in other cases actions may be triggered based on the calculations that are returned to these items, e.g., "turn-off" For instance, if a camera is capturing live video, and its connection allows communication back to the device, an action may be sent to pause or turn off the camera. This may be done by monitoring data from the camera and upon some detected event in the stream, triggering an action. The logic for watching and analyzing, and then triggering actions, may be bundled into a UDF and attached to the cell containing the video stream "object."

In addition to the streaming data, data attributes may describe the streaming data. For instance, streaming data may be transmitted based on a protocol in a format at a packet rate, and may include a packet size. In some cases, data attributes may be described by attribute-value pairs and/or attribute-type pairs. For instance, for attribute "protocol" a type may be "TCP/IP"; for attribute "packet size" a value may be "64K"; and the like. In other cases, data associated with streaming data may not be represented as name/value pairs but may simply represent "data," e.g., an array of pixel data. In still other cases, these types of properties may be considered distinct 'rich types' of data, which means you may be permitted to convert the value to some other value. For example, in the case of "data rate" the user may be offered an interaction to down-convert to a lower rate, e.g., 1 Mb/s to 0.5 Mb/s. This conversion may require a reduction in resolution, framerate, or some other property of the video. In the case of video resolution, you may start with 4 k and the act of changing to 1024×768 may trigger a resample of the video. The logic to do this type of conversion may be bundled up via a UDF. The result may be different if the video is locally stored versus streamed from another location. In some aspects, the value changes to resolution, size, etc., may be written back to the source, or may be a property of a 'display format' that is applied when the video is played back on the client side. As should be appreciated, the above examples of data attributes and other data are offered as examples only. The data associated with streaming data may be organized and stored in any suitable data structure, e.g., a table, array, vector, etc.

Streaming audio may include digitally encoded (or modulated) signals representative of sound waves, where the audio data is in a machine-readable format for storing and/or transmitting an audio file. As detailed above, streaming audio may be called using a URL to a storage location hosted by a third party (e.g., Pandora®, Spotify®, etc.). Streaming audio is often provided as a number of consecutive tracks (or songs) which are transmitted continuously until a user "stops" the streaming audio. Alternatively, streaming audio may comprise a single track (e.g., a podcast) that plays until the end of the track and automatically stops. As should be appreciated, each track of streamed audio may be associated with track attributes, such as a title, artist, narrator, duration, creation date, etc. In some aspects, audio data associated with streaming audio may be described in terms of sound wave attributes (e.g., frequency, amplitude, etc.), the sample rate at which the audio data was captured, and/or the codec (compressor/decompressor) used to compress the audio data. Additionally, audio attributes may describe specifications or settings associated with the audio data (e.g., bitrate, volume, pitch, speed, channel, audio effects, etc.). In aspects, audio attributes describe the audio data and/or audio file in a human-readable format.

As noted above, a video is an array of images (e.g., individual frames), with or without an audio track. Accordingly, a video file may include video data (e.g., an array of pixel values for rendering each individual frame of a video and/or modulated data for reproducing soundwaves of an audio track). A video file may further include video attributes (e.g., frame rate, aspect ratio, duration, resolution, bits per frame, video size, synchronization data, etc.), individual frame attributes (e.g., aspect ratio, color space, bitrate, etc.) and/or audio attributes (e.g., pitch, volume, speed, etc.). Moreover, a video file may be stored in local or remote storage (e.g., movies associated with an iTunes® account) or may be streamed by a third party service over a network (e.g., streaming videos hosted by YouTube®, Netflix®, etc.). Videos may be professionally compiled (e.g., blockbuster movies, television shows, documentaries, etc.) or may be recorded by amateur individuals (e.g., via a mobile device, video recorder, and the like).

As detailed above, a video file may include image data and image attributes for an array of individual frames making up the video. Image data may include an array of pixel values encoding, for instance, RGB, RGBA or YUV color space information, which is data in a machine-readable format for rendering the combination of colors, luminance, chrominance and/or opacity for each portion or tile of an image. In some aspects, the number of pixels may be represented dimensionally, e.g., "3552×2000" pixels. Image attributes may describe the image data by specifying a quantity (e.g., opacity value, luminance or brightness value, etc.) or a quality (e.g., high-red color palate, high opacity, low luminance, etc.) of the image data. Other image attributes may describe image specifications, such as image size, image aspect ratio, image resolution, etc. Still further image attributes may provide details regarding the image file, such as creation date/time, author, etc. As should be appreciated, each image attribute may be defined by an attribute-value pair. That is, an image attribute (e.g., image height) may be paired with a value for that attribute (e.g., 1.04 inches) for a particular image.

Additionally, a video file may include audio data and audio attributes for an audio track associated with the video. Similarly, streaming audio may include audio data and audio attributes. For instance, audio data may digitally encode soundwaves (e.g., by pulse-code modulation), which may be processed (e.g., filtered, edited, etc.) and/or compressed (e.g., based on a codec to reduce file size). An audio track may be recorded in any suitable manner, either at the time of recording the array of individual frames or at a later time. For example, a microphone may record (or capture) soundwaves (e.g., of a conversation, music, etc.) and may convert the soundwaves into an analog electric signal. An analog-to-digital converter (ADC) may then convert the analog signal into a digital signal, e.g., using pulse-code modulation. The digital signal may be processed and/or compressed and stored in a file format (e.g., audio data), as detailed above. Later, when an audio file is played, the digital signal may be converted back to an analog electrical signal using a digital-to-audio converter (DAC) for transmission to a speaker. In addition to audio data, audio attributes may be included in the video file, streaming video or streaming audio. Audio attributes may describe the audio data (e.g., frequency, amplitude, sampling rate, codec, etc.), audio specifications (e.g., bitrate, volume, pitch, speed, channel, audio effects, etc.) and/or the audio file (e.g., author, creation date and/or time, file name, file size, duration, etc.). As should be appreciated, each audio attribute may be defined by an attribute-value pair. That is, an audio attribute (e.g., duration) may be paired with a value for that attribute (e.g., 1:05 minutes) for a particular audio file.

In at least some examples, video attributes (including image attributes and audio attributes) may be organized in a data structure (e.g., a table, array of values, array of records, etc.), e.g., based on attribute-value pairs and/or attribute-type pairs or otherwise as data (e.g., an array of pixel data). For example, for attribute "frame rate" a value may be "24 frames-per-second (fps or p)" or "25 fps" or "29.97 fps," etc.; for attribute "duration" a value may be "02:45:12 hours" or "05:80 minutes," etc.; for attribute "resolution" a value may be "720" or "1080" or "1440" or "2160," etc., and a type may be "p" (progressive-scan) or "i" (interlaced), etc.; for attribute "bits per frame" a value may be "7.37 megabits (Mbits), etc.; for attribute "video size" a value may be "82.8 gigabytes (Gbytes)" or "34.4 Gbytes," etc.; for attribute "bitrate" a value may be "96 kilobits per second (Kbps)" or "400 Kbps" or "1500 Kbps," etc., and a type may be "variable bitrate, VBR" or "constant bitrate, CBR"; for attribute "sampling rate" a value may be "44.1 kHz" or "48 kHz," etc.; for attribute "channel" a type may be "stereo" or "mono" and a value may be "channel 1" or "channel 2" or "channel 3," etc.; for attribute "codec" a type may be "MPEG-2" or "MPEG-4" or "WMV (Windows Media Video)," etc.; and the like. As should be appreciated, the above attribute-value pairs are offered as examples only and any suitable value may be paired with any attribute identified above. Additionally, attribute-value pairs associated with video attributes may be organized and stored in any suitable data structure, e.g., a table, array of values, array of records, etc., and may be appended as metadata to a video file. For instance, as illustrated, metadata 132A may be appended to video file 128A, metadata 132B may be appended to video file 128B, and metadata 132C may be appended to video file 128C. Alternatively, the video attributes may be stored in a separate location or database from the video files and may be referenced by or otherwise indexed to the video files (not shown).

In aspects, one or more video files may be stored in different storage locations within a distributed environment (e.g., cloud computing environment) accessible to spreadsheet application 110 over a network, e.g., network 106. In some cases, a video file may be stored in a local cache associated with a spreadsheet. In other cases, the location of a video file in storage may be represented by a file locator, which may be a URL to local storage (e.g., C:\Pictures\Fastcars\20120515.mp4) or a URL to remote storage accessible over a network (e.g., http://www.you-.com/catstories.mp4). With respect to remote storage, a URL may provide a file path to a storage location hosted by a third party (e.g., YouTube®, Netflix®, etc.), in a public or private cloud storage location (e.g., OneDrive®, iCloud®, iTunes®, Amazon® Cloud Drive, etc.), in an enterprise storage location (e.g., SharePoint®, etc.), in a public storage location accessed over the Internet, and the like. In other aspects, the video file may be referenced within a function of the spreadsheet by a globally unique name rather than by a URL. A globally unique name may be any name that is unique across the spreadsheet, e.g., "FastCars." If the same name is used on different sheets of a spreadsheet to return different values, the name may be qualified by the sheet on which it appears in order to create a unique name, e.g., "Sheet1 !FastCars" and "Sheet2!FastCars."

Associate component 114 may associate the dynamic data identified by dynamic data component 112 with one or more cells of a spreadsheet. In some examples, associate component 114 may associate dynamic data with a cell by anchoring the dynamic data as a value within the cell. For example, a video file may be anchored within a cell based on a function of the cell that identifies the file locator (e.g., a globally unique name or URL) for the video file, e.g., =GETVIDEO("C:\Pictures\Fastcars\20120515.mp4"). Alternatively, associate component 114 may anchor streaming video, streaming audio or streaming data in a cell based on a URL referencing a third party service: =GETFEED ("https://twitter.com/hashtag/Fastcars?src=hash&lang=en") or =GETSTREAM("https://www.amazon.com/East/dp/B0152ZY7KQ/ref=sr_1_1?s=instant-video&ie=UTF8&qid=1466705933&sr=1-1&keywords=fast+cars"), etc. Alternatively, the URL may specify a parameter to be 'on' or 'play' by default. In a first example, the function would return a handle to the data stream that may just show a blank screen or a first frame of data. In the case where the optional parameter is 'true' (it may be false by default to avoid performance issues), then the function would return the data stream and the data stream would start refreshing and playing its data. Syntax may include: "=GETVIDEO ("http://foo.com/bar/feed", TRUE)" Alternatively, in the case where the data stream is not played immediately, the data stream may only play on demand (via UI control, or via some other calling function or feature that points at that stream object and asks it to play). In a case where video is streamed directly from a camera, there may be additional parameters passed to control the device itself, e.g., OFF, STANDBY, RESET, etc. In other examples, dynamic data may be associated with a cell without using a globally unique name or URL by selecting an "Insert" operation in the toolbar and using a dialog filtered to video types or streaming data types (e.g., streaming video, streaming audio, live data feeds, etc.) to find and insert the dynamic data.

As detailed above, a video is comprised of a plurality of individual frames, each of the individual frames representing a single image. In some cases, the video may be shredded into the plurality of individual frames and associated with one or more cells of the spreadsheet, either automatically or by user selection. In some cases, the plurality of individual frames may be associated with an array that is accessible from the one or more cells by user selection (e.g., hovering, right click, etc.) and displayed in a user interface (UI) element for viewing and manipulation by a user. In other aspects, the plurality of individual frames may be spilled into a range of cells of the spreadsheet for viewing and manipulation by a user. As should be appreciated, other examples are possible and may be incorporated according to the methods and systems described herein.

When dynamic data is associated with a cell, a visual representation of the dynamic data may be provided within the cell. For instance, for a video, a visual representation of the video (e.g., individual frame, title, etc.) may be represented in the cell with a play icon (or other interactive control) overlaying the visual representation. For streaming data, a visual representation of the data host (e.g., an icon representing the New York Stock Exchange, Twitter®, CNN®, Spotify®, etc.) or the streamed data (e.g., individual frame of a video, UI element representing an album with various tracks, etc.) or any other visual representation (e.g., custom selected by a user) may be provided in the cell with a play icon (or other interactive control) overlaying the visual representation. In some aspects, upon selection of the play icon (or other interactive control), the dynamic data may play within the cell. In other aspects, the dynamic data may automatically play within the cell (e.g., upon satisfaction of a condition, upon opening the spreadsheet, etc.)

In aspects, the visual representation of the dynamic data may be fit to a cell size, i.e., bounded by the cell border. In other cases, associate component 114 may anchor a portion of the visual representation (e.g., a top left corner of the visual representation) to a portion of a cell (e.g., top left corner of the cell). In this case, the visual representation may not be fit to the cell size, but may be displayed smaller than the cell (e.g., inside the cell border with at least some white space) or displayed larger than the cell (e.g., extending beyond the cell border onto other cells). In still other cases, the visual representation may be provided as background for a cell and other data may be displayed over the visual representation (e.g., a title, topic, etc., of the dynamic data). Whether a visual representation is fit to a cell or not, dynamic data that is anchored to a cell may move with the cell when the cell is relocated within the spreadsheet (e.g., in response to a sort or filter operation). In this way, a visual representation of an anchored video file may behave in substantially the same or similar way as alphanumeric data and formulas (e.g., textual data, numeric data, formulas, and the like) and, thus, may behave predictably within the spreadsheet in response to operations performed on the spreadsheet.

In other examples, the associate component 114 may associate dynamic data with the spreadsheet but may allow a visual representation of the dynamic data to float over the grid. When the visual representation of dynamic data is allowed to float over the grid (e.g., over one or more cells of the spreadsheet), the visual representation may be displayed within the spreadsheet and the dynamic data may be launched from within the spreadsheet (e.g., by activating a play control associated with the visual representation, or by launching a user interface by right-clicking or hovering over the visual representation, and the like). However, in this case, the visual representation may or may not move with cells as they are relocated within the spreadsheet (e.g., in response to sort operations). In some examples, although the visual representation of the dynamic data may be allowed to float, the dynamic data may be referenced (e.g., by a globally unique name) in one or more functions within the spreadsheet such that one or more operations may be performed on the dynamic data and/or one or more operations may be performed on the spreadsheet based on attributes of the dynamic data. In this case, when cells are relocated the visual representation of the dynamic data may or may not move with the cells, but operations may be performed on the dynamic data and/or the spreadsheet based on the function referencing the dynamic data.

That is, whether or not a visual representation of dynamic data is anchored, floating or even displayed within the spreadsheet, the dynamic data may be referenced (e.g., by a globally unique name) in one or more functions such that one or more operations may be performed on the dynamic data and/or one or more operations may be performed on the spreadsheet based on attributes of the dynamic data. For instance, the dynamic data may be played when a condition of a function referencing the dynamic data is satisfied (e.g., play referenced dynamic data when revenue number hits "X" or play referenced dynamic data as support for cost forecast "Y," etc.).

In some aspects, a user may "change a state" of dynamic data with respect to a cell at any time. For instance, a user may make a selection to convert a visual representation of dynamic data from floating to being anchored within a cell. In this case, a floating visual representation may be selected (e.g., by right click) and may be anchored to a selected cell. A user may also make a selection to convert a visual representation from anchored in a cell to floating (e.g., by "popping" the dynamic data out of a cell). In this case, the dynamic data may no longer be represented in the formula bar of the cell and may be displayed as dissociated from the cell (e.g., in another location within the spreadsheet). As should be appreciated, UI controls (e.g., provided in a toolbar, provided upon right click of a mouse, etc.) may allow the state of dynamic data to be changed at any time.

Hybrid component 116 may associate different types of data with a single cell. In some cases, hybrid component 116 may provide a visual representation of the dynamic data as background for the cell and may display the additional data over the visual representation. Alternatively, a visual representation of the dynamic data may be displayed in one portion of the cell and the additional data may be displayed in another portion of the cell (e.g., above, below, to either side, or wrapping the visual representation). As detailed above, dynamic data may comprise streaming data, streaming video, streaming audio, a video file, etc. "Additional data" may include any type of data other than the dynamic data itself; further, the additional data may be static (non-moving) or dynamic (moving). For instance, additional data may include alphanumeric data, charts, images, etc., that describe the dynamic data (e.g., title, subject matter, creation date, producer, duration, company logo associated with stock price, reviews of a video, etc.) and/or may include any attribute associated with the dynamic data in a human-readable format. Attributes associated with dynamic data may include any of the attributes described above, for instance, image attributes (e.g., aspect ratio, color palate, height, width, etc.), audio attributes (e.g., pitch, volume, speed, etc.), video attributes (e.g., frame rate, height, width, aspect ratio, resolution, duration, size, etc.), data attributes (e.g., packet size, packet rate, etc.), and the like.

Hybrid component 116 may associate dynamic data with additional data (such as static data or other dynamic data) within a single cell of the spreadsheet. As described above, a visual representation of the dynamic data may be provided as background for the cell or may be displayed in any arrangement (e.g., above, below, on either side, wrapped, etc.) with the additional data within the single cell. For instance, the dynamic data (e.g., a stock ticker of real-time stock prices for a company) may be displayed in the same cell with additional static data (e.g., a visual representation designating the company trading on the New York Stock Exchange (NYSE)). Alternatively, the dynamic data (e.g., a video clip of a movie) may be displayed in the same cell with additional static data (such as a title, release date, duration, list of reviews, etc., for the movie) and/or additional dynamic data (e.g., a live Twitter® feed relating to the movie, etc.).

In some cases, hybrid component 116 may associate the dynamic data and the additional data with the cell using a structured format referred to herein as a "compound data type." In aspects, when the dynamic data is provided as background (or fill) for the cell, use of a compound data type may not be necessary to associate different types of data with a cell; however, when the dynamic data and the additional data are displayed in different areas of a single cell, use of compound data types may provide advantages. For example, when the dynamic data and the additional data are associated with a cell using a compound data type, the dynamic data and the additional data may be organized in a structured format, such as an array, record, or table, which includes layout attributes. In some cases, dynamic data can be a nested value within a compound data type, e.g., a record for a person may include a name and an address and may have a field 'live link' where the value is a link to a live data feed. In some cases, one compound data type may even be nested within another.

Additionally, the structure of a compound data type may be leveraged in complex calculations, thereby providing a model for referencing and using different aspects of the data. For example, each component of a compound data type may be represented by a formula or a function. Such individual representation of components facilitates the creation of structures in a single cell where calculations can reference back to other components of the compound data type. For instance, any of the fields of the compound data type can be dereferenced and acted on. That is, a formula may be constructed to get the value of a special field ("=GetAttribute(<field name>)"), an operator may be used to get the value (e.g., the dot "." operator, "=A1.bitrate"), or a unique name may be used to get the value (e.g., if cell A1 has a unique name, "OctoberEarningsRecording.bitrate"). In this way, each field is available to the "calc chain" (e.g., a calculation engine for the spreadsheet) and/or formulas within a spreadsheet.

As should be appreciated, in some aspects, dynamic data itself may be represented by a compound data type. For example, as described above, a video file may comprise video data (e.g., an array of pixel values for rendering moving images) and metadata (e.g., attribute-value pairs for image attributes, audio attributes, video attributes, etc.). More specifically, the metadata associated with a video file may be described in terms of attribute-value pairs and/or attribute-type pairs that may be organized in any suitable structured format, e.g., an array of values, a record with an array of fields, a table, an array of vectors, etc. For example, for attribute "frame rate" a value may be "24 frames-per-second (fps or p)" or "25 fps" or "29.97 fps," etc.; for attribute "duration" a value may be "02:45:12 hours" or "05:80 minutes," etc.; for attribute "resolution" a value may be "720" or "1080" or "1440" or "2160," etc., and a type may be "p" (progressive-scan) or "i" (interlaced), etc.; for attribute "bits per frame" a value may be "7.37 megabits (Mbits), etc.; for attribute "video size" a value may be "82.8 gigabytes (Gbytes)" or "34.4 Gbytes," etc.; for attribute "bitrate" a value may be "96 kilobits per second (Kbps)" or "400 Kbps" or "1500 Kbps," etc., and a type may be "variable bitrate, VBR" or "constant bitrate, CBR"; for attribute "sampling rate" a value may be "44.1 kHz" or "48 kHz," etc.; for attribute "channel" a type may be "stereo" or "mono" and a value may be "channel 1" or "channel 2" or "channel 3," etc.; for attribute "codec" a type may be "MPEG-2" or "MPEG-4" or "WMV (Windows Media Video)," etc.; and the like. The above attribute-value pairs and/or attribute-type pairs are offered as examples only and any suitable value or type may be paired with any attribute identified above.

In further aspects, the dynamic data (e.g., video file, live data feed, streaming audio or streaming video) and attributes (e.g., attribute-value pairs and/or attribute-type pairs corresponding to image attributes, audio attributes and/or video attributes), may be associated with additional data (e.g., data describing the content of the dynamic data, a text transcription of an audio track, or any other data, etc.) in a single compound data type. Additionally, compound data types can hold multiple data streams and/or multiple videos, etc. Moreover, an application program interface (API) may be provided that can talk back to the data stream. This type of functionality allows two things: first, the data stream may be triggered and/or controlled (in the case of attached devices); and second, simple playback of the data stream, e.g., start, stop, lock, refresh, as well as user interface controls. Additionally, for dataq streams that allow it (e.g., delayed live TV feeds), a 'look ahead' buffer may be enabled such that the next steps in calculations may be viewed. In a more advanced case of an active 'look ahead,' one function may handle the 'now' and another function may run on an offset ahead of now, e.g., five seconds ahead, and may compare the results (e.g., delta) in a moving calculation. By combining this theoretical model with talking back to the stream, a device (e.g., having a steering wheel) may be controlled. For instance, a model for self-correcting the device (e.g., by talking back and controlling the steering wheel) may take real time corrections to movement/direction and predict the resulting device movement in a live feedback loop—all from within a spreadsheet.

For example, consider a video file for an episode of a television series. In this case, the video file may include video data (e.g., an array of pixel values for rendering each individual frame and/or modulated data for reproducing soundwaves of an audio track) for storing and playing the video file and associated metadata including video attributes defining aspects of the video file, such as frame rate, duration, size, codec, etc. In examples, additional data may describe or be related to the content of the video file (e.g., a title, credits, subtitles, reviews, star rating, etc.), analysis of the video file (e.g., voice recognition data, sound recognition data, time stamps for each scene, etc.), or any other information (e.g., a user's personal review, personal rating, comments, etc.). In this regard, the additional data may also be represented by attribute-value pairs (e.g., content attributes), an array of values, etc. For instance, attribute "title" may have a value of "Charlie's Happy Day"; attribute "credits" may have multiple values for each of "producer", "editor," "cast," "crew," "writers," etc.; attribute "subtitles" may correspond to a text transcription synchronized with various portions of an audio track for the episode; attribute "reviews" may have multiple values corresponding to each review; attribute "star rating" may have a value of "4.2"; etc. In other examples, the additional data may include any other information for association with the video file in the cell (e.g., user's personal review, personal rating, comments, etc.).

Further still, dynamic data and/or additional data may be described by formatting attributes that may be represented by attribute-value pairs, an array of values, etc. For example, where the additional data includes one or more subtitles for a video (e.g., corresponding to a text transcription of an audio track synchronized to various scenes), an attribute "font size" may have a value "11 pt.," either automatically or by user selection; an attribute "font color" may have a value "red," either automatically or by user selection; an attribute "font" may have a value "Calibri," either automatically or by user selection"; etc. Furthermore, layout attributes may define a relative arrangement and/or dynamic display of the dynamic data and the additional data. For instance, layout attributes may define how to display data (e.g., visual representation of the dynamic data displayed above, below, to the left or the right of additional data, etc.) and/or which data should be dynamically displayed as a cell is resized (e.g., video icon displayed in small cell, with more data progressively displayed as the cell is enlarged). In other examples, layout attributes may include a "time offset" to enable synchronization or delay of subtitles or music, e.g., an array of audio effects may be triggered at various times while playing a video based on user interactions in the spreadsheet or calculations that are running. This type of functionality may result in controlling an audio file to play at a particular, specific timestamp during the video playback. Layout attributes may be defined as an array of values or in terms of attribute-value pairs, e.g., an attribute "alignment" may have value "top" or "left"; an attribute "progressive display" may have numerical values in order of priority such as 1-10, and the like.

In some aspects, rather than a compound data type including actual data representing the dynamic data, attributes, additional data, etc., the compound data type may include an array of fields with references or pointers to the actual data, which may be stored as a record in any suitable database or storage location. As should be appreciated, while alphanumeric data has primarily been discussed above, different types of additional data (e.g., chart data, audio data, image data, etc.) may be described by different sets of attribute-value pairs but may also be represented within the structured format of a compound data type.

In aspects, when a compound data type is associated with a cell, all or some portion of the data represented by the compound data type may be displayed within the cell. For example, a visual representation of dynamic data (e.g., icon, individual frame of video, image representation of a stock ticker, etc.) may be displayed in the same cell with additional data describing the content of the dynamic data (e.g., data depicting the title, editor, cast, crew, stock name, song, etc.), analysis of the dynamic data (e.g., voice recognition data, sound recognition data, time stamps for each scene of a video, statistical changes in the data, etc.), a chart (e.g., showing a workrate or heartrate for the last hour based on data streamed from a health tracking device), an array of charts (e.g., showing heart rate, distance travelled, energy expended, etc.), or any other information (e.g., a user's personal review, user comments, etc.). Alternatively, while video attributes or data attributes may be included in the compound data type, some attributes may not be displayed in the cell with a visual representation of the dynamic data and the additional data. Rather, in aspects, attributes may be retrieved from the compound data type and displayed upon a user selection (e.g., right click on the visual representation of the dynamic data). As will be described further below, UX component 122 may display UI controls in a ribbon, toolbar, popup menu, etc., for playing dynamic data (e.g., play, fast forward, pause, rewind, etc.), viewing or manipulating video data (e.g., for video processing), viewing or manipulating video attributes (e.g., resolution, aspect ratio, frame rate, duration, size, codec, etc.), selecting video attributes for display within a cell (e.g., title, duration), selecting layouts for display of the visual representation of the dynamic data with the additional data in a cell (e.g., visual representation displayed adjacent additional data on left or right, visual representation displayed above or below additional data, additional data wrapping visual representation, additional data displayed over visual representation, and the like).

In aspects, attribute component 118 may retrieve parameters for dynamic data associated with a spreadsheet. Parameters retrieved for dynamic data may include any data or attribute described above, e.g., video data or attributes, image data or attributes, audio data or attributes, data points or data attributes, etc. In some aspects, attribute component 118 may retrieve parameters from a compound data type. For instance, attribute component 118 may retrieve dynamic data (including associated attributes), additional data, formatting attributes, layout attributes, etc., from a compound data type. In aspects, attribute component 118 may retrieve parameters for dynamic data and/or additional data at any time, for example, in response to a selection to associate the dynamic data with a spreadsheet, in response to a selection to manipulate the dynamic data, in response to a selection to perform a spreadsheet operation, and the like.

Operation component 120 may perform operations on dynamic data associated with a spreadsheet and/or may perform operations on a spreadsheet based on attributes of dynamic data associated with the spreadsheet. For example, a user may select an operation to apply to a visual representation of dynamic data (e.g., "fit to cell," "fill cell," etc.). For example, in order to fit a visual representation to a cell, attributes of the visual representation (e.g., height, width) may automatically be adjusted to coincide with a size of the cell. In some examples, a visual representation of dynamic data may be fit (or sized) to coincide with both a cell height and a cell width (e.g., for "fit to cell" or "fill cell"); alternatively, the visual representation may be fit to coincide with one of a cell height (e.g., "fit vertically") or a cell width (e.g., "fit horizontally"). Similarly, when a cell is resized, operation component 120 may resize a visual representation of dynamic data associated with the resized cell, either automatically or by a user selection. As should be appreciated, the above examples are not intended to be exhaustive and a visual representation may be fit to a cell, resized with a cell, or applied as fill by any suitable means, either automatically or by user selection.

Alternatively, operation component 120 may fit the cell to a visual representation of dynamic data such that the cell conforms to a size of the visual representation. In this case, cell attributes (e.g., a cell height and/or a cell width) may automatically be adjusted to coincide with a size of the visual representation. Furthermore, other cells within a row and/or a column associated with the re-fit cell may also conform to the height and/or width dimensions of the visual representation. As should be appreciated, the examples described above are not intended to be exhaustive and a cell may be fit to a visual representation by any suitable means, either automatically or by user selection.

In other aspects, attributes associated with dynamic data, e.g., video attributes, image attributes, audio attributes, data attributes, etc., may be surfaced in a user interface (e.g., by UX component 122) and operation component 120 may perform operations in response to a user selection. For example, operation component 120 may receive a selection to adjust one or more attributes of the dynamic data (e.g., aspect ratio, resolution, frame rate, etc.) Alternatively, operation component 120 may receive a selection to change a state of dynamic data. As used herein, a "state of dynamic data" may refer to a type of association of the dynamic data with a cell and/or spreadsheet, e.g., anchored, floating, arrayed, background, etc. Changing the state of dynamic data may involve converting the dynamic data from one state to another, e.g., from anchored to floating, from arrayed to independent, from background to foreground, from background to independent, from floating to anchored, and the like.

Operation component 120 may also perform any number of operations on the dynamic data. For example, operation component 120 may provide operations for "playing" dynamic data, such as controls for play, pause, stop, fast forward, rewind, etc. Additionally or alternatively, operation component 120 may allow any number of operations on video data, e.g., allowing for video processing, such as splicing images into a video file, shredding a video file into individual frames, changing a compression format (e.g., codec), etc. The examples described above are not intended to be exhaustive and any number of operations may be performed on dynamic data associated with cells by any suitable means, either automatically or by user selection.

For example, with respect to live data streams, a spreadsheet may "pause" the stream and then turn it on to consume data at will. That is, the spreadsheet may tell the stream to "feed me" and get the data flowing in real time into the cell. In some cases, streams may have historical information. In this case, the stream may be called, stopped, and then started again from some previous point in time, e.g., rewinding the stream. Alternatively, some streams are real time in nature and may not maintain "history." In that case, in response to a pause command, it is really the spreadsheet application that is pausing and when the stream is restarted, it picks up from wherever the stream happens to be sending at that point. Accordingly, portions of the stream may be missed. To address this situation, the spreadsheet may provide a frame, or cache, for part of the stream. In this case, the spreadsheet may maintain, in memory, the last x amount of data and this raw data may be revisited at any time (at least until the application session is closed). Likewise, if the stream is paused, the application can keep "listening" silently and populating the cache so that the stream may be rejoined from where it left off. In aspects, control and/or customization of caching the stream may be exposed via custom functions, e.g., a 'delayed live feed' control. Note that in the case of video or sound types of streams this is not necessary because these types of streams are generally 'complete' files that are streamed so that historical data is available.

Operation component 120 may further allow operations on a spreadsheet based on content or attributes of dynamic data associated with a range of cells. For example, in response to receiving an indication to perform a sort or filter operation on a range of cells within a spreadsheet, operation component 120 may relocate cells within the range of cells based on video content and/or video attributes, e.g., based on duration, aspect ratio, resolution, size, and the like. For instance, with respect to video content, a spreadsheet may include a column of videos within which people have been identified. In this case, a sort or filter operation may be performed based on the list of people. That is, the videos may be sorted such that all videos including "Bob" are presented above other videos in the column. With respect to video attributes, the same column of videos may be sorted based on the GEO locations where each video was filmed (e.g., numerically by longitude-latitude values or otherwise) and/or may be charted from the column based on the GEO locations.

Additionally or alternatively, operation component 120 may perform conditional formatting on the spreadsheet based on content or attributes of dynamic data. For example, a heat map may be displayed over cells associated with dynamic data, e.g., turning cells redder that are associated with dynamic data having a longer duration, turning cells greener that are associated with dynamic data having a shorter duration, etc. In aspects, the conditional formatting may be customized by a user based on any selected attribute. As should be appreciated, any number of attributes may be associated with dynamic data and operations may be performed on the spreadsheet based on any attribute surfaced (or identified) by attribute component 118, or otherwise.

UX component 122 may communicate with operation component 120 to provide one or more user interfaces for exposing available operations for manipulating dynamic data and/or attributes. As used herein, the term "expose" refers to providing access for user selection and/or input. Selections and/or inputs for operations may be received by gesture, touch, mouse input, keyboard input, etc. For example, UI controls may be provided for playing dynamic data from within a spreadsheet, e.g., UI controls such as "play," "fast forward," "stop," "rewind," and "pause." Additionally, UX component 122 may provide UI controls for selecting fit and resize operations to perform on a visual representation of dynamic data, as described above. UI controls may also be provided for changing a state of dynamic data, for example, from anchored to floating or, conversely, from floating to anchored, and the like. Additionally or alternatively, a visual representation of dynamic data may be "popped out" from background to being displayed independently in a cell.

Further, UI controls may be provided for manipulating data associated with dynamic data (e.g., video data, audio data, image data, etc.) to allow for data processing of the dynamic data. For instance, UI controls may be provided for manipulating a video file, e.g., allowing for video processing, such as splicing images into a video file as new frames, shredding a video file into individual frames, changing a compression format, etc. Additionally, image processing may be conducted on a frame-by-frame basis, e.g., by surfacing an array of pixel values and providing UI controls for manipulating the pixel values. UI controls may also be provided for manipulating attributes of dynamic data, e.g., adjusting frame rate, resolution, aspect ratio, packet rate, and the like. As should be appreciated, UX component 122 may provide any number of user interfaces (e.g., dropdown menus, popup menus, ribbons, toolbars, etc.) for exposing operations to manipulate dynamic data and/or attributes.

For cells associated with more complex objects, e.g., an array of images associated with a video or dynamic data with additional data, UX component 122 may provide additional user interfaces and UI controls. For instance, UI controls may be provided for selecting a layout (or alignment) between a visual representation of dynamic data and additional data within a single cell, e.g., a visual representation may be displayed above, below, to the right or left of, or wrapped by additional data, etc. Additionally, UX component 122 may display various views of data associated with a compound data type, e.g., display of data may vary based on cell size and/or various popup windows including the data may be provided (e.g., a card view). For instance, a minimal amount of data may be displayed in a small cell (e.g., an icon representation of dynamic data), but successively more data may be displayed as the cell is enlarged (e.g., individual frames of a video, text transcription of an audio track, charted stock prices over a period of time, etc.).

Additionally or alternatively, UX component 122 may provide a popup window for displaying data associated with the compound data type, which may be provided in a formatted layout (e.g., card view). A settings tool bar may be provided for manipulating data associated with the compound data type. As should be appreciated, UX component 122 may retrieve and surface more or less data associated with a compound data type based on user preference or selection.

Similarly, where multiple individual frames of a video are associated with a single cell, UX component 122 may provide a UI element for displaying the array of individual frames. For example, in a default collapsed view (e.g., collapsed UI element), a visual representation of one of the array of individual frames may be displayed within the cell. In some aspects, in the collapsed view, UX component 122 may provide a timer to cycle display of each frame within the cell. The collapsed UI element may further include a visual indication that multiple individual frames are associated with the cell (e.g., a stack indicator, scroll control, etc.). In response to selection of a UI control (e.g., right click, button, menu, etc.), the collapsed view may expand to reveal each of the array of individual frames. The array of individual frames may be displayed within the expanded UI element in any suitable arrangement (e.g., linear, carousel, grid, etc.) for viewing and interacting with the array of individual frames. For instance, an individual frame may be selected and removed from the array of frames associated with a first cell and cut/pasted or drag/dropped into a second cell, or an individual frame may be deleted from the array altogether. In some cases, the whole array of individual frames may be "spilled" into a range of cells, e.g., with each frame spilling into (or being associated with) a different cell of the range of cells. Additionally, a new frame may be added to an array of frames by opening the expanded UI element (e.g., by right click activation) and by inserting the new frame into a selected position within the array. As detailed above, any number of different user interfaces may be provided by UX component 122 for viewing and/or manipulating dynamic data, attributes and/or additional data.

Similarly, where multiple tracks of a streamed audio are associated with a single cell, UX component 122 may provide a UI element for displaying the array of individual tracks. For example, in a default collapsed view (e.g., collapsed UI element), a visual representation of an album, for instance, may be displayed within the cell. The collapsed UI element may further include a visual indication that multiple individual tracks are associated with the cell (e.g., a stack indicator, scroll control, expand icon, etc.). In response to selection of a UI control (e.g., right click, button, menu, expand icon, etc.), the collapsed view may expand to reveal each of the array of individual tracks. The array of individual tracks may be displayed within the expanded UI element in any suitable arrangement (e.g., linear, carousel, grid, etc.) and may be displayed with at least some audio attributes (e.g., track title, duration, etc.) for viewing and interacting with the array of individual tracks. For instance, an individual track may be selected and played from the expanded UI element. In some cases, the whole array of tracks may be "spilled" into a range of cells, e.g., with each track spilling into (or being associated with) a different cell of the range of cells. As detailed above, any number of different user interfaces may be provided by UX component 122 for viewing and/or manipulating dynamic data, attributes and/or additional data.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
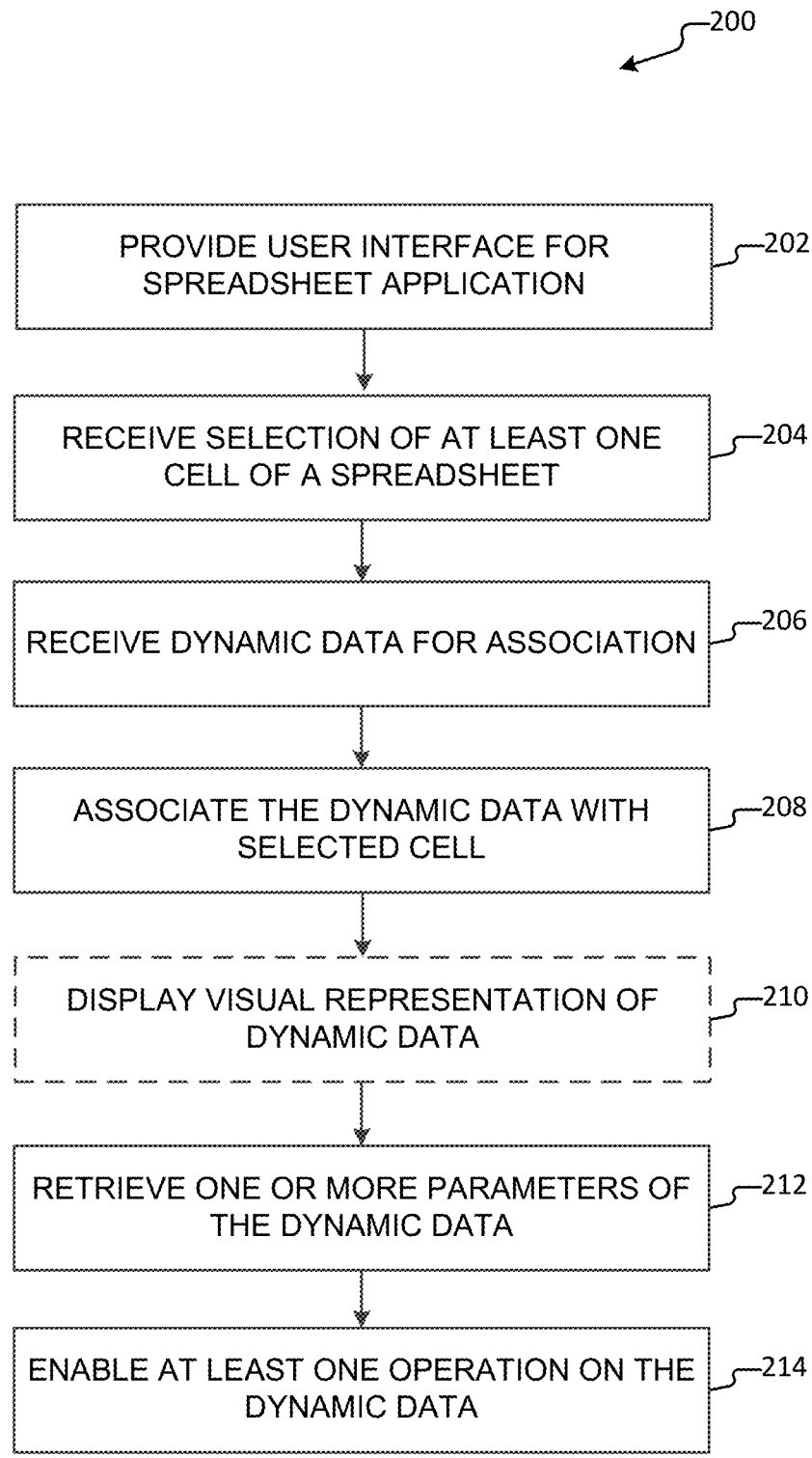
FIG. 2 illustrates a method for associating dynamic data with one or more cells of a spreadsheet, according to an example embodiment.

FIG. 2 illustrates a method for associating dynamic data with one or more cells of a spreadsheet, according to an example embodiment.

Method 200 begins with provide interface operation 202, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, keyboard input, and the like. The user interface may operate in conjunction or communication with one or more other components of the spreadsheet application (e.g., dynamic data component 112, associate component 114, hybrid component 116, attribute component 118, and operation component 120) to associate dynamic data with one or more cells of the spreadsheet.

At select cell operation 204, at least one cell of a spreadsheet may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like. When a single cell is selected, the cell may be identified in a toolbar of the user interface by a cell identifier that specifies a location of the cell within the spreadsheet. For example, a cell identifier of "A1" specifies that the cell is located in column A, row 1 of the spreadsheet, while a cell identifier of "B5" specifies that the cell located in column B, row 5 of the spreadsheet. The cell identifier may further be displayed adjacent to a formula bar (or "fx bar") identifying the contents of the cell in the toolbar of the user interface. When a range of cells is selected, the cell at the top left corner of the range may be displayed by a cell identifier next to the formula bar, with the range of cells being represented by a range identifier including cell identifiers for the cell at the top left corner and the cell at the bottom right corner (e.g., A1:C5).

At select dynamic data operation 206, a selection or indication to associate dynamic data with the at least one cell may be received, either automatically (e.g., based on a function) or by user selection. That is, in some aspects, operations may call (or select) dynamic data for association with a cell without requiring user input, e.g., operations such as 'data refresh,' 'import from such and such data source,' 'copy paste,' etc. In other aspects, a UX component (e.g., UX component 122) may provide a user interface for receiving the selection to associate the dynamic data by a gesture, touch, mouse movement, keyboard input, and the like. In some aspects, in response to a selection of a cell (or a range of cells), a menu may be provided for inserting or associating various objects (including dynamic data) with the selected cell (or range of cells). In still further aspects, a user may indicate an intention to associate dynamic data with a selected cell by manually entering a function that references the dynamic data into the selected cell (or into a formula bar associated with the selected cell). For example, a user may open a mobile version of the spreadsheet application, may select the at least one cell and may record a video using a camera on the mobile device, with or without recording an audio track. In this case, a video file representative of the recorded video may automatically be selected for association with the at least one cell. In other cases, a user may record a video first, with or without recording an audio track, and may then open the mobile spreadsheet application to associate the recorded video with a cell or cells of the spreadsheet. In still other cases, a user may open a twitter feed on a mobile device, before or after opening a mobile spreadsheet application, and may associate a URL for the twitter feed with at least one cell of a spreadsheet. As should be appreciated, the user interface may receive an indication to associate dynamic data with one or more cells by any suitable means.

At associate dynamic data operation 208, the dynamic data may be associated with the selected cell of the spreadsheet. Associate dynamic data operation 208 may be performed by an associate component (e.g., associate component 114) of a spreadsheet application (e.g., spreadsheet application 110). As used herein, the term "associate" may include any form of linking dynamic data with one or more cells within a spreadsheet. In aspects, dynamic data that is "associated" with a cell may be treated as a value within the cell. For example, a function in a spreadsheet can return the dynamic data (e.g., streaming video, video file, streaming audio, etc.) to the calling cell. That is, similar to traditional functions, which can return numbers, strings, or errors, functions according to the present disclosure can return new kinds of "values" (e.g., arrays, records, other arbitrary compound object, pictures, videos, etc.). In other aspects, dynamic data can be defined and/or constructed as a complex or rich type of data with some or all of the following characteristics: a name, a media-type (e.g., video, streaming video, Internet sensor, etc.), metadata (e.g., a codec, length, resolution, etc.), an audio track (mono or stereo and metadata), a subtitle track (e.g., including supported languages). As used herein, a "rich data type" is defined as a type of data that has established relationships to other types of data. Additionally, rules may dictate how to display the complex or rich data type in the spreadsheet and/or how to render the data type in a card view. For example, "display frame #xx when loaded," which may be customizable. Data streams may also have a label to store its connection to its source.

For example, upon receiving the selection to associate the dynamic data with the selected cell, a menu may be provided with various options for identifying file locator(s) for streaming video, streaming audio, a live data feed and/or a video file. For example, the menu may provide for browsing a local file structure or a remote storage location (e.g., the Internet) to identify a URL for the dynamic data. Alternatively, a globally unique name for the dynamic data may be identified. In further aspects, a menu may provide selections for anchoring the dynamic data within the cell or for referencing the dynamic data in a cell.

For example, a user may manually associate (or embed) the dynamic data in the selected cell by drag/drop or copy/paste functions. In this case, a name of the dynamic data or, rather than a name, an interactive icon may be displayed in the formula bar. Additionally, a user may anchor the dynamic data to the selected cell by entering a file locator for the dynamic data within a function, e.g., fx=GETVIDEO ("C:\Pictures\Fastcars\20120515.mp4"); or fx=GETFEED ("https://twitter.com/hashtag/Fastcars?src=hash&lang=en"); or fx=GETSTREAM("https://www.amazon.com/East/dp/B0152ZY7KQ/ref=sr_1_1?s=instant-video&ie=UTF8&qid=1466705933&sr=1-1&keywords=fast+cars"), etc. Alternatively, a user may reference dynamic data (e.g., by globally unique name, URL, etc.) within a formula of a cell. For example, dynamic data may be referenced within a formula of the selected cell for performing an operation upon satisfaction of a condition (e.g., when revenue hits "X", play dynamic data).

In some cases, multiple portions of dynamic data may be associated with a cell, the file locators for each may be represented within the function associated with the selected cell, e.g., fx=GETFEED("https://twitter.com/hashtag/Fastcars?src=hash&lang=en", "https://twitter.com/has htag/Runfree?src=hash&lang=en"). In this case, display options for visual representations of the multiple portions of dynamic data may be provided, e.g., configurations such as linear, carousel, grid, etc. In some cases, while the multiple portions of dynamic data may be associated with a single cell, display of visual representations for the multiple portions of dynamic data may overlay additional cells of the spreadsheet. In further cases, a user interface (UI) element may be provided in order to display, interact with and/or manipulate the multiple portions of dynamic data. A user may interact with the UI element by translating through the multiple portions of dynamic data to view, add, delete, edit, or otherwise manipulate portions of dynamic data within the array. Alternatively, the dynamic data may be shredded to provide individual portions of data, e.g., individual frames of a video file, which may be associated with the selected cell. In some aspects, a special user interface may be provided (e.g., "iFrame" or any other handle to a window) for associating dynamic data with the selected cell.

When dynamic data is anchored within a selected cell, a visual representation of the dynamic data may be displayed within the cell, e.g., within the cell border and/or extending beyond the cell border to overlay additional cells of the spreadsheet. In aspects, the visual representation may move with the selected cell when operations are performed on the spreadsheet. Additionally, fit and/or resize operations may be performed on the visual representation, either automatically or by user selection. In other aspects, the dynamic data may be associated by reference to a selected cell (e.g., by referencing the globally unique name of the dynamic data within a function associated with the selected cell). In this case, operations may be performed on the dynamic data and/or operations may be performed on the spreadsheet based on attributes of the dynamic data. However, in this case, the visual representation of the dynamic data may or may not move with the selected cell when operations are performed on the cell (e.g., sort, filter, etc.) but may float over the grid within the spreadsheet. In fact, in some cases, a visual representation of the dynamic data may not be displayed within the spreadsheet at all, but the dynamic data may merely be referenced within a function. As should be appreciated, dynamic data may be associated with one or more cells of a spreadsheet by any suitable means such that the dynamic data behaves within the spreadsheet according to a user preference, which may be specified upon associating the dynamic data or at some later time.

At optional display operation 210 (identified by dashed lines), a visual representation of the dynamic data may be displayed in the spreadsheet. For example, as detailed above, when the dynamic data is anchored to the selected cell, a visual representation of the dynamic data may be displayed within the cell, e.g., within the cell border and/or extending beyond the cell border to overlay additional cells of the spreadsheet. For example, a visual representation of the data host (e.g., an icon representing the New York Stock Exchange, Twitter®, CNN®, Spotify®, NetFlix®, etc.) or the streamed data (e.g., individual frame of a video, UI element representing an album with various tracks, etc.) or any other visual representation (e.g., custom selected by a user) may be provided in the cell with a play icon (or other interactive control) overlaying the visual representation. When dynamic data is referenced in a formula of the selected cell, a visual representation of the dynamic data may only be displayed upon satisfaction of a condition or a visual representation of the dynamic data may be displayed within the spreadsheet but may not be displayed with the selected cell (e.g., floating visual representation of the dynamic data). As should be appreciated, dynamic data may be displayed within the spreadsheet by any suitable means.

At retrieve parameters operation 212, the dynamic data itself (e.g., video data, streaming audio data, streaming video data, a live data feed, etc.) and attributes (video attributes, image attributes, audio attributes, etc.) (collectively "parameters") may be retrieved. Retrieve parameters operation 212 may be performed by an attribute component (e.g., attribute component 118) of a spreadsheet application (e.g., spreadsheet application 110). In some aspects, video data may be retrieved from a video file and video attributes may be retrieved from metadata appended to the video file. Alternatively, data values from a live data stream (e.g., real-time stock prices) may be retrieved by following a URL to a third-party service, opening a communication channel to the service provider, and consuming the data stream. The data values associated with the data stream (e.g., as metadata) may further include data attributes (e.g., protocol, packet rate, etc.). In other aspects, parameters (e.g., dynamic data, attributes associated with dynamic data, additional data, layout attributes, etc.) may be retrieved from a data structure of a compound data type. As should be appreciated, once dynamic data is associated with the selected cell, any number of parameters may be retrieved for the associated dynamic data. In at least some aspects, the retrieved parameters may further be surfaced in a user interface or otherwise for manipulation by a user.

At enable operation 214, at least one operation may be enabled. In aspects, enable operation 214 may be performed by an operation component (e.g., operation component 120) of a spreadsheet application (e.g., spreadsheet application 110). A user interface may provide options for sizing a visual representation of the dynamic data and/or for sizing the selected cell. For example, a user may select an option for fitting the visual representation to a size of the cell or for fitting the selected cell to the size of the visual representation. In some cases, by default, the size of a cell (e.g., as defined by a cell height and a cell width) may automatically be fit to the size of a visual representation of the dynamic data. In response to fitting the size of the selected cell to the visual representation, sizes of additional cells within a row and/or a column associated with the selected cell may also be adjusted. Additionally, options may be provided for resizing a visual representation when a cell is resized, for displaying more or less data of a compound data type when a cell is resized, and the like.

As should be appreciated, at enable operation 214, additional operations may also be enabled. For example, the additional operations may include an option to change a state of dynamic data, e.g., from anchored to floating, from arrayed to spilled, from floating to anchored, and the like. Options may also be provided for customizing various attributes associated with the dynamic data. For instance, options for manipulating attributes such as frame rate, duration, aspect ratio, resolution, and the like, may be provided in a user interface. Enable operation 214 may further enable spreadsheet operations to be performed based on attributes of the associated dynamic data. For example, a range of cells may be sorted or filtered based on attributes of associated dynamic data such as frame rate, duration, aspect ratio, resolution, packet size, etc. The above examples are offered for purposes of describing the aspects herein and should not be considered limiting.

As should be appreciated, operations 202-214 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 3:
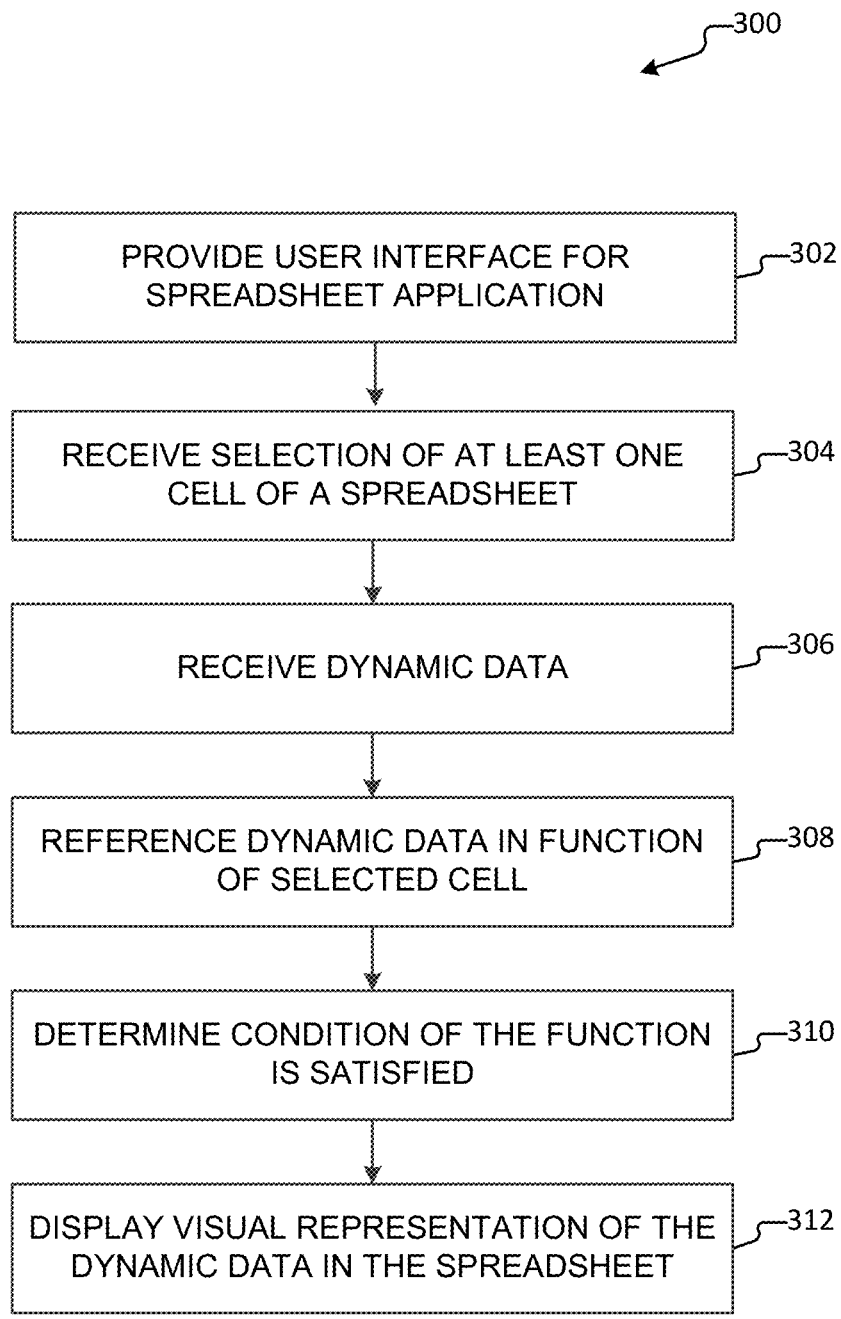
FIG. 3 illustrates a method for referencing dynamic data in functions of one or more cells of a spreadsheet, according to an example embodiment.

FIG. 3 illustrates a method for referencing dynamic data in functions of one or more cells of a spreadsheet, according to an example embodiment.

Method 300 begins with provide interface operation 302, where a spreadsheet application may provide (or cause to be provided) a user interface to a user. For example, a UX component (e.g., UX component 122) may facilitate a user experience (UX) by providing the user interface of a spreadsheet application (e.g., spreadsheet application 110) via a display. Selections and/or inputs may be received by the user interface based on gestures, touch, mouse movements, keyboard input, and the like. The user interface may operate in conjunction or communication with one or more other components of the spreadsheet application (e.g., dynamic data component 112, associate component 114, hybrid component 116, attribute component 118, and operation component 120) to reference the dynamic data in a function of at least one cell of the spreadsheet.

At select cell operation 304, at least one cell of a spreadsheet may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application (e.g., spreadsheet application 110) may provide the spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like.

At receive dynamic data operation 306, dynamic data may be received for association with the at least one cell, either automatically (e.g., based on a function) or by user selection. In aspects, receive dynamic data operation 306 may be performed by a dynamic data component (e.g., dynamic data component 112) of a spreadsheet application (e.g., spreadsheet application 110). In some aspects, in response to a selection of a cell (or a range of cells), a menu may be provided for inserting or associating various objects (including dynamic data) with the selected cell (or range of cells). For example, a user may take a video (e.g., via a mobile device) for reference within the selected cell. Alternatively, a user may manually enter a cell locator for the dynamic data into a function associated with the selected cell. As should be appreciated, the user interface may receive the dynamic data by any suitable means.

At reference dynamic data operation 308, the dynamic data may be referenced in a function associated with the selected cell. Reference dynamic data operation 308 may be performed by an associate component (e.g., associate component 114) of a spreadsheet application (e.g., spreadsheet application 110). For example, the dynamic data may be referenced in the selected cell by entering a file locator (e.g., URL, globally unique name, etc.) for the image within a function, e.g., fx=GETVIDEO("C:\Pictures\Fastcars\20120515.mp4"); or fx=GETFEED("https://twitter.com/hashtag/Fastcars?src=hash&lang=en"); or fx=GETSTREAM("https://www.amazon.com/East/dp/B0152ZY7KQ/ref=sr_1_1?s=instant-video&ie=UTF8&qid=1466705933&sr=1-1&keywords=fast+cars"), etc.

At determine operation 310, it may be determined that a condition of the function is satisfied. For instance, the function may specify that "when revenue hits 'X,' display referenced dynamic data as background for the cell." In this case, when revenue hits "X" the condition is satisfied. As should be appreciated, any number of conditions may be included in a function and may be satisfied by any suitable means.

At display operation 312, a visual representation of the dynamic data may be displayed in the spreadsheet. For example, a visual representation of the data host (e.g., an icon representing the New York Stock Exchange, Twitter®, CNN®, Spotify®, NetFlix®, etc.) or the streamed data (e.g., individual frame of a video, UI element representing an album with various tracks, etc.) or any other visual representation (e.g., custom selected by a user) may be provided in the spreadsheet with a play icon (or other interactive control) overlaying the visual representation. In aspects, when dynamic data is referenced in a formula of the selected cell, a visual representation of the dynamic data may only be displayed upon satisfaction of a condition or a visual representation of the dynamic data may be displayed within the spreadsheet but may not be displayed with the selected cell (e.g., floating visual representation of the dynamic data). As should be appreciated, dynamic data may be displayed within the spreadsheet by any suitable means upon satisfaction of the condition.

As should be appreciated, operations 302-312 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 4:
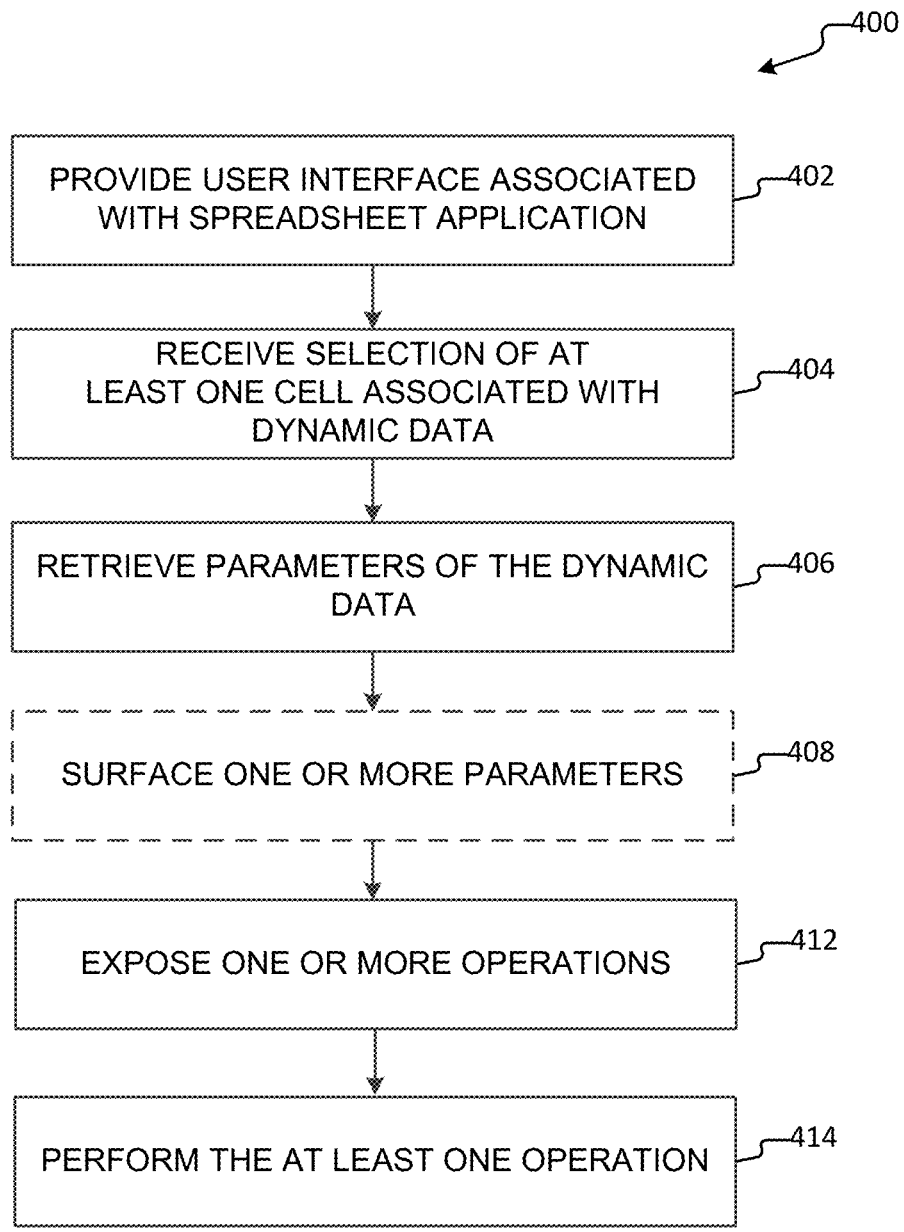
FIG. 4 illustrates a method for exposing one or more operations based on parameters of dynamic data associated with one or more cells of a spreadsheet, according to an example embodiment.

FIG. 4 illustrates a method for exposing one or more operations based on parameters of dynamic data associated with one or more cells of a spreadsheet, according to an example embodiment.

Method 400 begins with provide interface operation 402, where a spreadsheet application may provide (or cause to be provided) a user interface to a user. For example, similar to provide interface operations 202 and 302, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., dynamic data component 112, associate component 114, hybrid component 116, attribute component 118, and operation component 120) to manipulate dynamic data associated with one or more cells of a spreadsheet.

At select cell operation 404, at least one cell having associated dynamic data may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application may display a spreadsheet to a user, the spreadsheet including one or more sheets, each sheet having a plurality of rows and columns of cells. Cells having associated dynamic data may be selected by highlighting or otherwise identifying the cell or range of cells using a gesture, touch, mouse click, keyboard input, and the like.

At retrieve parameters operation 406, the dynamic data itself (e.g., video data, streaming audio data, streaming video data, a live data feed, etc.) and attributes (video attributes, image attributes, audio attributes, etc.) (collectively "parameters") may be retrieved. Retrieve parameters operation 406 may be performed by an attribute component (e.g., attribute component 118) of a spreadsheet application (e.g., spreadsheet application 110). In some aspects, video data may be retrieved from a video file and video attributes may be retrieved from metadata appended to the video file. Alternatively, data values from a live data stream (e.g., real-time stock prices) may be retrieved by following a URL to a third-party service, which may further be associated with data attributes (e.g., protocol, packet rate, etc.).

In some cases, a compound data type may be associated with the selected cell. In this case, retrieve parameters operation 406 may retrieve one or more parameters for the associated dynamic data and/or additional data from the compound data type. For instance, dynamic data (e.g., data values of a live data feed, an array of pixel values for rendering moving images and/or modulated data for encoding an audio track) with attributes (e.g., resolution, aspect ratio, frame rate, bitrate, codec, creation date/time, title, duration, size, etc.), additional data (e.g., reviews, subtitles, cast, crew, star rating, etc.), formatting attributes (e.g., defining formatting for the additional data) and/or layout attributes (e.g., defining an alignment or layout for display of the dynamic data and additional data within a cell) may be retrieved from the compound data type. As should be appreciated, a compound data type may store or reference the dynamic data and any type of additional data.

At optional surface parameters operation 408 (identified by dashed lines), dynamic data, attributes, additional data (e.g., including content and/or formatting attributes) and/or layout attributes (e.g., collectively "parameters") retrieved may be "surfaced" such that the parameters may be presented to a user in a readable format. In aspects, a user interface may be provided for presenting some or all of the identified parameters. For instance, a settings toolbar (e.g., settings toolbar 1318) may be provided that includes a number of tabs for viewing and manipulating dynamic data or attributes. In one example, a video settings tab may display video attributes such as "resolution," "aspect ratio," "frame rate," "title," etc. In another example, a video processing tab may display video attributes such as "codec," "bitrate," as well as options to "shred" or "splice" the video file. In other examples, tabs associated with the settings toolbar may provide other attributes, such as "creation date/time," "file size," "duration," and the like. In some cases, e.g., where both dynamic data and additional data are associated with a single cell, the settings toolbar may display content, analysis and/or formatting attributes for the additional data such as number of reviews (e.g., professional or personal), star rating (e.g., professional or personal), voice recognition data (e.g., identifying which scenes include which actors), sound recognition data (e.g., identifying a scene with a train in the background), time stamps for each scene of a video, statistical changes in data (e.g., one or more points where a stock price fell by more than a particular amount), etc. Additionally, layout attributes between a visual representation of the dynamic data and additional data may be displayed, such as contrast, alignment, background opacity or transparency, and the like. As should be appreciated, any parameter identified by retrieve parameters operation 406 may be surfaced in any suitable interface.

At expose operation 412, one or more operations may be exposed to a user. The one or more operations may include operations for manipulating parameters of the dynamic data (or additional data) and/or operations for performing manipulations of the spreadsheet based at least in part on the one or more parameters. For example, UI controls (e.g., +/− controls) or input fields may be provided for manipulating the one or more parameters, e.g., the attributes detailed above. In this regard, a user may directly input values to adjust attributes up or down based on user preference. For instance, with reference to attributes displayed by the settings tab, the values for "resolution," "aspect ratio," "frame rate," "title," etc., may be adjusted by direct input and/or adjusted up or down using +/− controls. Additionally or alternatively, a "reset" button may be provided to return adjusted parameters back to an original version of the dynamic data. As should be appreciated, the above examples of parameters are not exhaustive and any parameter may be surfaced and adjusted based on one or more exposed operations.

In further examples, at expose operation 412, one or more operations for manipulating the spreadsheet based at least in part on the retrieved parameters may be exposed to a user. For example, in response to selection of a range of cells, a user interface may provide options for filtering or sorting the range of cells based on one or more parameters of associated dynamic data. For example, the range of cells may be sorted based on attributes such as durations of associated video files (e.g., "Sort Longest to Shortest" or "Sort Shortest to Longest"), resolution of associated video files (e.g., "Sort Highest to Lowest" or "Sort Lowest to Highest"), creation dates of associated dynamic data (e.g., "Sort Newest to Oldest" or "Sort Oldest to Newest"), one or more speakers in streamed audio (e.g., alphabetically by speaker), and the like.

Additionally, the range of cells may be sorted or filtered based on attributes that are not visible or displayed in the cell. For example, this could include tangible metadata such as GEO location data that was captured and stored as part of metadata for dynamic data being viewed in the spreadsheet (e.g., where a YouTube® video was recorded). Options for filtering the range of cells may similarly be based on the above-detailed parameters of associated video files. As described above, dynamic data may be defined by video data (e.g., an array of pixels for rendering moving images), audio data (e.g., modulated data for reproducing soundwaves for an audio track), live data (e.g., real-time data values), as well as attributes including video attributes (e.g., frame rate, resolution, aspect ratio, etc.), audio attributes (e.g., pitch, volume, speed, channel, creation date and/or time, file name, file size, etc.), data attributes (e.g., packet rate, packet size, etc.), and the like. In aspects, the range of cells may be sorted based on any identifiable attribute of associated dynamic data.

At perform operation 414, one or more operations may be performed. For instance, an operation may be performed on dynamic data and/or additional data associated with a selected cell. Alternatively, an operation on a range of cells may be performed based on parameters of dynamic data and/or additional data associated with the range of cells. Indeed, any of the operations described herein may be selected and performed. In aspects, a cell preview may further be provided such that changes may be viewed as they are implemented. Based on the preview, a user may "accept" changes before they are implemented. In this regard, a user may manipulate display of a visual representation of the dynamic data and/or additional data associated with a cell, manipulate one or more parameters associated with the dynamic data, manipulate the spreadsheet based on parameters of the dynamic data, etc.

As should be appreciated, operations 402-414 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 5:
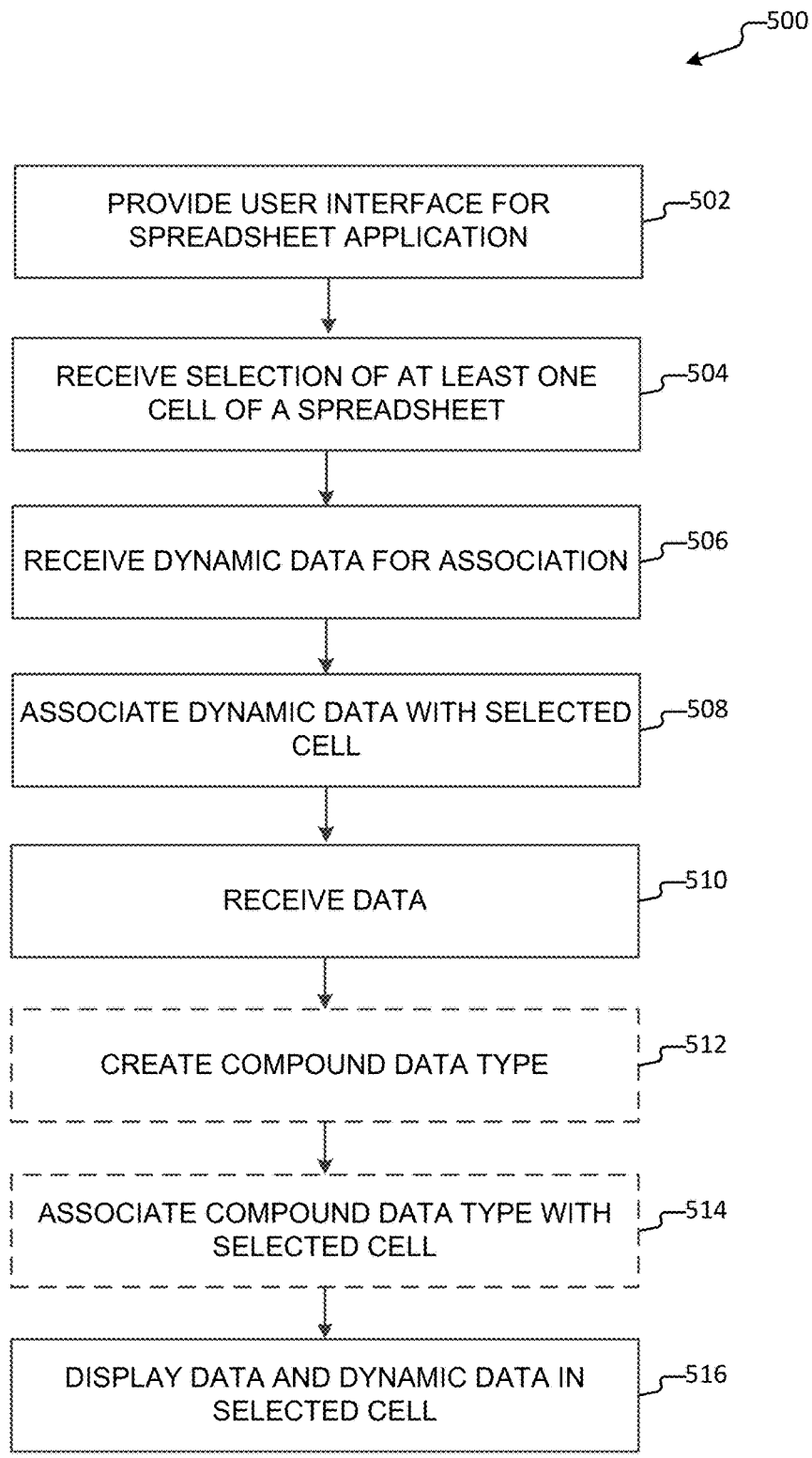
FIG. 5 illustrates a method for associating dynamic data and additional data with one or more cells of a spreadsheet, according to an example embodiment.

FIG. 5 illustrates a method for associating dynamic data and additional data with one or more cells of a spreadsheet, according to an example embodiment.

Method 500 begins with provide interface operation 502, where a spreadsheet application may provide (or cause to be provided) a user interface to a user. For example, similar to provide interface operations 202, 302 and 402, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., dynamic data component 112, associate component 114, hybrid component 116, attribute component 118, and operation component 120) to associate dynamic data and additional data with one or more cells of the spreadsheet.

At select cell operation 504, similar to select cell operations 204, 304 and 404, at least one cell may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application may provide a spreadsheet to a user, the spreadsheet including one or more sheets, each sheet having a plurality of rows and columns of cells. Cells may be selected by highlighting or otherwise identifying the cell or range of cells using a gesture, touch, mouse click, keyboard input, and the like.

At receive dynamic data operation 506, similar to receive dynamic data operation 306, dynamic data may be received, either automatically (e.g., based on a function) or by user selection. That is, in some aspects, operations may call dynamic data for association with a cell without requiring user input, e.g., operations such as 'data refresh,' 'import from such and such data source,' 'copy paste,' etc. In other aspects, a UX component may provide a user interface for receiving the dynamic data by a gesture, touch, mouse movement, keyboard input, and the like. In some aspects, in response to a selection of a cell, a menu may be provided for inserting or associating various objects (including dynamic data) with the selected cell. In other aspects, a user may indicate an intention to associate dynamic data with a selected cell by manually entering a function referencing the dynamic data in the selected cell (or a formula bar associated with the selected cell). In still further aspects, a user may open a mobile version of the spreadsheet application, may select the at least one cell and may record a video using a camera on the mobile device, with or without recording an audio track. In this case, a video file representative of the recorded video may automatically be selected for association with the at least one cell. In other cases, a user may record a video first, with or without recording an audio track, and may then open the mobile spreadsheet application to associate the recorded video with a cell or cells of the spreadsheet. In still other cases, a user may open a twitter feed on a mobile device, before or after opening a mobile spreadsheet application, and may associate a URL for the twitter feed with at least one cell of a spreadsheet. As should be appreciated, the user interface may receive dynamic data with one or more cells by any suitable means.

At associate dynamic data operation 508, similar to associate dynamic data operation 208, dynamic data may be associated with the selected cell of the spreadsheet. In aspects, upon receiving the selection of the at least one cell, a menu may be provided with various options for identifying a file locator and associating dynamic data. In other aspects, a special user interface may be provided (e.g., "iFrame") for associating dynamic data with the selected cell. For example, the menu and/or the iFrame interface may provide for browsing a local file structure or a remote storage location to identify a URL for the dynamic data. Alternatively, a globally unique name for the dynamic data may be identified. In further aspects, the menu and/or the iFrame interface may provide selections for anchoring the dynamic data to the cell or for referencing the dynamic data in a cell. As described above, dynamic data may be associated with a cell by any suitable means.

At receive data operation 510, data may be received in addition to the dynamic data. In some aspects, a UX component of a spreadsheet application may provide a user interface for receiving the additional data (e.g., by attachment, direct entry into a formula bar or cell, copy/paste, drag/drop, etc.). In still other aspects, the additional data may be a numeric value resulting from a function associated with the selected cell. In some cases, the additional data may include alphanumeric data (e.g., textual data, numeric data, formulas, and the like). Alternatively, additional data may include charts or any other type of data. In aspects, the additional data may be static data (e.g., non-moving data) or dynamic data (e.g., moving data). As should be appreciated, the additional data may comprise any data in any format.

In some aspects, the additional data may describe or be related to the content of the dynamic data and may be represented by attribute-value pairs (e.g., content attributes). For instance, referring back to the example of a video file of a television episode, additional data may describe or be related to the content of the video file, such as a title, credits, subtitles, reviews, star rating, etc., or any other information (e.g., a user's personal review, personal rating, comments, etc.). For instance, attribute "title" may have a value of "Charlie's Happy Day"; attribute "credits" may have multiple values for each of "producer", "editor," "cast," "crew," "writers," etc.; attribute "subtitles" may correspond to a text transcription synchronized with various portions of an audio track for the episode; attribute "reviews" may have multiple values corresponding to each review; attribute "star rating" may have a value of "4.2"; etc. In other examples, the additional data may include any other information for association with the video file in the cell (e.g., user's personal review, personal rating, comments, etc.).

As well, the additional data may be described by formatting attributes that may be represented by attribute-value pairs, e.g., "font size—11 pt."; "font color—red"; "font—Calibri"; etc. In other aspects, the additional data may not necessarily be represented by attribute-value pairs. For instance, the additional data may be a single numeric value that is the output of a formula (e.g., total revenue value, sum of a range of cell values, average value over a range of cell values, etc.). In still further aspects, layout attributes may define a relative arrangement and/or display of dynamic data, attributes and additional data. For instance, layout attributes may also be defined by attribute-value pairs, e.g., "alignment—top" or "progressive display—1", etc.

At optional create operation 512 (identified by dashed lines), a compound data type may be created to include the selected dynamic data and the additional data. For example, a hybrid component (e.g., hybrid component 116) of a spreadsheet application (e.g., spreadsheet application 110) may associate the additional data and the dynamic data in a structured manner, such as an array of values, a record with an array of fields, a table, an array of vectors, etc. As noted above, in some cases, the additional data may include content attributes (which may be described in terms of attribute-value pairs) and may be defined by formatting attributes (which may also be described in terms of attribute-value pairs). Additionally, attributes of the dynamic data may be represented in terms of attribute-value pairs and/or attribute-type pairs. In this case, a compound data type may be created, including the dynamic data (e.g., streaming data, an array of pixel values for rendering moving images and/or modulated data for encoding an audio track) with attributes (e.g., video attributes, image attributes, audio attributes, data attributes, etc.), additional data (e.g., information relating to the dynamic data, including content attributes and/or formatting attributes described by attribute-value pairs) and/or layout attributes (e.g., defining a relative layout between the dynamic data and the additional data within the cell) in a structured format. In some aspects, the compound data type may not include actual data representing the dynamic data, attributes, additional data and/or layout attributes, but the compound data type may include an array of fields with references or pointers to the actual data, which may be stored in a record in any suitable database or otherwise. As should be appreciated, different types of data (e.g., chart data, alphanumeric data, etc.) may be described by different sets of attribute-value pairs, but may also be represented within the structured format of a compound data type.

At optional associate operation 514 (identified by dashed lines), similar to associate dynamic data operations 208 and 508, the compound data type may be associated with the selected at least on cell of the spreadsheet. In some aspects, optional associate operation 514 may replace associate dynamic data operation 508. That is, in some cases, the dynamic data may not be associated with the selected cell prior to receiving the additional data, but both the dynamic data and the additional data may be associated with the selected cell at the same time as a compound data type. In other cases, a compound data type may be created with various empty fields (e.g., attributes names) and may be associated with a selected cell. Thereafter, the dynamic data and the additional data may be stored or referenced by the compound data type. As detailed above, the term "associate" may include any form of linking the compound data type to the selected cell (or a range of cells) within a spreadsheet. In aspects, a compound data type that is "associated" with a cell may be treated as an array of values within the cell.

For example, the compound data type may be anchored within the selected cell (or a range of cells). In this case, a file locator for the compound data type (e.g., URL, globally unique name, etc.) may be inserted into the selected cell or range of cells. When a compound data type is anchored to a cell, the compound data type (i.e., the dynamic data and the additional data represented by the compound data type) may move with the cell (or range of cells) when operations are performed on the spreadsheet. In further aspects, the compound data type may be referenced within the selected cell but may be allowed to float over the grid. In this case, operations may be performed on the compound data type and/or operations may be performed on the spreadsheet based on the compound data type, but the compound data type may or may not move with the selected cell. As should be appreciated, a compound data type may be associated with a cell or a range of cells by any suitable means.

At display operation 516, the additional data and a visual representation of the dynamic data may be displayed. For example, when a visual representation of the dynamic data is associated as fill (or background) for a cell or a range of cells, the additional data may be displayed over the visual representation. In some cases, a contrast between the visual representation and the additional data may be manipulated to optimize visibility of the additional data, either automatically or by user selection. Alternatively, when the visual representation is not associated as fill for the selected cell, the additional data and the visual representation may be arranged within the cell in any suitable alignment or layout. As should be appreciated, the additional data and the visual representation may be displayed according to any suitable alignment or layout, either automatically or based on user selection.

Additionally, at display operation 516, a visual representation of the dynamic data and the additional data may be fit to the cell size or the selected cell may be fit to a size appropriate for the visual representation and the additional data. In some cases, the amount of data associated with the compound data type that is displayed may be based on the cell size, and as a cell is resized, the amount of data displayed may dynamically change. Alternatively, a visual representation of the dynamic data and the additional data may be allowed to overlay additional cells of the spreadsheet. The above examples are provided for purposes of explanation only and should not be understood as limiting.

As should be appreciated, operations 502-516 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 6:
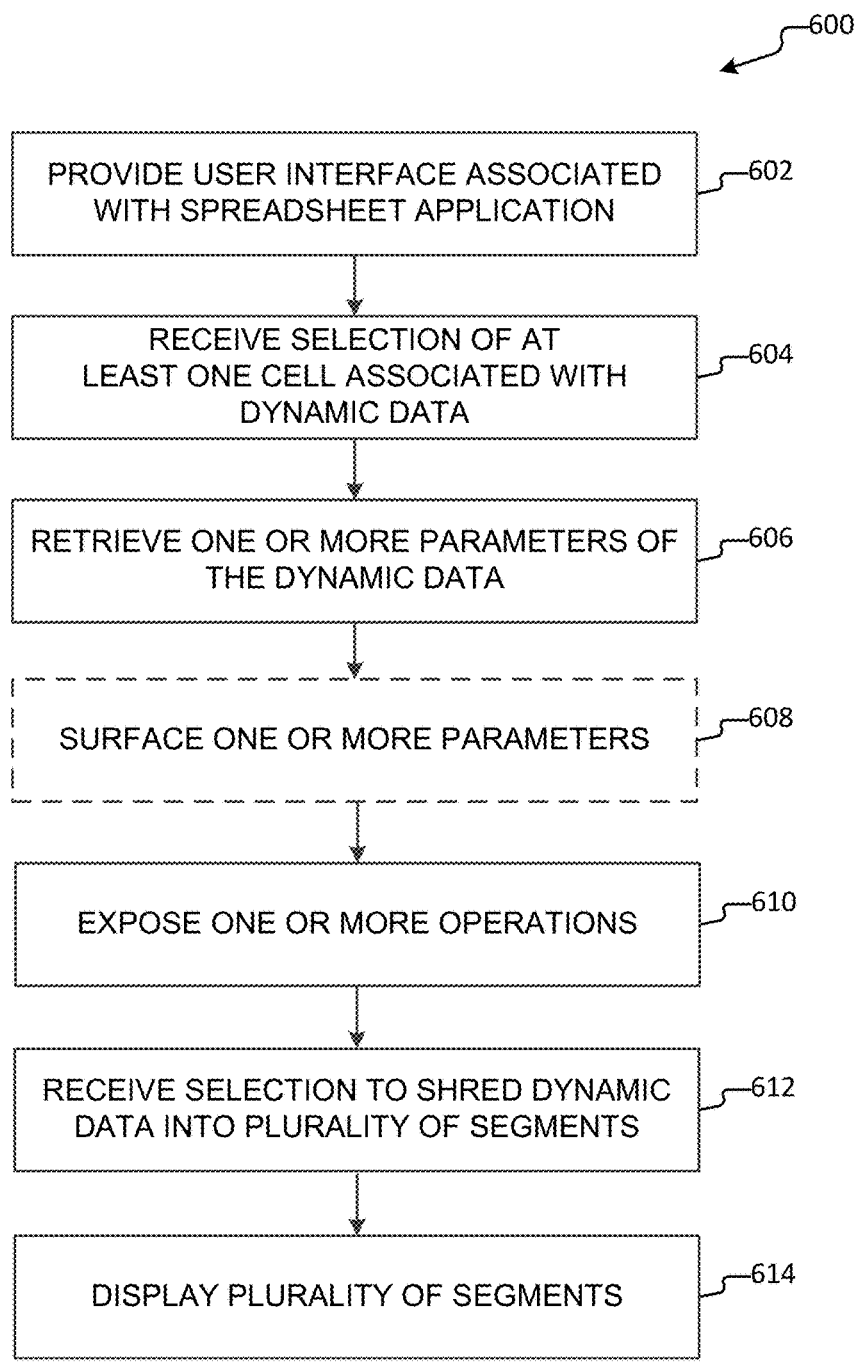
FIG. 6 illustrates a method for exposing one or more operations for performing on a video associated with one or more cells of a spreadsheet, according to an example embodiment.

FIG. 6 illustrates a method for exposing one or more operations for performing on a video associated with one or more cells of a spreadsheet, according to an example embodiment.

Method 600 begins with provide interface operation 602, where a spreadsheet application may provide (or cause to be provided) a user interface to a user. For example, similar to provide interface operations 202, 302, 402 and 502, a UX component may facilitate a user experience (UX) by providing a user interface (UI) of a spreadsheet application via a display. Selections and/or inputs may be received by the user interface based on gestures, touch, mouse movements, keyboard input, and the like. Additionally, the user interface may operate in conjunction or communication with one or more other components of the spreadsheet application (e.g., dynamic data component 112, associate component 114, hybrid component 116, attribute component 118, and operation component 120) to manipulate dynamic data associated with one or more cells of a spreadsheet.

At select cell operation 604, at least one cell having associated dynamic data may be selected, either automatically (e.g., based on a function) or by user selection. That is, in some aspects, operations may call (or select) a cell without requiring user input, e.g., operations such as 'data refresh,' 'import from such and such data source,' 'copy paste,' etc. In other aspects, a spreadsheet application may display a spreadsheet to a user, the spreadsheet including one or more sheets, each sheet having a plurality of rows and columns of cells. Cells having associated dynamic data may be selected by highlighting or otherwise identifying the cell or range of cells using a gesture, touch, mouse click, keyboard input, and the like.

At retrieve parameters operation 606, one or more parameters may be retrieved for the dynamic data associated with the selected cell or range of cells. In aspects, retrieve parameters operation 606 may be performed by an attribute component of a spreadsheet application. For example, in response to selecting a cell having associated dynamic data, parameters of the dynamic data may be identified. As noted above, dynamic data includes data for rendering moving or changing data (e.g., live data feeds, streaming video, streaming audio, etc.) and attributes characterizing the dynamic data (e.g., video attributes, image attributes, audio attributes, data attributes, etc.). For instance attributes may include resolution, aspect ratio, frame rate, bitrate, codec, creation date/time, title, duration, size, etc. In aspects, attributes may be appended as metadata to the dynamic data (e.g., appended to a video file or to streaming data). In this case, dynamic data may be extracted (e.g., retrieved) from a video file or streaming data and attributes may be extracted (e.g., retrieved) from metadata associated with the video file or streaming data.

In some cases, a compound data type including the dynamic data and the additional data may be associated with the selected cell. In this case, retrieve parameters operation 606 may retrieve one or more parameters for the dynamic data and/or additional data from the compound data type. For instance, the compound data type may include the dynamic data (e.g., live data feed, video data, streaming audio, streaming video, etc.), attributes (e.g., resolution, aspect ratio, frame rate, bitrate, codec, creation date/time, title, duration, size, etc.), additional data (e.g., reviews, subtitles, cast, crew, star rating, etc.), formatting attributes for additional data, and/or layout attributes (e.g., defining an alignment or layout for display of the dynamic data and additional data within a cell). As should be appreciated, a compound data type may store or reference the dynamic data and any type of additional data.

At optional surface parameters operation 608 (identified by dashed lines), dynamic data, attributes, additional data (e.g., including formatting attributes) and/or layout attributes (e.g., collectively "parameters") retrieved may be "surfaced" such that the parameters may be presented to a user in a readable format. In aspects, a user interface may be provided for presenting some or all of the identified parameters. For instance, a settings toolbar (e.g., settings toolbar 1318) may be provided that includes any number of tabs for viewing and manipulating various data or attributes. In one example, a video settings tab may display video attributes such as "resolution," "aspect ratio," "frame rate," etc. In another example, a video processing tab may display video attributes such as "codec" and "bitrate," as well as options to "shred" or "splice" the video file. Moreover, when a video is shredded into individual frames, image data may also be surfaced. For instance, the spreadsheet may surface the raw pixel data for each individual frame.

In other examples, tabs associated with the settings toolbar may provide other attributes, such as "creation date/time," "title," "duration," "size," and the like. In some cases, e.g., where both dynamic data and additional data are associated with a single cell, the settings toolbar may display additional data, including analyses by the spreadsheet engine, e.g., number of reviews (e.g., professional or personal), star rating (e.g., professional or personal), voice recognition data (e.g., identifying which scenes include which actors), sound recognition data (e.g., identifying a scene with a train in the background), time stamps for each scene, statistical changes in data (e.g., one or more points where a stock price fell more than a particular amount), etc. Additionally, layout attributes between a visual representation of the dynamic data and additional data may be displayed, such as contrast, alignment, background opacity or transparency, and the like. As should be appreciated, any parameter identified by retrieve parameters operation 606 may be displayed in any suitable interface.

At expose operation 610, one or more operations may be exposed to a user. The one or more operations may include operations for manipulating parameters of the dynamic data (or additional data) and/or operations for performing manipulations of the spreadsheet based at least in part on the one or more parameters. For example, UI controls (e.g., +/− controls) or input fields may be provided for manipulating the one or more parameters, e.g., the data and attributes detailed above. In this regard, a user may directly input values to adjust attributes up or down based on user preference. For instance, with reference to the attributes displayed by the settings tab, the values for "resolution," "aspect ratio," "frame rate," etc., may be adjusted by direct input and/or adjusted up or down using +/− controls. Additionally, video and/or image processing may be enabled by exposing operations for manipulating video data, image data, and the like. For instance, operations may be exposed for manipulating raw pixel data for individual frames of a video. For example, operations for changing the RGBA values directly in the cell (e.g., via a user interface) may be provided. In aspects, an array of pixel data or an array of records (e.g. a two-dimensional (2D) array of record types having four values for R, G, B, A) may be surfaced to enable a user to manipulate the image data. Additionally or alternatively, a "reset" button may be provided to return adjusted parameters back to an original version of the dynamic data. As should be appreciated, the above examples of parameters are not exhaustive and any parameter may be surfaced and adjusted based on one or more exposed operations.

In further examples, at expose operation 610, one or more operations for manipulating the spreadsheet based at least in part on the retrieved parameters may be exposed to a user. For example, in response to selection of a range of cells, a user interface may provide options for filtering or sorting the range of cells based on one or more parameters of associated dynamic data. For example, the range of cells may be sorted based on attributes such as durations of associated dynamic data (e.g., "Sort Longest to Shortest" or "Sort Shortest to Longest"), resolutions of associated dynamic data (e.g., "Sort Highest to Lowest" or "Sort Lowest to Highest"), creation dates of associated dynamic data (e.g., "Sort Newest to Oldest" or "Sort Oldest to Newest"), one or more artists in the associated dynamic data (e.g., alphabetically by artist), and the like. Options for filtering the range of cells may similarly be based on one or more parameters of associated dynamic data. As described above, dynamic data may be moving or changing data (e.g., streaming data, videos, etc.), characterized by attributes such as resolution, aspect ratio, frame rate, bitrate, codec, creation date/time, title, duration, size, etc. In aspects, the range of cells may be sorted based on any identifiable attribute of associated dynamic data.

At shred operation 612, a selection of an operation to shred the dynamic data may be received, either automatically or by user selection. For instance, a function may operate to automatically shred dynamic data called within a cell, e.g., using a processing algorithm of the spreadsheet application. Alternatively, a user interface (UI) control may be provided for receiving a user selection to shred the dynamic data. In aspects, as detailed above, dynamic data may be comprised of a number of segments, e.g., individual frames of a video, individual scenes of a video, individual packets of a data feed, individual time increments of a data feed, individual tracks of an audio file, etc. In response shred operation 610, the dynamic data may be "shredded" (or divided) into a plurality of segments.

For instance, with reference to a video (whether streamed or provided as a video file), the video may comprise a plurality of individual frames. Shred operation 610 may enable a user to display each individual frame as well as image data and/or image attributes associated with the frame. In aspects, in response to shredding a video file, the plurality of individual frames may be displayed within a UI element in any suitable array (e.g., linear, carousel, grid, etc.) for viewing and manipulating each of the frames. In some cases, an individual frame may be selected and removed from the plurality of frames associated with a first cell and cut/pasted or drag/dropped into a second cell, or an individual frame may be deleted from the array altogether. In other cases, the whole array may be "spilled" into a range of cells, e.g., with each frame spilling into (or being associated with) a different cell of the range of cells. Additionally, a new frame may be added to an array of frames by inserting the new frame into a selected position within the array.

In further aspects, when a video file is shredded, each frame may be analyzed by the spreadsheet application or by a service. For example, a service can analyze each frame of a data stream to identify people and then match those frames to a list of known people or photographs to return their names. The resulting values are an array of names, frame number, and possibly a photo. This array of information can be added to the video stream object or referenced via a calculation engine and spilled to other cells. In an advanced example, a service call may be made to identify and track an individual's head in a video (e.g., "Bob"). Based on the values returned from the service (e.g., which frame and where in the frame Bob is located), the frames may be analyzed to identify whenever Bob is laughing and an image of another individual's head (e.g., "Maria") may be inserted at the same location. In a further example, a service may be called to retrieve data when data appears incomplete. That is, where geo data within a compound data type includes an address and a zip code, a service may be called to retrieve a city, country, etc. Alternatively, a video may be streaming from YouTube® and a user may wish to retrieve more data regarding the video stream, e.g., a list of links to other videos, suggested videos, etc., and a call may be made back to the service to retrieve such data.

In another example, functions may be provided that extract a sequence, a time interval, etc., from a stream and return either an array (of images from a video, day data from a time series such as a health data stream, etc.) or a composite video snippet. For instance, for a 1-hour video that has three segments with "Bob" in them, the function may extract the three segments and return the video-shorts to cells A1:A3. In still another example, a video object may include identified people that were shot in different locations. Data associated with the video object may include two arrays of values, one including a listing of the people and the other including locations. By referencing a cell containing the video object, access to the arrays of people and locations is made available. For instance, a call such as "A1.Bob.Geo" may return that the shot of Bob was taken in "Pike Place." In still another example, a video may be playing in presentation application (e.g., PowerPoint®) and users may be voting in real time as the video plays. In this case, the video may be a compound object that is being read by a spreadsheet application (e.g., Excel®) and the votes may be returned in real time with timestamps, with the resulting array of data being charted in real time. Other examples are possible and the above explanations should not be understood to be limiting.

In some aspects, individual frames may be analyzed without displaying each frame. For instance, based on one or more algorithms (e.g., face, sound, object recognition algorithms, frame counters, color analysis algorithms, etc.) the spreadsheet application (or a service) may determine the number of frames, the number of frames having scenic views vs. the number of frames including humans or animals, frames including cats, frames that are darker, frames that are lighter, etc. In some cases, results of the analyses may be displayed to the user. Alternatively, a user may input a query (e.g., "Show me each frame that includes such and such actor") and the resulting frames or information may be returned to the user. When an analysis is done by a service, a "data refresh" type function call may be implemented to integrate calling the service in real time based on a user query.

With reference to a live data feed, the data feed may comprise a plurality of discrete segments of data. For instance, the live data feed may be divided temporally (e.g., every second, every minute, every hour, etc.), divided based on a threshold (e.g., all data points exceeding a threshold), divided based on a parameter (e.g., segments showing a positive slope), and the like. Shred operation 610 may enable a user to display each segment of a live data feed as well as data attributes associated with each data segment. In aspects, in response to shredding a live data feed, the plurality of individual data segments may be displayed within a UI element in any suitable arrangement (e.g., charted, tabular, etc.) for viewing and manipulating each of the segments. By way of a first example, with reference to a stock ticker, a data segment associated data values for a single trading day for a single stock may be extracted and displayed to a user (e.g., as a line graph or otherwise). Alternatively, a data segment associated with a group of stocks (e.g., a standard index or a custom group of stocks) may be extracted and displayed to a user (e.g., as a bar chart per stock, line graph of average prices-per-share, etc.). Further, each data segment representing a positive slope (e.g., increasing stock price) may be displayed over a day, a month, a year, etc.

In a second example, with reference to a Twitter® feed, data segments containing a particular word (e.g., not included in a hashtag), data segments posted on a particular day, data segments posted by a particular individual, etc., may be extracted and displayed to a user. In some cases, an individual data segment associated with a data feed may be selected and cut/pasted or drag/dropped into a second cell.

In other cases, the whole array of data segments may be "spilled" into a range of cells, e.g., with each segment spilling into (or being associated with) a different cell of the range of cells. As should be appreciated, a data feed may be shredded by any suitable means and any number of resulting data segments may be displayed to a user.

Additionally, as should be appreciated, data provided by a live data feed represents "real time" data. In this case, data associated with the live data feed may be fed into one or more functions of the spreadsheet, as individual data values (e.g., stock price for a particular stock at a particular time), data segments (e.g., average stock price for a custom group of stocks over the last hour), derived data (e.g., number of stocks trading over a certain stock price over a certain period), etc. That is, the live data feed may be fed into one or more functions of the spreadsheet, creating a dynamic spreadsheet that is continuously updated to provide current calculations and analytics. For example, live data that is fed into one or more functions may cause one or more operations to fire within the spreadsheet, e.g., "play an audio file of a bell when stock X reaches price Y," "send a text notification when stock X reaches price Y," "buy stock X when price hits Y," and the like.

With respect to streaming audio, the streaming audio is often provided as a plurality of tracks (or songs) which are transmitted continuously until a user "stops" the streaming audio. The tracks may or may not be related to the same artist(s), the same album, the same genre, etc. Alternatively, streaming audio may comprise a single track (e.g., a podcast) that plays until the end of the track and then automatically stops. In some cases, a single track may be subdivided into sub-tracks, representing segments of the single track (e.g., different presentations separated by a break, periodic sections, etc.) As should be appreciated, each track or sub-track of streaming audio may be associated with track attributes, such as a title, artist, narrator, duration, creation date, etc. Shred operation 610 may enable a user to display each track as well as audio data and/or audio attributes associated with the track. In aspects, in response to shredding streaming audio, the plurality of individual tracks may be displayed within a UI element in any suitable array (e.g., linear, carousel, grid, etc.) for viewing, playing and manipulating each of the tracks. In some cases, the array of audio tracks may be "spilled" into a range of cells, e.g., with each track spilling into (or being associated with) a different cell of the range of cells. Additionally, a new track may be added to an array of tracks by inserting the new track into a selected position within the array.

At perform operation 614, one or more operations may be performed. For instance, an operation may be performed on dynamic data and/or additional data associated with a selected cell. Alternatively, an operation on a range of cells may be performed based on parameters of dynamic data and/or additional data associated with the range of cells. Indeed, any of the operations described herein may be selected and performed. In aspects, a cell preview may further be provided such that changes may be viewed as they are implemented. Based on the preview, a user may "accept" changes before they are implemented. In this regard, a user may manipulate display of a visual representation of dynamic data and/or additional data associated with a cell, manipulate one or more parameters associated with dynamic data, manipulate the spreadsheet based on parameters of the dynamic data, etc.

As should be appreciated, operations 602-614 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 7A:
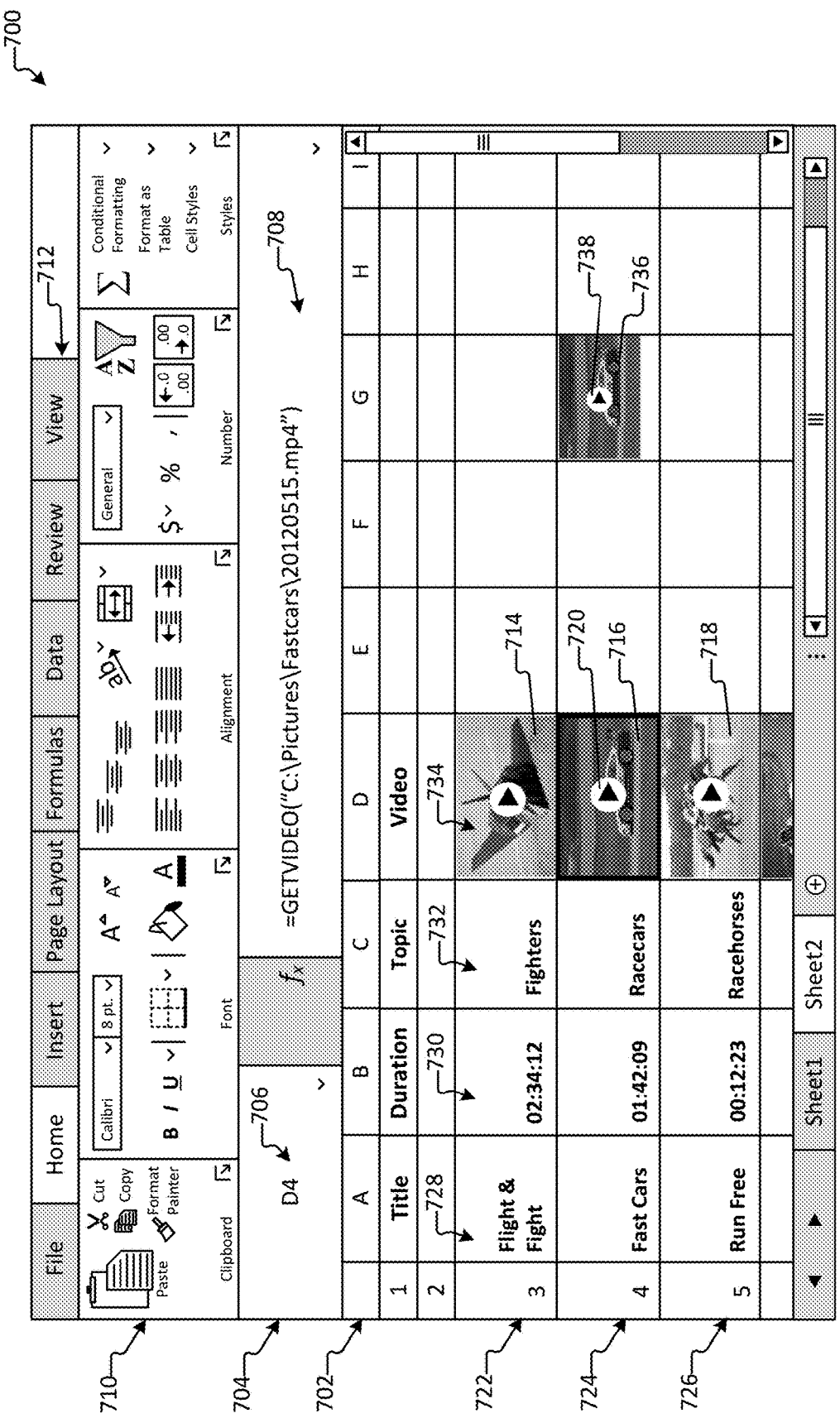
FIG. 7A illustrates an interface showing one or more videos associated with one or more cells of a spreadsheet, according to an example embodiment.

FIG. 7A illustrates an interface showing one or more videos associated with one or more cells of a spreadsheet, according to an example embodiment.

As illustrated, an interface 700 of a spreadsheet application is provided. Interface 700 includes a spreadsheet 702, a navigation ribbon 704 (including a cell identifier 706 and a formula bar 708), and a toolbar 710. Interface 700 further includes a plurality of tabs 712 for accessing various aspects and operations of the spreadsheet application. As illustrated, cell D4 is selected, as indicated by thickened and/or colored outlining of the cell border of cell D4. However, a selection of a cell may be indicated by any suitable means, such as highlighting an active cell with a bright treatment, shading, perceived three-dimensional enlargement, dimming background and inactive cells, and the like. As shown, a cell identifier 706 (e.g., "D4") for the selected cell is displayed in navigation ribbon 704. Additionally, formula bar 708 displays a function calling a file locator, e.g., fx=GETVIDEO("C:\Pictures\Fastcars\20120515.mp4") for the dynamic data (i.e., a video file 716) displayed within cell D4.

In some aspects, upon hovering over the dynamic data, various attributes associated with the video file 716 may be displayed (e.g., in a popup window) (not shown). For example, upon hovering over video file 716, a popup window may display the following attributes (not shown): name: Fastcars; type: MP4; size: 1.13 MB; created: May 15, 2012; duration: 01:42:09. As further illustrated, a visual representation of video file 716 is displayed in cell D4. As detailed above, the visual representation of a video file may be provided as any suitable identifier of the video file, e.g., an individual frame or image (shown), a "movie reel" icon (not shown), a play control 720 (shown), a special icon with metadata (not shown), a file name (not shown), etc. In this case, the visual representation of the video file 716 is "fit" to cell D4, e.g., the visual representation is bounded by the cell border of cell D4. Additionally, as compared to default-sized cells A2, B2 and C2, cell D4 has been resized such that both a cell height and a cell width have been increased to accommodate the visual representation. Similarly, each cell associated with column D (i.e., column 734) and rows 3-5 (rows 722, 724 and 726, respectively) has been resized to increase a cell height and a cell width so as to accommodate the visual representations of video files in cell D3, cell D4 and cell D5.

FIG. 7A also illustrates a play control 720 displayed over the visual representation of video file 716. In response to activating play control 720, video file 716 may be played. Similarly, play controls are displayed over visual representations for video files 714 and 718, respectively. As further illustrated by FIG. 7A, additional data describing video files 714, 716 and 718 is stored in cells within adjacent rows and/or columns. For example, in column A (i.e., column 728), cells A3, A4 and A5 contain data regarding the "titles" of the videos recorded in video files 714, 716, and 718, respectively. In column B (i.e., column 730), cells B3, B4 and B5 contain data regarding the "durations" of the videos recorded in video files 714, 716, and 718, respectively. In column C (i.e., column 732), cells C3, C4 and C5 contain data regarding the "topic" of the videos recorded in video files 714, 716, and 718, respectively.

In further aspects, as illustrated by FIG. 7A, a video file in one cell may be referenced by another cell. For instance, the function associated with cell G4 may be "fx=D4". In this case, the video file 716 represented in cell D4 is associated with cell G4 as video file 736. As illustrated, a visual representation of video file 736 includes play control 738 and is "fit horizontally" and aligned at the top of cell G4. Further, video file 716 in cell D4 is located by a URL in local storage, e.g., =GETVIDEO("C:\Pictures\Fastcars\20120515.mp4"). Based on the function in cell G4 (e.g., "=D4"), the video file 736 is located by the same URL. In still further aspects, a video file in a cell may be referenced in a function and may be displayed and/or played only when a condition of the function is satisfied.

As should be appreciated, the various devices, components, etc., described with respect to FIG. 7A are not intended to limit the systems and methods to the particular components described. Accordingly, additional topology configurations may be used to practice the methods and systems herein and/or some components described may be excluded without departing from the methods and systems disclosed herein.

Figure 7B:
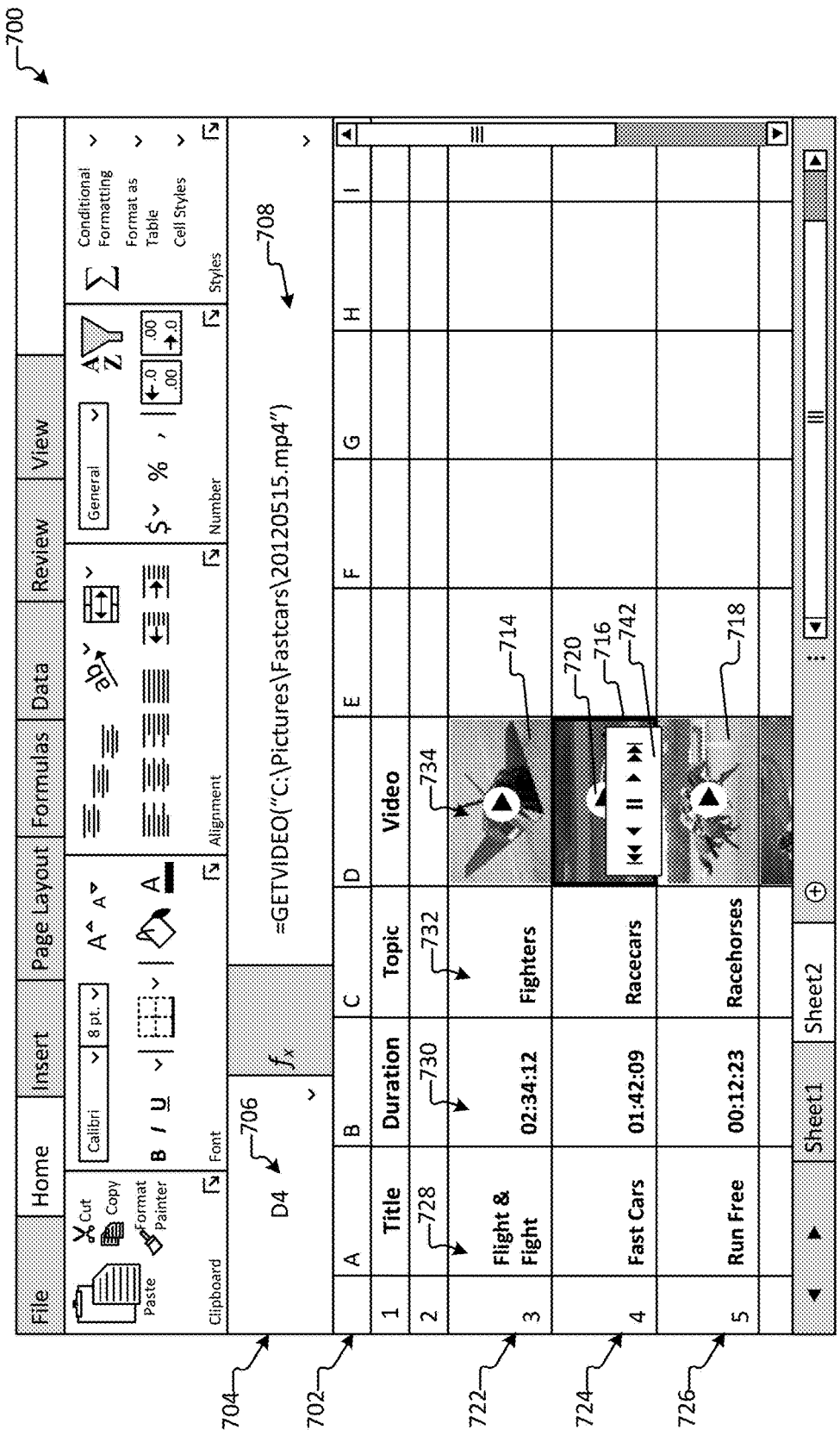
FIG. 7B illustrates an interface showing play controls for listening to one or more videos associated with one or more cells of a spreadsheet, according to an example embodiment.

FIG. 7B illustrates an interface showing play controls for listening to one or more videos associated with one or more cells of a spreadsheet, according to an example embodiment.

Similar to FIG. 7A, FIG. 7B shows interface 700 of a spreadsheet application including spreadsheet 702 and navigation ribbon 704, which includes cell identifier 706 and formula bar 708. As illustrated, cell D4 is selected, as indicated by thickened and/or colored outlining of the cell border of cell D4. As shown, a cell identifier 706 (e.g., "D4") for the selected cell is displayed in navigation ribbon 704. Additionally, formula bar 708 displays a function calling a file locator, e.g., fx=GETVIDEO("C:\Pictures\Fastcars\20120515.mp4"), for the video file (i.e., video file 716) displayed within cell D4. In some aspects, in response to hovering over play control 720, play bar 742 may be displayed. As illustrated, play bar 742 provides additional controls for listening to video file 716 For instance, in order from left to right, icons for "fast rewind" (or "skip back"), "rewind," "pause," "play," and "fast forward" (or "skip forward") are displayed on play bar 742. In aspects, play bar 742 may provide any suitable controls for listening to video file 716 and the displayed controls are not intended to limit the systems or methods described herein.

As should be appreciated, the various devices, components, etc., described with respect to FIG. 7B are not intended to limit the systems and methods to the particular components described. Accordingly, additional topology configurations may be used to practice the methods and systems herein and/or some components described may be excluded without departing from the methods and systems disclosed herein.

Figure 7C:
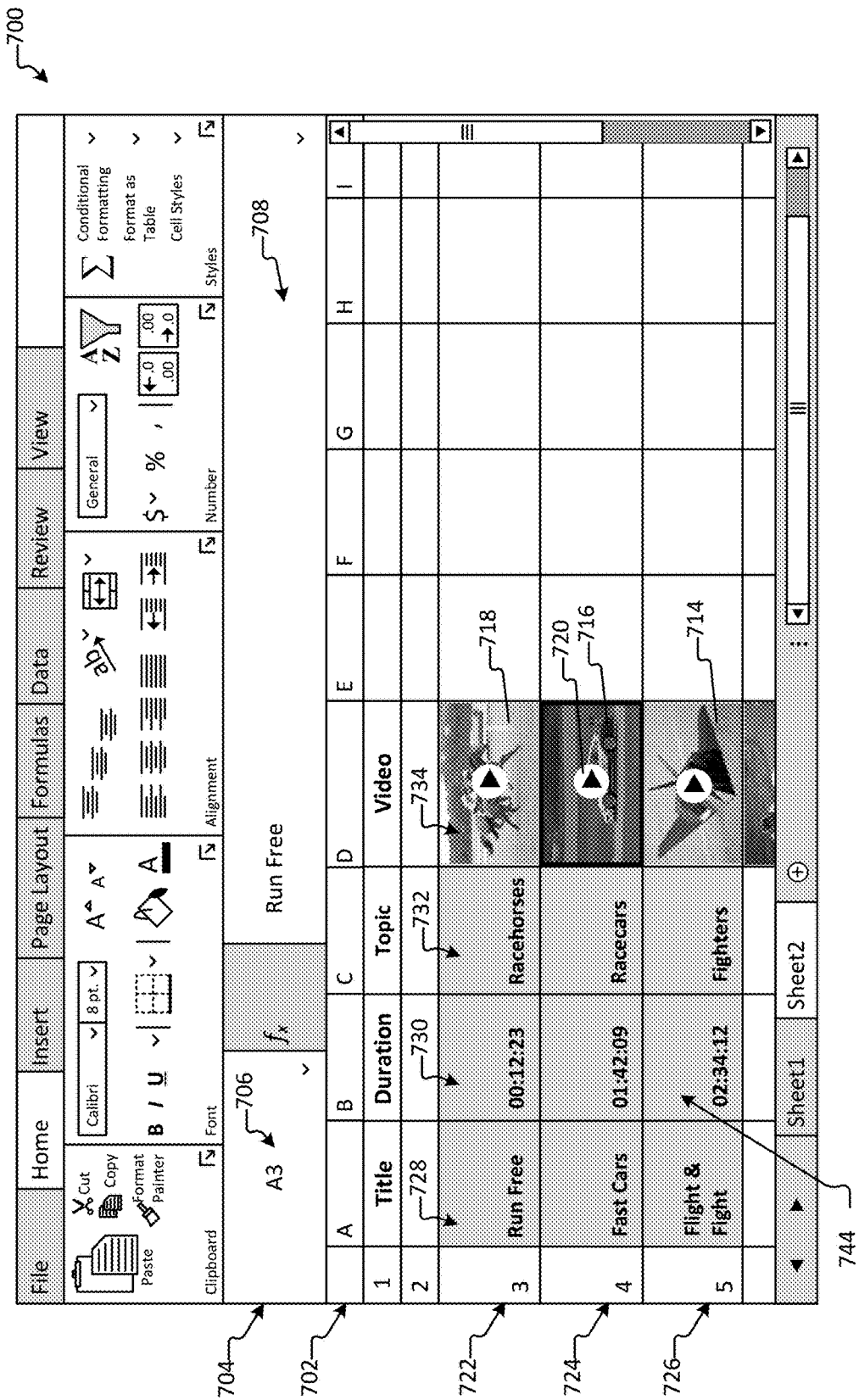
FIG. 7C illustrates an interface showing an outcome of a spreadsheet operation performed on a range of cells associated with a plurality of video files in a spreadsheet, according to an example embodiment.

FIG. 7C illustrates an interface showing an outcome of a spreadsheet operation performed on a range of cells associated with a plurality of video files in a spreadsheet, according to an example embodiment.

Similar to FIGS. 7A-7B, FIG. 7C shows interface 700 of a spreadsheet application including spreadsheet 702 and navigation ribbon 704, which includes cell identifier 706 and formula bar 708. In this case, a range of cells 744 (e.g., A3:D5) is shown as selected (e.g., by shading) and the cell at the top left corner of the range (i.e., cell A3) is identified by cell identifier 706 (e.g., "A3") in the navigation pane 704. Additionally, the contents of cell A3 (e.g., title "Run Free") is displayed in formula bar 708.

As detailed above, when video files are associated with cells of a spreadsheet application, operations performed on the spreadsheet, e.g., sort and filter operations, may also operate on the video files. As illustrated, a sort operation was performed on range 744 in which the data associated with cells in column 732 (i.e., cells C3, C4 and C5) was reverse alphabetically sorted and reordered such that the topic "Fighters" is now displayed in the bottom row of the range (e.g., row 726) below the topic "Racecars," which is displayed below the topic "Racehorses." As further illustrated, after performing the sort operation, data and video files associated with cells A3:D5 within the range 744 maintained relationships within their respective rows.

For example, cells including data relating to the topic "Fighters" were also reordered to the bottom row (e.g., row 726) of the range 744. That is, the cell including title "Flight & Fight," the cell including duration "02:34:12," and the cell including video file 714 have also been reordered from row 722 to row 726 in response to the sort operation. Similarly, the cell including title "Run Free," the cell including duration "00:12:23," and the cell including video file 718 have been reordered from row 726 to row 722 in response to the sort operation. As should be appreciated, previous ordering of the data in cell C4 with respect to data within cells C3 and C5, as well as reverse alphabetical reordering of the data within cells C3-05, place topic "Racecars" within row 724 in both cases. Accordingly, the cell including title "Fast Cars," the cell including duration "01:42:09," and the cell including video file 716 remain in row 724 following the sort operation.

Thus, as illustrated by FIG. 7C and disclosed herein, video files associated with cells of a spreadsheet move with the cells when operations are performed on the spreadsheet. In this regard, video files may move with associated cells and behave predictably (i.e., maintain established relationships with the data in other cells) when operations are performed on the spreadsheet.

As should be appreciated, the various devices, components, etc., described with respect to FIG. 7C are not intended to limit the systems and methods to the particular components described. Accordingly, additional topology configurations may be used to practice the methods and systems herein and/or some components described may be excluded without departing from the methods and systems disclosed herein.

Figure 7D:
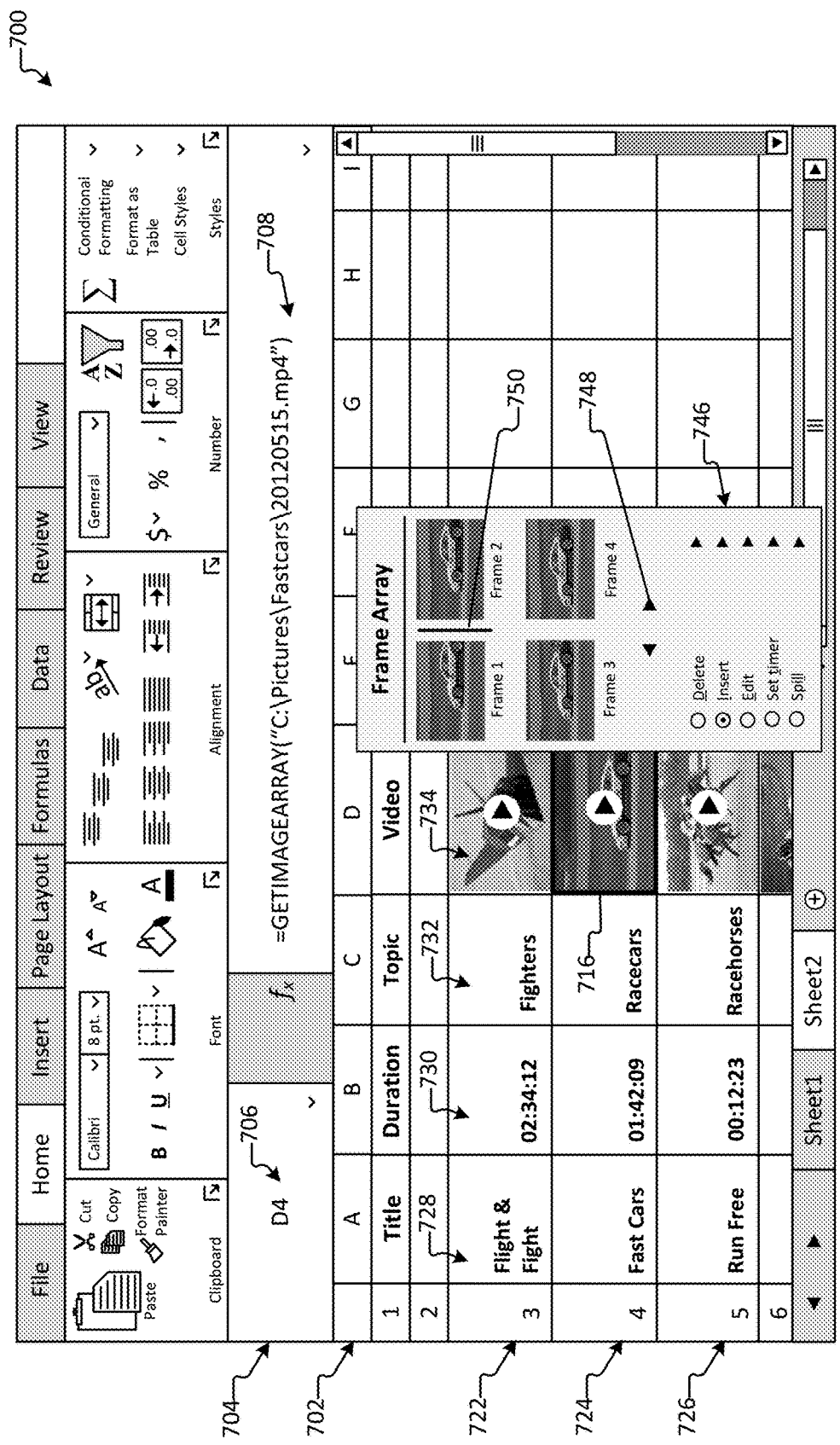
FIG. 7D illustrates an interface showing a UI element for viewing and interacting with a plurality of individual frames of a video associated with a cell in a spreadsheet, according to an example embodiment.

FIG. 7D illustrates an interface showing a UI element for viewing and interacting with a plurality of individual frames of a video associated with a cell in a spreadsheet, according to an example embodiment.

Similar to FIGS. 7A-7C, FIG. 7D shows interface 700 of a spreadsheet application including spreadsheet 702 and navigation ribbon 704, which includes cell identifier 706 and formula bar 708. As illustrated, cell D4 is selected, as indicated by thickened and/or colored outlining of the cell border of cell D4. As shown, a cell identifier 706 (e.g., "D4") for the selected cell is displayed in navigation ribbon 704. Additionally, formula bar 708 displays a function calling an array of individual frames for video file 716, e.g., fx=GETIMAGEARRAY("C:\Pictures\Fastcars\20120515.mp4")) associated with cell D4.

FIG. 7D illustrates user interface 746 displaying the array of individual frames for video 716. As detailed above, a video file may be shredded into individual frames (e.g., images). For instance, operator "=GETIMAGEARRAY" when used in conjunction with a file locator for a video file may shred the video into its constituent frames and display the individual frames in an array, e.g., via a user interface 746. In other aspects, the spreadsheet may receive selection of an option for shredding a video file (e.g., within a settings toolbar, not shown) and may provide user interface 746 for viewing and/or manipulating the array of individual frames. As illustrated, user interface 746 displays each of the plurality of individual frames associated with video file 716 in a grid configuration. As detailed above, user interface 746 may display the plurality of individual frames in any suitable configuration, e.g., linear, carousel, etc.

User interface 746 may further provide options for performing operations on the plurality of individual frames. For instance, a "Delete" option may be provided for removing one or more individual frames from the array. In aspects, in response to selection of the "Delete" option, a secondary interface may open for selecting one or more of the individual frames for removal from the array and, in some cases, a confirmation to remove the selected one or more individual frames. User interface 746 may also provide an "Insert" option for adding one or more individual frames to the array. Translation control 748 enables a user to translate through the array of individual frames to a position (identified by place marker 750) for inserting a new frame. In aspects, in response to selection of the "Insert" option, a secondary interface may open for finding and associating file locator(s) for the new frame (e.g., image) with the selected cell.

User interface 746 may further provide an "Edit" option for manipulating one or more individual frames of the array. In aspects, in response to selection of the "Edit" option, a secondary formatting interface may open for surfacing one or more image attributes for the plurality of individual frames, for example, similar to settings toolbar 1318 illustrated by FIG. 13. Additionally, the secondary formatting interface may expose one or more operations, enabling a user to manipulate image data and/or image attributes of the plurality of individual frames. For instance, operations may be exposed to enable image processing of raw pixel data for individual frames of a video. For example, operations for changing the RGBA values directly in the cell (e.g., via a user interface) may be provided. In aspects, an array of pixel data or an array of records (e.g. a two-dimensional (2D) array of record types having four values for R, G, B, A) may be surfaced to enable a user to manipulate the image data.

User interface 746 may also include a "Set timer" option for cycling display of each of the plurality of individual frames one at a time within cell D4. In aspects, the timer may cycle on a default schedule in response to selection of the "Set timer" option. Alternatively, in response to selection of the "Set timer" option, a secondary timer interface may open to set a custom cycle time. In some aspects, the "Set timer" option may also provide animation features for cycling, such as fade out and the like.

In still further aspects, a "Spill" option may be provided by user interface 746. The Spill option may allow a user to "spill" the array of individual frames into separate cells. For example, upon selection of the Spill option, a secondary interface may open for selecting a range of cells into which the array of individual frames should be spilled. In aspects, each frame of the array of individual frames may be spilled and then associated with a cell among the range of selected cells. In alternative options (not shown), a range of cells having associated images may be selected and an option to condense the images into an array of individual frames to create a video may be provided. The above examples of options for viewing and interacting with a plurality of individual frames of a video file are not intended to be exhaustive and should not be understood to be limiting.

As should be appreciated, the various devices, components, etc., described with respect to FIG. 7D are not intended to limit the systems and methods to the particular components described. Accordingly, additional topology configurations may be used to practice the methods and systems herein and/or some components described may be excluded without departing from the methods and systems disclosed herein.

Figure 7E:
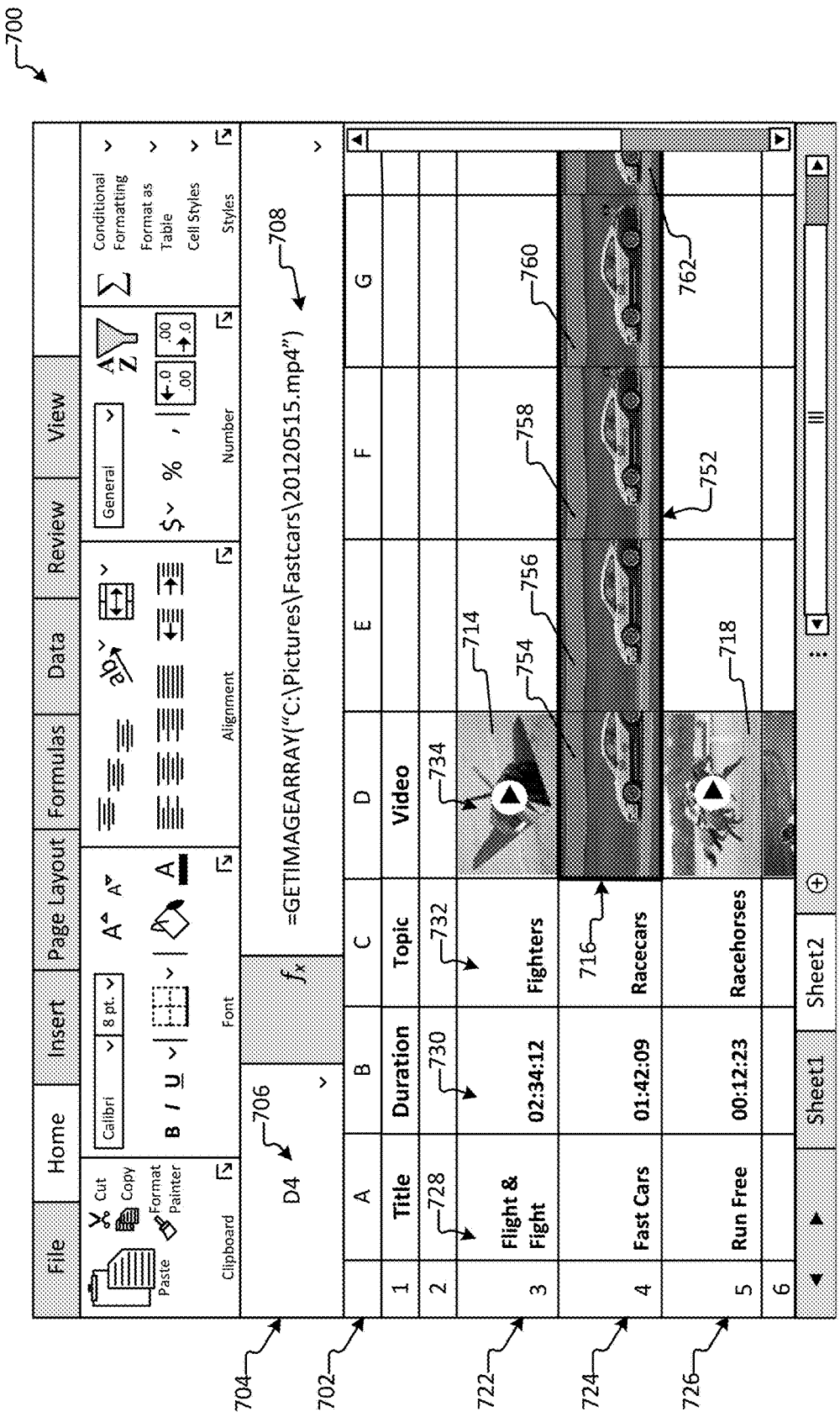
FIG. 7E illustrates an interface showing a plurality of individual frames of a video spilled into a range of cells of a spreadsheet, according to an example embodiment.

FIG. 7E illustrates an interface showing a plurality of individual frames of a video spilled into a range of cells of a spreadsheet, according to an example embodiment.

Similar to FIGS. 7A-7D, FIG. 7E shows interface 700 of a spreadsheet application including spreadsheet 702 and navigation ribbon 704, which includes cell identifier 706 and formula bar 708. In this case, a range of cells 752 (e.g., D4:H4) is shown as selected (e.g., as indicated by thickened and/or colored outlining of cells D4:H4) and the cell at the left of the range (i.e., cell D4) is identified by cell identifier 706 (e.g., "D4") in the navigation pane 704. Additionally, the contents of cell D4, e.g., fx=GETIMAGEARRAY("C: \Pictures\Fastcars\20120515.mp4"), for the video file (i.e., video file 716) is displayed within formula bar 708 for cell D4. Alternatively, functions for retrieving an array of images for a video may include parameters to specify items such as array size or instructions regarding how to shred the video. For instance, a function may specify shredding the video to provide one frame for every ten seconds of video, or dividing the entire video into fifty frames, or retrieving frames for an array of time markers, etc. For instance, the following function specifies that the video should be shredded into an array of 100 equally-spaced frames (i.e., divide the video length by 100 and retrieve one frame for each segment): =GETIMAGEARRAY("C:\videos\ myvideo.mp4", 100). Another example provides for shredding the video to provide one frame for every one minute of video: =GETIMAGEARRAY("C:\videos\myvideo.mp4", 1, 1). Other examples are possible and the above-detailed examples should not be understood as limiting.

In aspects, as described above, a "Spill" option may be provided by user interface 746. The Spill option may allow a user to "spill" the array of individual frames associated with video file 716 into separate cells. For example, upon selection of the Spill option, a secondary interface (not shown) may open for selecting a range of cells (e.g., range of cells 752) into which the array of individual frames should be spilled. As illustrated, frames 754-762 have each been spilled and then associated with a cell among the range of cells 752. As illustrated, each of the individual frames is slightly different, showing progress of an automobile as it travels along a speedway.

As should be appreciated, the various devices, components, etc., described with respect to FIG. 7E are not intended to limit the systems and methods to the particular components described. Accordingly, additional topology configurations may be used to practice the methods and systems herein and/or some components described may be excluded without departing from the methods and systems disclosed herein.

Figure 8A:
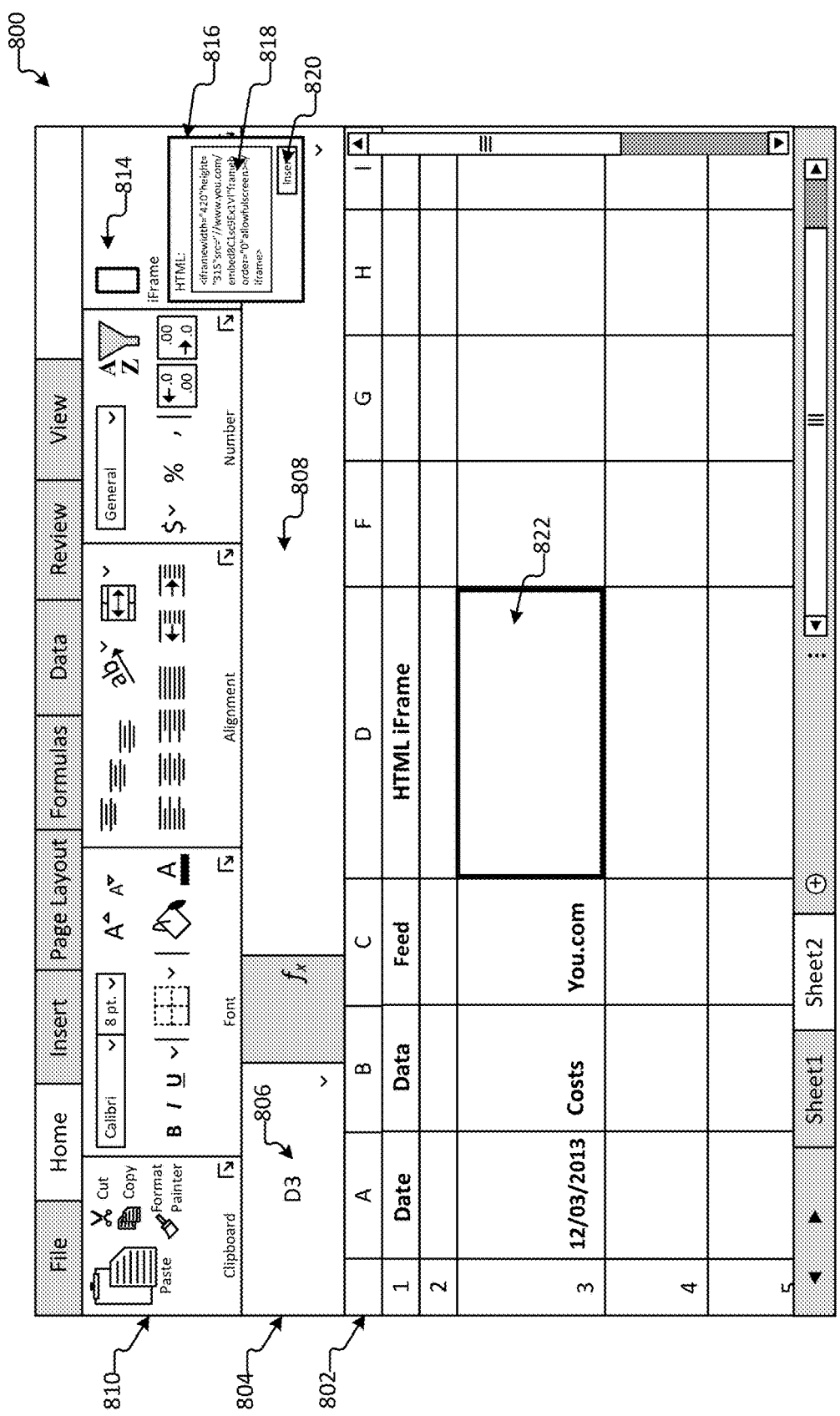
FIG. 8A illustrates an interface for associating streaming data with a cell, according to an example embodiment.

FIG. 8A illustrates an interface for associating streaming data with a cell, according to an example embodiment.

As illustrated, an interface 800 of a spreadsheet application is provided. Interface 800 includes a spreadsheet 802, a navigation ribbon 804 (including a cell identifier 806 and a formula bar 808), and a toolbar 810. As illustrated, cell D3 is selected, as indicated by thickened and/or colored outlining of the cell border of selected cell 822. As shown, cell identifier 806 (e.g., "D3") for the selected cell 822 is displayed in navigation ribbon 804. Additionally, formula bar 808 displays the contents of selected cell 822, which is empty.

In aspects, an iFrame interface 816 may be provided in toolbar 810 and may enable association of streaming data with selected cell 822 (e.g., cell D3). For example, iFrame interface 816 may be displayed upon hovering over or right clicking an iFrame icon 814. In some aspects, iFrame interface 816 may be provided in a mobile spreadsheet application and may enable association of streaming data with a selected cell using a mobile device (not shown). IFrame interface 816 may further provide an input field 818 for referencing a URL for the streaming data. As illustrated, a URL, along with size attributes for displaying the streaming data (e.g., frame width and height), have been entered into input field 818, e.g., <iframewidth="420"height="315"src="//www.you.com/embed/8C1sc9Ex1VI"frameborder="0" a llowfulscreen></iframe>. As illustrated, iFrame interface 816 further includes an "Insert" control 820, for inserting the streaming data into the selected cell 822 (e.g., cell D3). As should be appreciated, additional examples for associating streaming data with a cell are possible (e.g., entering the URL and the size attributes into the selected cell 822 or formula bar 808) and the above examples are offered for purposes of explanation and should not be understood as limiting.

As should be appreciated, the various devices, components, etc., described with respect to FIG. 8A are not intended to limit the systems and methods to the particular components described. Accordingly, additional topology configurations may be used to practice the methods and systems herein and/or some components described may be excluded without departing from the methods and systems disclosed herein.

Figure 8B:
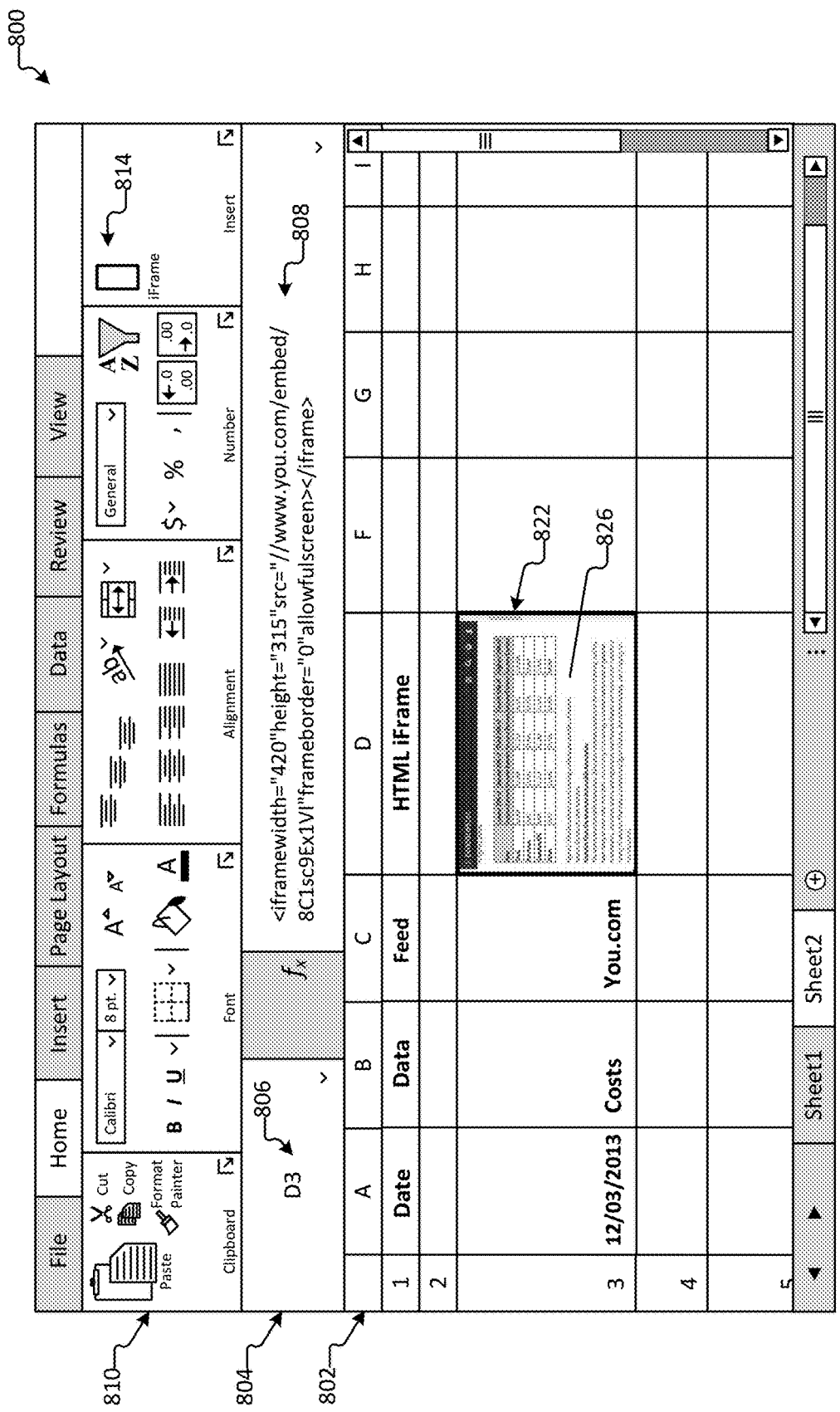
FIG. 8B illustrates an interface showing streaming data associated with a cell, according to an example embodiment.

FIG. 8B illustrates an interface showing streaming data associated with a cell, according to an example embodiment.

As illustrated, an interface 800 of a spreadsheet application is provided. Interface 800 includes a spreadsheet 802, a navigation ribbon 804 (including a cell identifier 806 and a formula bar 808), and a toolbar 810. As illustrated, cell D3 is selected, as indicated by thickened and/or colored outlining of the cell border of selected cell 822. As shown, cell identifier 806 (e.g., "D3") for the selected cell 822 is displayed in navigation ribbon 804. Additionally, formula bar 808 displays the contents of selected cell 822, which now displays the URL and the size attributes entered into the input field 818 (not shown) of iFrame interface 816 (not shown): <iframewidth="420"height="315"src="//www.you.com/embed/8C1sc9Ex1VI" frameborder="0" a llowfulscreen></iframe>. Selected cell 822 now displays a frame 826 of streaming data, e.g., a chart of data and streaming text.

As should be appreciated, the various devices, components, etc., described with respect to FIG. 8B are not intended to limit the systems and methods to the particular components described. Accordingly, additional topology configurations may be used to practice the methods and systems herein and/or some components described may be excluded without departing from the methods and systems disclosed herein.

Figure 9A:
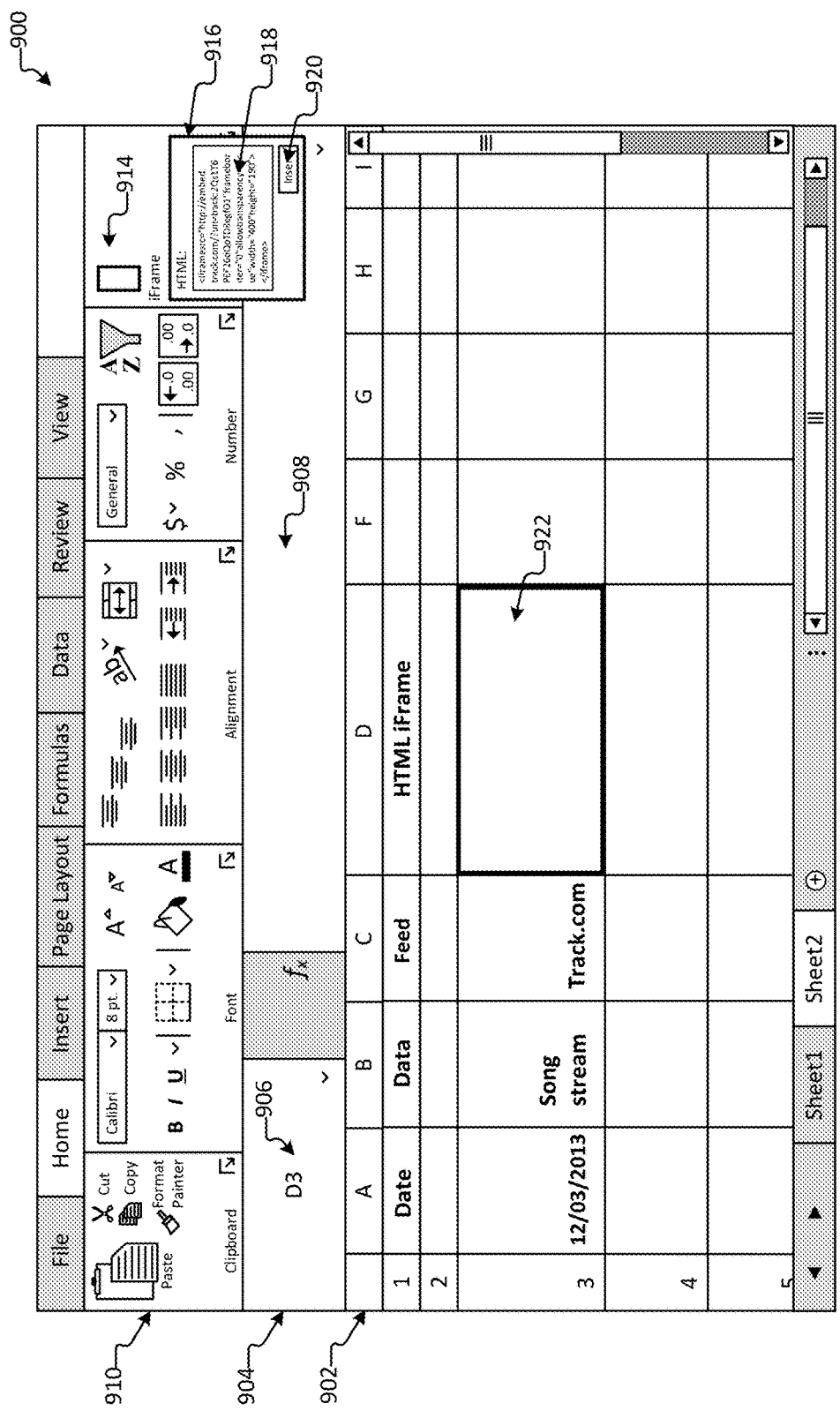
FIG. 9A illustrates an interface for associating streaming audio with a cell, according to an example embodiment.

FIG. 9A illustrates an interface for associating streaming audio with a cell, according to an example embodiment.

As illustrated, similar to FIG. 8A, an interface 900 of a spreadsheet application is provided. Interface 900 includes a spreadsheet 902, a navigation ribbon 904 (including a cell identifier 906 and a formula bar 908), and a toolbar 910. As illustrated, cell D3 is selected, as indicated by thickened and/or colored outlining of the cell border of selected cell 922. As shown, cell identifier 906 (e.g., "D3") for the selected cell 922 is displayed in navigation ribbon 904. Additionally, formula bar 908 displays the contents of selected cell 922, which is empty.

In aspects, an iFrame interface 916 may be provided in toolbar 910 and may enable association of streaming audio with selected cell 922 (e.g., cell D3). For example, iFrame interface 916 may be displayed upon hovering over or right clicking an iFrame icon 914. In some aspects, iFrame interface 916 may be provided in a mobile spreadsheet application and may enable association of streaming audio with a selected cell using a mobile device (not shown). IFrame interface 916 may further provide an input field 918 for referencing a URL for the streaming audio. As illustrated, a URL, along with attributes for displaying the streaming audio (e.g., frame width, height and transparency), have been entered into input field 918, e.g., <iframesrc="http://embed.track.com/?uri=track:2Qs1T6-PEF26dQoTD8egfO1"frameborder="0" a llowtransparency="true" width="400"height="190"></iframe>. As illustrated, iFrame interface 916 further includes an "Insert" control 920, for inserting the streaming audio into the selected cell 922 (e.g., cell D3). As should be appreciated, additional examples for associating streaming audio with a cell are possible (e.g., entering the URL and attributes into the selected cell 922 or formula bar 908) and the above examples are offered for purposes of explanation and should not be understood as limiting.

As should be appreciated, the various devices, components, etc., described with respect to FIG. 9A are not intended to limit the systems and methods to the particular components described. Accordingly, additional topology configurations may be used to practice the methods and systems herein and/or some components described may be excluded without departing from the methods and systems disclosed herein.

Figure 9B:
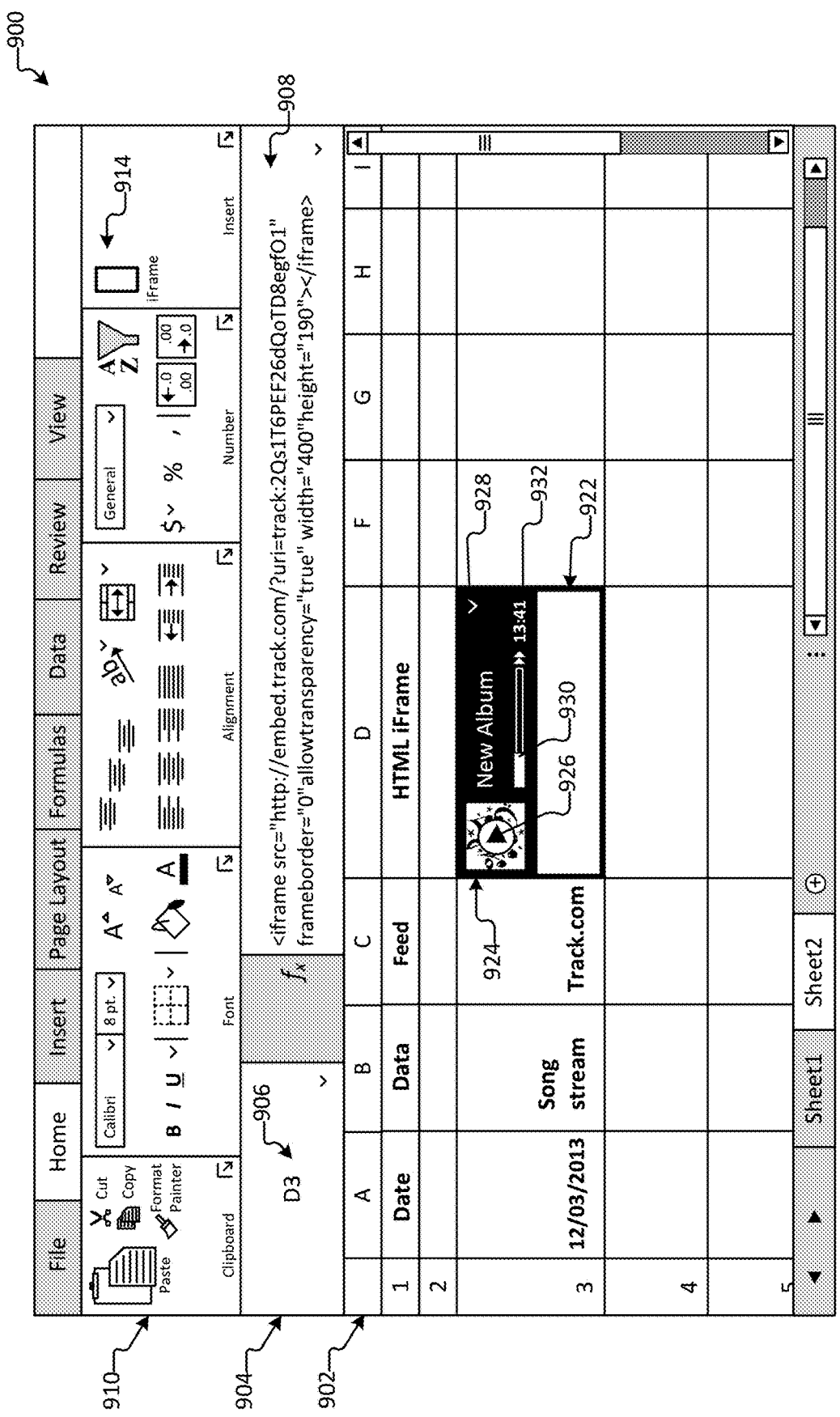
FIG. 9B illustrates an interface showing a condensed view of a visual representation of streaming audio associated with a cell, according to a first example embodiment.

FIG. 9B illustrates an interface showing a condensed view of a visual representation of streaming audio associated with a cell, according to a first example embodiment.

As illustrated, similar to FIG. 8B, an interface 900 of a spreadsheet application is provided. Interface 900 includes a spreadsheet 902, a navigation ribbon 904 (including a cell identifier 906 and a formula bar 908), and a toolbar 910. As illustrated, cell D3 is selected, as indicated by thickened and/or colored outlining of the cell border of selected cell 922. As shown, cell identifier 906 (e.g., "D3") for the selected cell 922 is displayed in navigation ribbon 904. Additionally, formula bar 908 displays the contents of selected cell 922, which now displays the URL and the attributes entered into the input field 918 (not shown) of iFrame interface 916 (not shown): <iframesrc="http://embed.track.com/?uri=track:2Qs1T6PEF26dQoTD8egfO1" frameborder="0" a llowtransparency="true" width="400"height="190"></iframe>.

In this case, upon associating streaming audio with selected cell 922, a visual representation of the streaming audio is displayed in selected cell 922. As illustrated, the visual representation is an interactive user interface (UI) element 924. Additionally, as shown, interactive UI element 924 is fit horizontally within selected cell 922, e.g., interactive UI element 924 has the same width as selected cell 922 but has a smaller height than selected cell 922. The interactive UI element 924 comprises a play icon 926, which may be selected for playing the streaming audio from selected cell 922. Additionally, interactive UI element 924 includes a progress bar 930, which displays an indication of a progress of playing the streaming audio (e.g., an album) in relation to a duration 932 of the streaming audio (e.g., a duration of 13 minutes and 41 seconds). Additionally, interactive UI element 924 displays an expand icon 928 for expanding interactive UI element 924 from a condensed view (shown) to an expanded view (not shown).

As should be appreciated, the various devices, components, etc., described with respect to FIG. 9B are not intended to limit the systems and methods to the particular components described. Accordingly, additional topology configurations may be used to practice the methods and systems herein and/or some components described may be excluded without departing from the methods and systems disclosed herein.

Figure 9C:
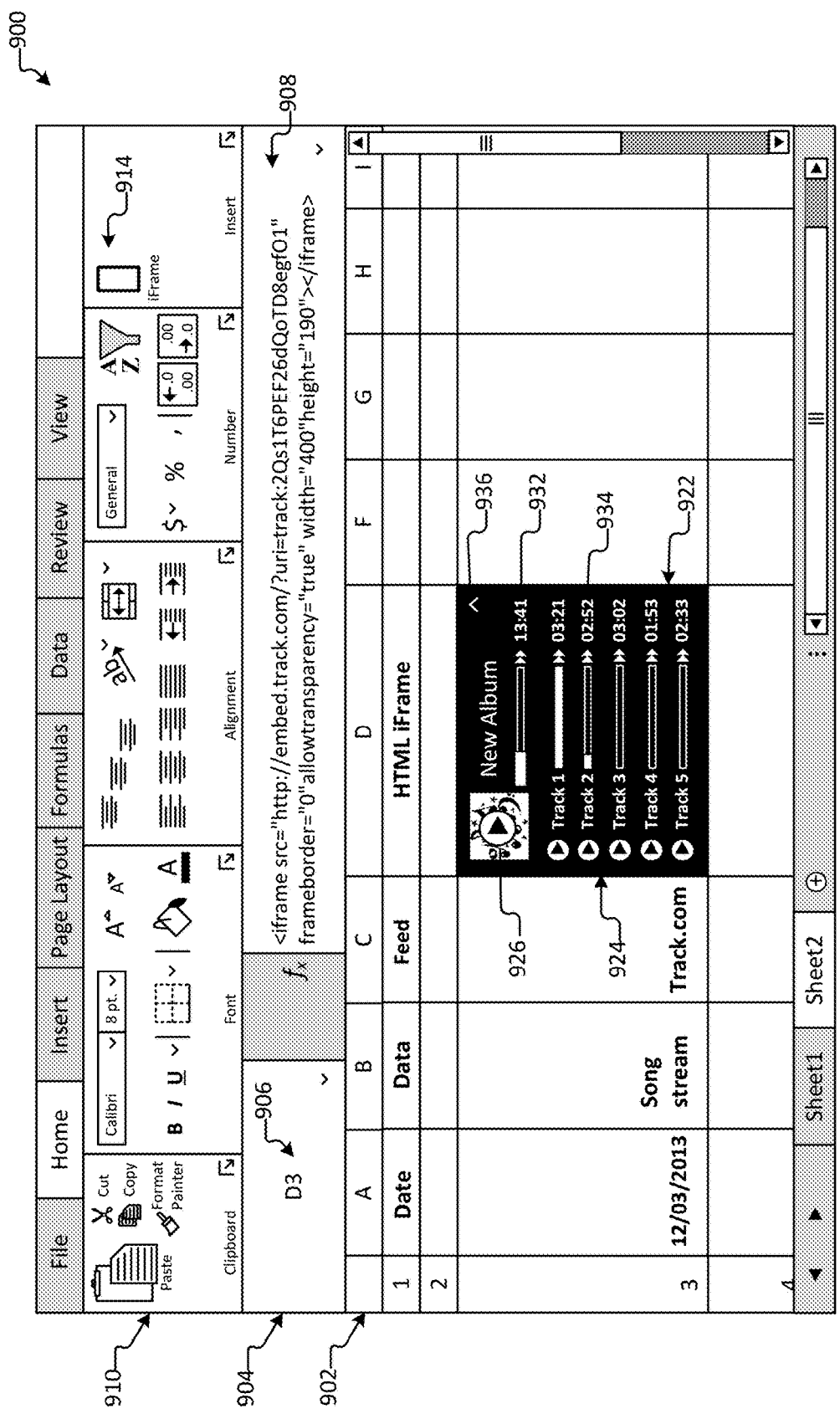
FIG. 9C illustrates an interface showing an expanded view of a visual representation of streaming audio associated with a cell, according to a first example embodiment.

FIG. 9C illustrates an interface showing an expanded view of a visual representation of streaming audio associated with a cell, according to a first example embodiment.

As illustrated, similar to FIG. 9B, an interface 900 of a spreadsheet application is provided. Interface 900 includes a spreadsheet 902, a navigation ribbon 904 (including a cell identifier 906 and a formula bar 908), and a toolbar 910. As illustrated, cell D3 is selected, as indicated by thickened and/or colored outlining of the cell border of selected cell 922. As shown, cell identifier 906 (e.g., "D3") for the selected cell 922 is displayed in navigation ribbon 904. Additionally, formula bar 908 displays the contents of selected cell 922, which now displays the URL and the attributes entered into the input field 918 (not shown) of iFrame interface 916 (not shown): <iframesrc="http://embed.track.com/?uri=track:2Qs1T6PEF26dQoTD8egfO1" frameborder="0" allowtransparency="true" width="400"height="190"></iframe>.

In this case, FIG. 9C shows an expanded view of the interactive user interface (UI) element 924. As shown, the expanded view of interactive UI element 924 is fit both horizontally and vertically (i.e., simply referred to as "fit") within selected cell 922, e.g., interactive UI element 924 has the same width and height as selected cell 922. The expanded view of interactive UI element 924 comprises a play icon 926, which may be selected for playing the streaming audio from selected cell 922. Additionally, the expanded view of interactive UI element 924 includes progress bar 930 (not labeled), which displays an indication of a progress of playing the streaming audio (e.g., an album) in relation to duration 932 of the streaming audio (e.g., a duration of 13 minutes and 41 seconds). In this case, the expanded view of interactive UI element 924 displays a track indicator 934 for each track (e.g., each song) associated with the streaming audio (e.g., album). The track indicator 934 may include a play icon for each track (not labeled), which enables each track to be played from within selected cell 922. Additionally, track indicator 934 may include a progress bar for each track (not labeled) and a duration for each track (not labeled). Additionally, the expanded view of interactive UI element 924 includes a condense icon 936 for condensing interactive UI element 924 from the expanded view (shown) to the condensed view (not shown).

As should be appreciated, the various devices, components, etc., described with respect to FIG. 9C are not intended to limit the systems and methods to the particular components described. Accordingly, additional topology configurations may be used to practice the methods and systems herein and/or some components described may be excluded without departing from the methods and systems disclosed herein.

Figure 9D:
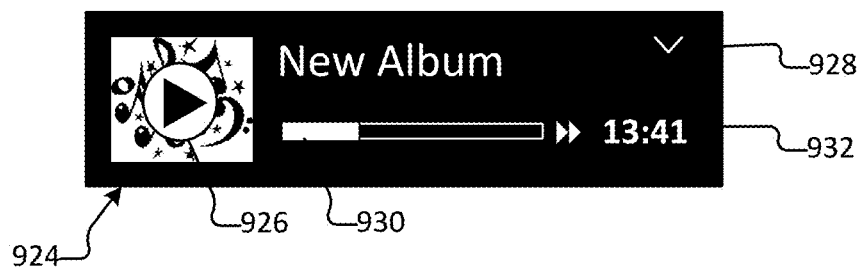
FIG. 9D illustrates an enlarged representation of the condensed view of a visual representation of streaming audio, according to a second example embodiment.

FIG. 9D illustrates an enlarged representation of the condensed view of a visual representation of streaming audio, according to a second example embodiment.

As illustrated, the enlarged representation of the interactive UI element 924 comprises a play icon 926, which may be selected for playing the streaming audio from selected cell 922 (not shown). Additionally, the enlarged representation of the condensed view of interactive UI element 924 includes a progress bar 930, which displays an indication of a progress of playing the streaming audio (e.g., an album) in relation to a duration 932 of the streaming audio (e.g., a duration of 13 minutes and 41 seconds). Additionally, the enlarged representation of the condensed view of the interactive UI element 924 displays an expand icon 928 for expanding interactive UI element 924 from a condensed view (shown) to an expanded view (not shown).

As should be appreciated, the various devices, components, etc., described with respect to FIG. 9D are not intended to limit the systems and methods to the particular components described. Accordingly, additional topology configurations may be used to practice the methods and systems herein and/or some components described may be excluded without departing from the methods and systems disclosed herein.

Figure 9E:
FIG. 9E illustrates an enlarged representation of the expanded view of a visual representation of streaming audio, according to a second example embodiment.

FIG. 9E illustrates an enlarged representation of the expanded view of a visual representation of streaming audio, according to a second example embodiment.

Similar to FIG. 9C, an enlarged representation of the expanded view of interactive UI element 924 comprises a play icon 926, which may be selected for playing the streaming audio from selected cell 922 (not shown). Additionally, the enlarged representation of the expanded view of interactive UI element 924 includes progress bar 930, which displays an indication of a progress of playing the streaming audio (e.g., an album) in relation to duration 932 of the streaming audio (e.g., a duration of 13 minutes and 41 seconds). In this case, the enlarged representation of expanded view of interactive UI element 924 displays a track indicator 934 for each track (e.g., each song) associated with the streaming audio (e.g., album). The track indicator 934 may include a play icon for each track (not labeled), which enables each track to be played from within selected cell 922 (not shown). Additionally, track indicator 934 may include a progress bar for each track (not labeled) and a duration for each track (not labeled). The enlarged representation of the expanded view of interactive UI element 924 also includes a condense icon 936 for condensing interactive UI element 924 from the expanded view (shown) to the condensed view (not shown).

As should be appreciated, the various devices, components, etc., described with respect to FIG. 9E are not intended to limit the systems and methods to the particular components described. Accordingly, additional topology configurations may be used to practice the methods and systems herein and/or some components described may be excluded without departing from the methods and systems disclosed herein.

Figure 10A:
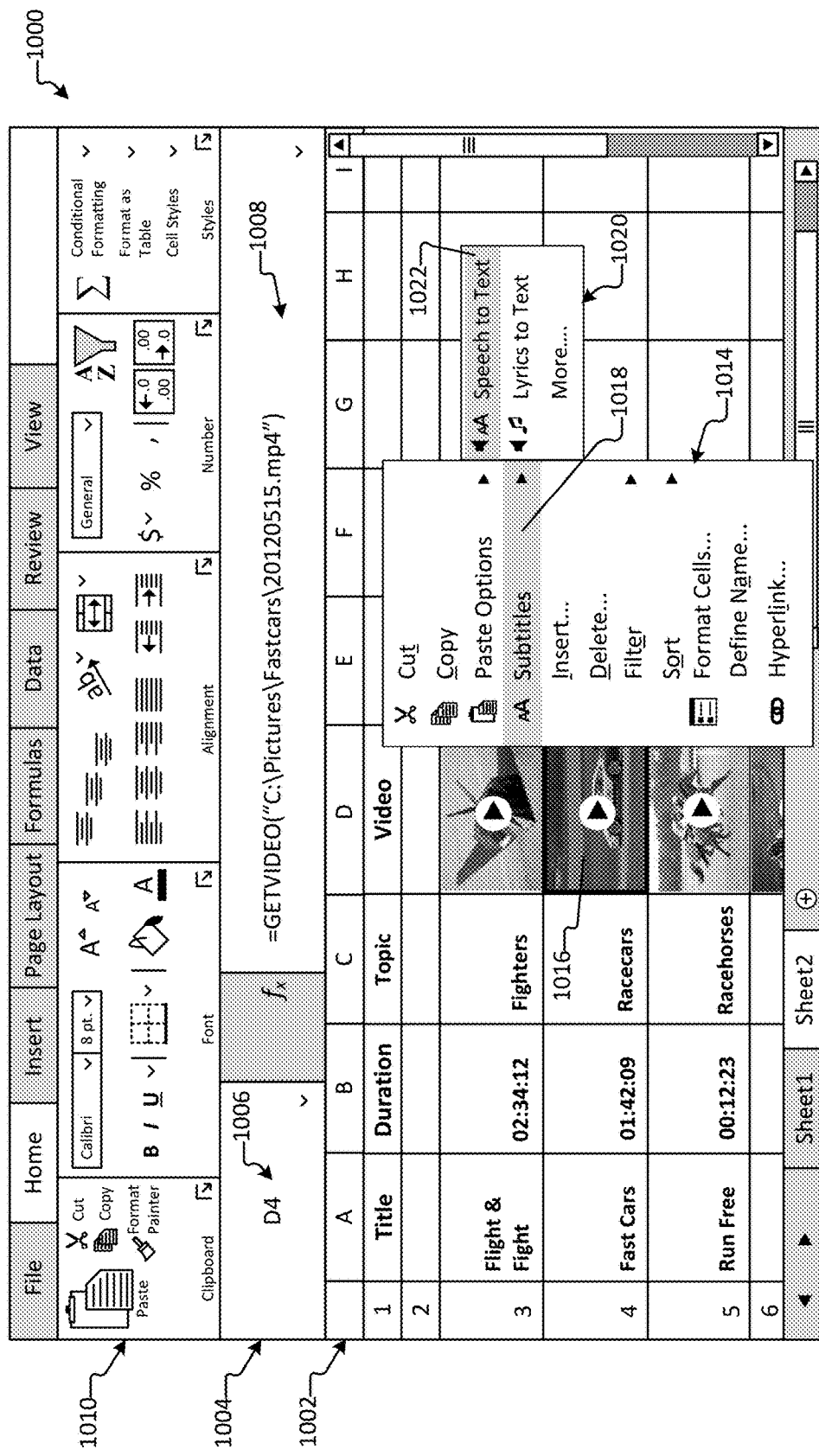
FIG. 10A illustrates an interface showing a popup menu for retrieving subtitles for a video associated with a cell, according to an example embodiment.

FIG. 10A illustrates an interface showing a popup menu for retrieving subtitles for a video associated with a cell, according to an example embodiment.

As illustrated, an interface 1000 of a spreadsheet application is provided. Interface 1000 includes a spreadsheet 1002, a navigation ribbon 1004 (including a cell identifier 1006 and a formula bar 1008), and a toolbar 1010. As illustrated, cell D4 is selected, as indicated by thickened and/or colored outlining of the cell border of cell D4. The cell identifier 1006 (e.g., "D4") for the selected cell is displayed in navigation ribbon 1004. Additionally, formula bar 1008 displays a function calling a file locator, e.g., fx=GETVIDEO("C:\Pictures\Fastcars\20120515.mp4") for the video file (i.e., video file 1016) displayed within cell D4.

In aspects, upon selecting a cell including an associated video file (e.g., video file 1018), a popup menu 1014 (or other interface) may be provided for manipulating the video file or other data in the selected cell. In other aspects, popup menu 1014 may be provided in response to additional input (e.g., right click, hover over, etc.). Popup menu 1014 may provide any number of options for adding content and/or manipulating data or objects associated with a selected cell. As illustrated, popup menu 1014 provides options including "Cut," "Copy" and "Paste." In this case, data or objects may be cut from a cell, copied in a cell and/or pasted to a cell.

Additionally, popup menu 1014 provides subtitles option 1018 for the associated video file 1016, which is selected as evidenced by shading. For example, a subtitles option may provide for transcribing an audio track associated with video file 1016 into text. In response to selection of subtitles option 1016, a secondary popup menu 1020 may be displayed. Secondary popup menu 1020 may provide a number of options for obtaining subtitles, e.g., "Speech to Text" and "Lyrics to Text," etc. As illustrated, the "Speech to Text" option 1022 has been selected (e.g., evidenced by shading). In this case, an audio track including speech may be converted into a text transcription (e.g., "Speech to Text"), which is a textual representation of each word or sound in the audio track. Additionally, the subtitles may be synchronized with individual frames of a video file. In further aspects, an audio track including songs may be transcribed into a text transcription (e.g., "Music to Lyrics").

Additionally, popup menu 1014 includes an option to "Insert." The "Insert" option may enable a user to associate data, video files or other objects with a selected cell. In a first example, upon selection of the "Insert" option, a menu may provide for associating a video file by browsing a file structure to identify a file locator for the video file. In a second example, e.g., where at least one video file is already associated with the cell, upon selection of the "Insert" option, a UI element may open that displays the at least one video file already associated with the cell. The UI element may further enable a user to scroll through a plurality of associated video files and add a video file in a selected position within the plurality of associated video files. In a third example, where data and/or a video file are already associated with the cell, upon selection of the "Insert" option, a UI element may open that enables a user to add data and/or a video file (or other object) to the selected cell. In some cases, a compound data type may be created to insert the additional data and/or video file to the selected cell. Alternatively, a compound data type may already exist and the additional data and/or video file may be added to the compound data type. As should be appreciated, additional examples are possible and the above examples are offered for purposes of explanation and should not be understood as limiting.

Popup menu 1014 further includes a "Delete" option. In contrast to the "Insert" option, the "Delete" option may enable a user to delete data, video files or other objects from the selected cell. The menus described above with respect to the "Insert" option may similarly apply to the "Delete" option. In addition, popup menu 1014 may provide "Filter" and "Sort" options, described further below with respect to FIG. 11.

Popup menu 1014 may further provide a "Format Cells" option. The "Format Cells" option may enable a user to adjust an alignment of data, a visual representation of a video file, etc., within a selected cell. For instance, the data may be right, left or center justified. Additionally or alternatively, the "Format Cells" option may enable a user to adjust an alignment between a visual representation of a video file and additional data or another object. For example, the additional data may be provided above, below, on either side, or wrapping a visual representation of a video file. In some examples, the "Format Cells" operation may allow a visual representation of a video file to become background or fill for a cell, allowing additional data to be displayed on top of the visual representation within the cell. The "Format Cells" option may further provide any number of other options, e.g., including options for adjusting a cell border, a cell fill, font of alphanumeric data, formatting of numeric data, and the like.

In further aspects, popup menu 1014 may provide a "Define Name" option, which may enable a globally unique name to be assigned to a video file or other object. In some aspects, the globally unique name may be associated as metadata to a video file and may serve as a file locator for the video file. For instance, the globally unique name may be referenced within a function of a cell in order to perform operations on a video file (e.g., play the video file when a condition of the function is met, perform operations on video attributes, etc.) and/or to perform operations on the spreadsheet based on attributes of the video file, and the like. Popup menu 1014 may further provide a "Hyperlink" option for inserting a hyperlink to a file, a webpage, or otherwise. As should be appreciated, the options of popup menu 1014 described above are not exhaustive and should not be considered to be limiting. Indeed, any number of options may be provided by popup menu 1014.

As should be appreciated, the various devices, components, etc., described with respect to FIG. 10A are not intended to limit the systems and methods to the particular components described. Accordingly, additional topology configurations may be used to practice the methods and systems herein and/or some components described may be excluded without departing from the methods and systems disclosed herein.

Figure 10B:
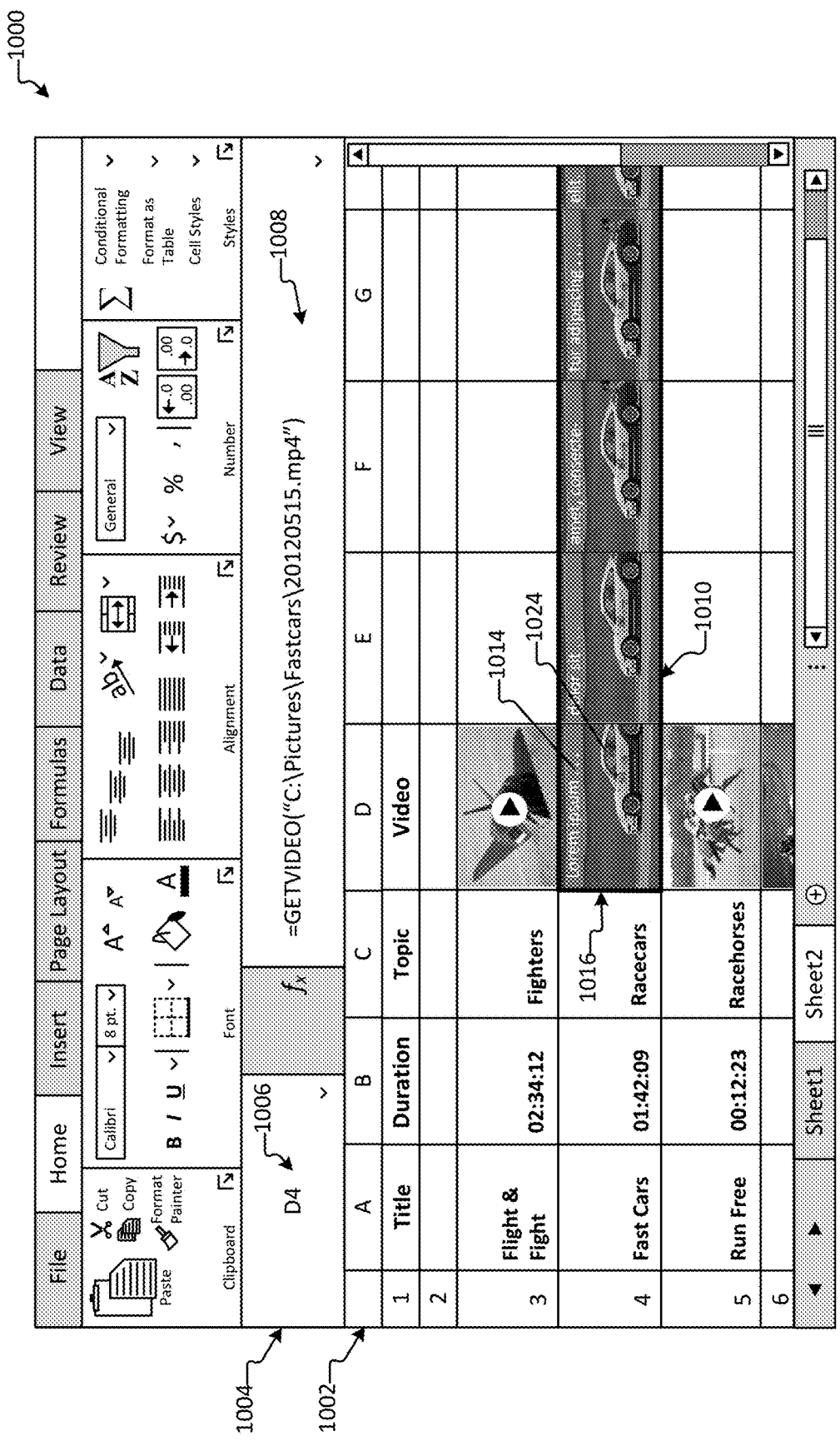
FIG. 10B illustrates an interface showing subtitles for a plurality of individual frames for a video associated with a cell, according to an example embodiment.

FIG. 10B illustrates an interface showing subtitles for a plurality of individual frames for a video associated with a cell, according to an example embodiment.

Similar to FIG. 10A, FIG. 10B illustrates an interface 1000 of a spreadsheet application. Interface 1000 includes a spreadsheet 1002, a navigation ribbon 1004 (including a cell identifier 1006 and a formula bar 1008). In this case, a range of cells 1010 (e.g., D4:H4) has been selected, as indicated by thickened and/or colored outlining of the range of cells 1010. The cell identifier 1006 (e.g., "D4") for the left-most cell of the selected range of cell is displayed in navigation ribbon 1004. Additionally, formula bar 1008 displays a function calling a file locator for video file 1016, e.g., fx=GETVIDEO("C:\Pictures\Fastcars\20120515.mp4") displayed within cell D4.

As described with reference to FIG. 10A, cell D4 may have been selected and, in response to selection of subtitles option 1018 and option 1022 (i.e., "Speech to Text"), an audio track associated with video 1016 may be transcribed. As illustrated, subtitles have been synchronized with each of an array of individual frames spilled into the range of cells 1010, as described above with respect to FIG. 7E. For example, subtitle 1014 is associated with a first individual frame 1024 of video file 1016.

As should be appreciated, the various devices, components, etc., described with respect to FIG. 10B are not intended to limit the systems and methods to the particular components described. Accordingly, additional topology configurations may be used to practice the methods and systems herein and/or some components described may be excluded without departing from the methods and systems disclosed herein.

Figure 11:
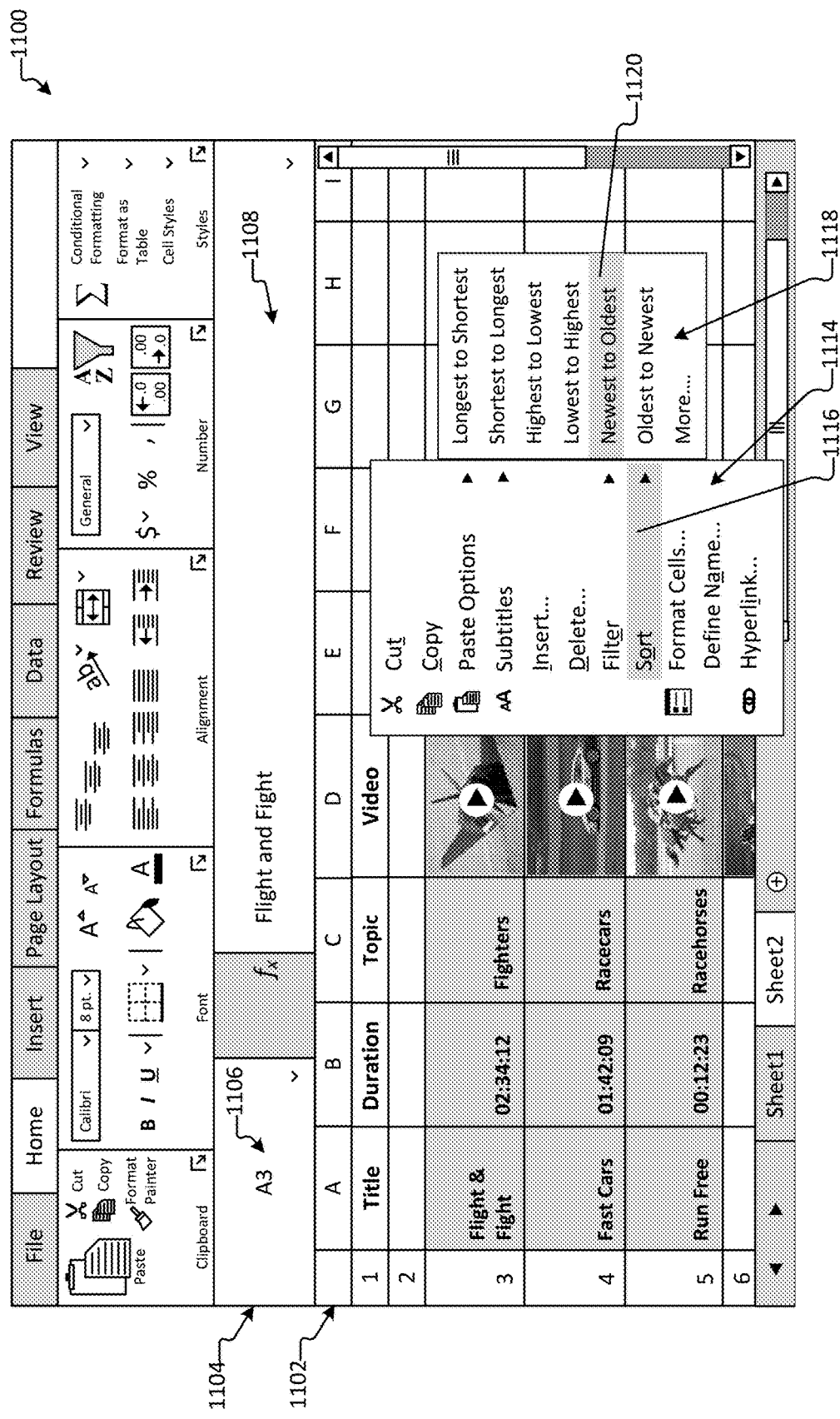
FIG. 11 illustrates an interface showing a popup menu for sorting a range of cells in a spreadsheet based on one or more attributes of video files associated with the range of cells, according to an example embodiment.

FIG. 11 illustrates an interface showing a popup menu for sorting a range of cells in a spreadsheet based on one or more attributes of video files associated with the range of cells, according to an example embodiment.

As illustrated, an interface 1100 of a spreadsheet application is provided. Interface 1100 includes a spreadsheet 1102 and a navigation ribbon 1104, including a cell identifier 1106 and a formula bar 1108. As further illustrated, a range of cells (A3:D5) is selected, as illustrated by shading or highlighting over the range of cells. As shown, cell identifier 1106 (e.g., "A3"), identifying a cell at the top left corner of the range of cells, is displayed in navigation ribbon 1104. Additionally, formula bar 1108 displays the contents of cell A3 (e.g., "Fight and Flight").

As indicated above, the range of cells (i.e., A3:D5) has been selected. In aspects, upon selecting a range of cells including associated video files, a first popup menu 1114 (or other interface) may be provided for manipulating associated video files or other data in the selected range of cells. In other aspects, first popup menu 1114 may be provided in response to additional input (e.g., right click, hover over, etc.).

Similar to popup menu 1014, first popup menu 1114 may provide any number of options for manipulating data or objects associated with the selected range of cells. For instance, first popup menu 1114 may provide "Filter" and "Sort" options for filtering or sorting the spreadsheet based on one or more video attributes of the associated video files. For example, in response to selecting "Sort" option 1116, a second popup menu 1118 may be provided. The second popup menu 1118 may provide options for sorting the spreadsheet based on video data or video attributes of associated video files (e.g., video files associated with the selected range of cells). As described above, a video file may be defined by video data (e.g., an array of pixel values for rendering each individual frame of a video and/or modulated data for reproducing soundwaves of an audio track). A video file may further include video attributes (e.g., frame rate, aspect ratio, duration, resolution, bits per frame, video size, synchronization data, etc.), individual frame attributes (e.g., aspect ratio, color space, bitrate, etc.) and/or audio attributes (e.g., pitch, volume, speed, etc.).

Sorting may be performed based on video data and/or video attributes, e.g., duration of associated video files (e.g., "Sort Longest to Shortest" or "Sort Shortest to Longest"), resolution of associated video files (e.g., "Sort Highest to Lowest" or "Sort Lowest to Highest"), creation dates of associated video files (e.g., "Sort Newest to Oldest" or "Sort Oldest to Newest"), and the like. In aspects, a spreadsheet may be sorted based on any identifiable video attribute, and in some cases identifiable video data, of associated video files.

As should be appreciated, the various devices, components, etc., described with respect to FIG. 11 are not intended to limit the systems and methods to the particular components described. Accordingly, additional topology configurations may be used to practice the methods and systems herein and/or some components described may be excluded without departing from the methods and systems disclosed herein.

Figure 12A:
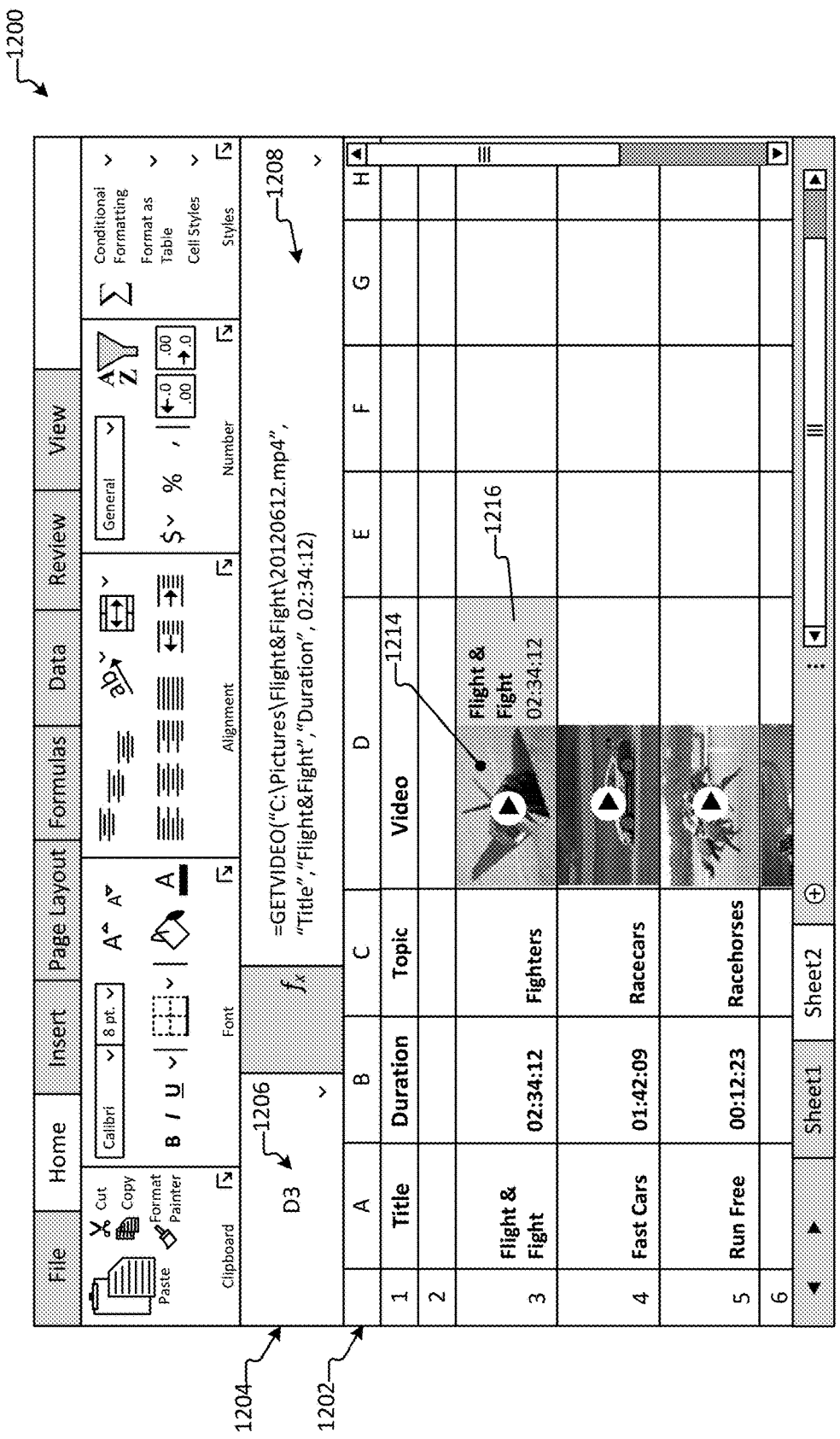
FIG. 12A illustrates an interface showing one or more video files and additional data associated with one or more cells of a spreadsheet, according to a first example embodiment.

FIG. 12A illustrates an interface showing one or more video files and additional data associated with one or more cells of a spreadsheet, according to a first example embodiment.

As illustrated, an interface 1200 of a spreadsheet application is provided. Interface 1200 includes a spreadsheet 1202 and a navigation ribbon 1204, including a cell identifier 1206 and a formula bar 1208. As further illustrated, cell D3 is selected, as indicated by shading of cell D3. As shown, a cell identifier 1206 (e.g., "D3") for the selected cell is displayed in navigation ribbon 1204.

As illustrated, cell D3 contains both a video file (e.g., video file 1214) and additional data (e.g., additional data 1216). In the illustrated embodiment, additional data 1216 describes video file 1214, e.g., title "Flight & Fight" and duration "02:34:12." In some aspects, video file 1214 and additional data 1216 may be associated with a compound data type. In this case, a formula bar 1208 for cell D3 may display a function referencing a globally unique name for the compound data type (e.g., the compound data type representing the video file 1214 and the additional data 1216) associated with cell D3. In other aspects, formula bar 1208 may display a function calling video file 1214 and additional data 1216 contained in cell D3.

A function representing the compound data type may be identified using a variety of syntax. For instance, the function may surface whatever attribute-value pairs are stored in the compound data type and may be represented as: =GETVIDEO("C:\Pictures\Flight&Fight\20120612.mp4", "Title", "Flight&Fight", "Duration", 02:34:12). In other aspects, where a user combines a video file with an arbitrary set of values (e.g., a record), the function may be represented as: =GETVIDEO("C:\Pictures\Flight&Fight\20120612.mp4", RECORD("Title", "Flight & Fight", "Duration", 02:34:12)). In still other aspects, where a video file (identified by a ".mp4" file extension) is added to a compound data type constructed by a user, the video file would amount to a value within the compound data type (e.g., a record) and the function may be represented as: =RECORD("Video", "C:\Pictures\Flight&Fight\20120612.mp4", "Title", "Flight & Fight", "Duration", 02:34:12).

In still other aspects, a user may create a compound data type and give the compound data type a name (e.g., "Hobbies"). The next time the compound data type is used, each attribute name is already known as a field in the "Hobbies" compound data type and only the values need to be called out in the function, which may be represented as: =HOBBIES("C:\Pictures\Flight&Fight\20120612.mp4", "Flight & Fight", 02:34:12). Further, the function may simply reference attributes of the video file and read the values from metadata, e.g., =RECORD("Video", "C:\Pictures\Flight&Fight\20120612.mp4", "Title", "Flight & Fight", "Duration", Video.Duration). In this case, a user may provide custom fields within the compound data type (e.g., record) and, by dereferencing the 'video' field, values may be read from metadata and populated in the user's defined fields in the record.

As should be appreciated, the various devices, components, etc., described with respect to FIG. 12A are not intended to limit the systems and methods to the particular components described. Accordingly, additional topology configurations may be used to practice the methods and systems herein and/or some components described may be excluded without departing from the methods and systems disclosed herein.

Figure 12B:
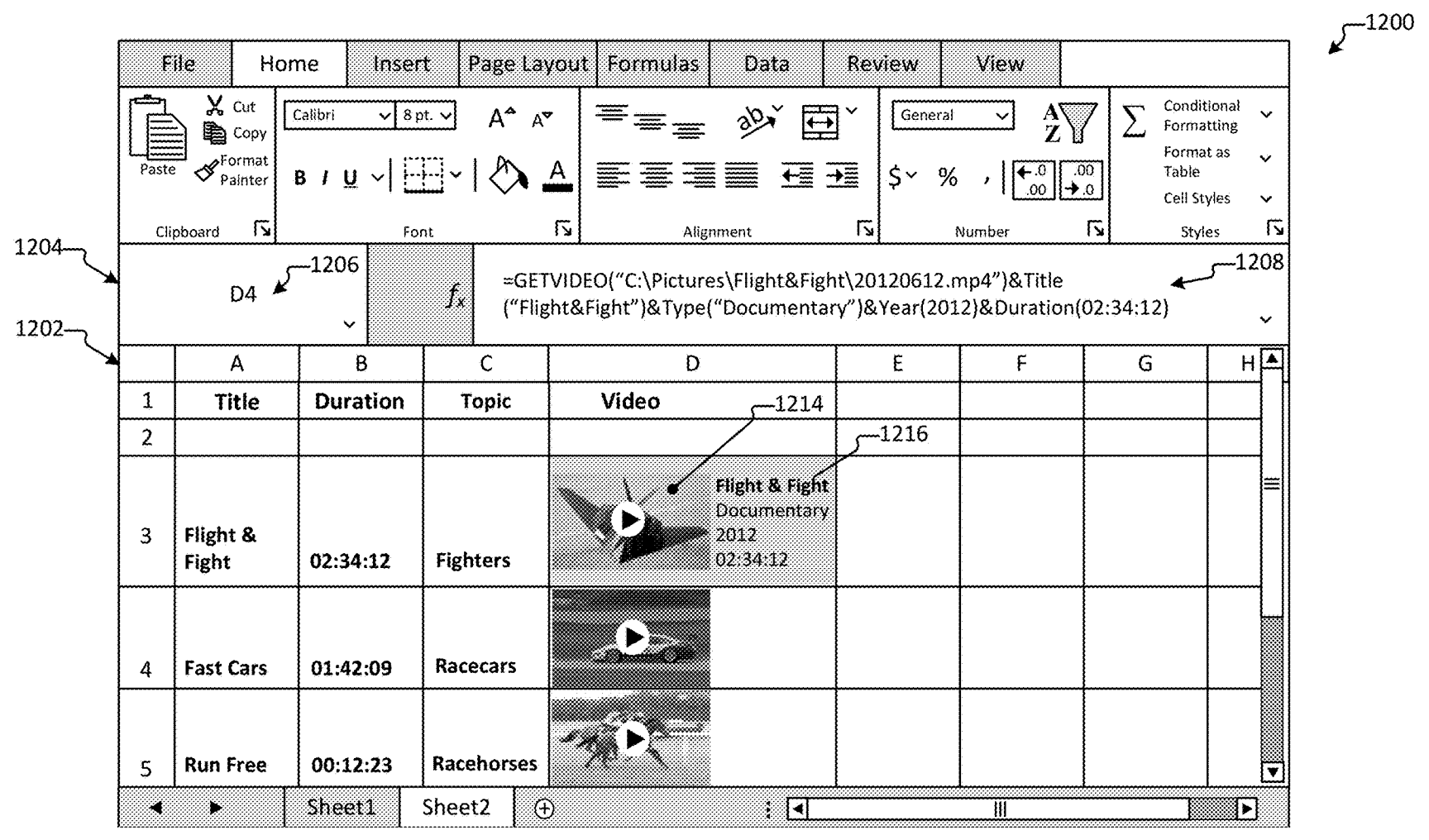

FIG. 12B illustrates an interface showing one or more video files and additional data associated with one or more cells of a spreadsheet, according to a second example embodiment.

As illustrated, an interface 1200 of a spreadsheet application is provided. Interface 1200 includes a spreadsheet 1202 and a navigation ribbon 1204, including a cell identifier 1206 and a formula bar 1208. As further illustrated, cell D3 is selected, as indicated by background shading of cell D3. However, selection of a cell may be indicated by any suitable means, such as highlighting an active cell with a bright treatment, perceived three-dimensional enlargement, outlining of the cell border, dimming background and inactive cells, and the like. As shown, a cell identifier 1206 (e.g., "D3") for the selected cell is displayed in navigation ribbon 1204.

Similar to cell D3 of FIG. 12A, cell D3 contains both a video file (e.g., video file 1214) and additional data (e.g., additional data 1216). However, cell D3 of FIG. 12B has been resized. In response to resizing cell D3, additional data 1216 displays more information regarding video file 1214, e.g., video type "Documentary" and year "2012." As explained above, in some aspects, the display of additional data 1216 may be dynamic. For instance, a minimal amount of additional data may be displayed in a small-sized cell, whereas progressively more additional data may be displayed as the cell is enlarged. For instance, in a small-sized cell, an video icon may be displayed, indicating that a video file is associated with the cell. In contrast, as the cell is enlarged, a rendering of a visual representation of the video file may be displayed along with progressively more additional data, including video attributes such as file name and creation data/time, and information regarding video file content, such as a text transcription (e.g., subtitles) of an audio track.

In some aspects, video file 1214 and additional data 1216 may be associated with a compound data type. In this case, a formula bar 1208 for cell D3 may display a function referencing a globally unique name for the compound data type (e.g., the compound data type representing the video file 1214 and the additional data 1216) associated with cell D3. Alternatively, formula bar 1208 may display a function describing video file 1214 and additional data 1216 contained in cell D3. For instance, the function may be represented as: =GETVIDEO("C:\Pictures\Flight&Fight\20120612.mp4", "Title", "Flight&Fight", "Type", "Documentary", "Year", 2012, "Duration", 02:34:12). Alternatively, the function may be represented in any of the forms identified for FIG. 12A above.

As should be appreciated, the various devices, components, etc., described with respect to FIG. 12B are not intended to limit the systems and methods to the particular components described. Accordingly, additional topology configurations may be used to practice the methods and systems herein and/or some components described may be excluded without departing from the methods and systems disclosed herein.

Figure 12C:
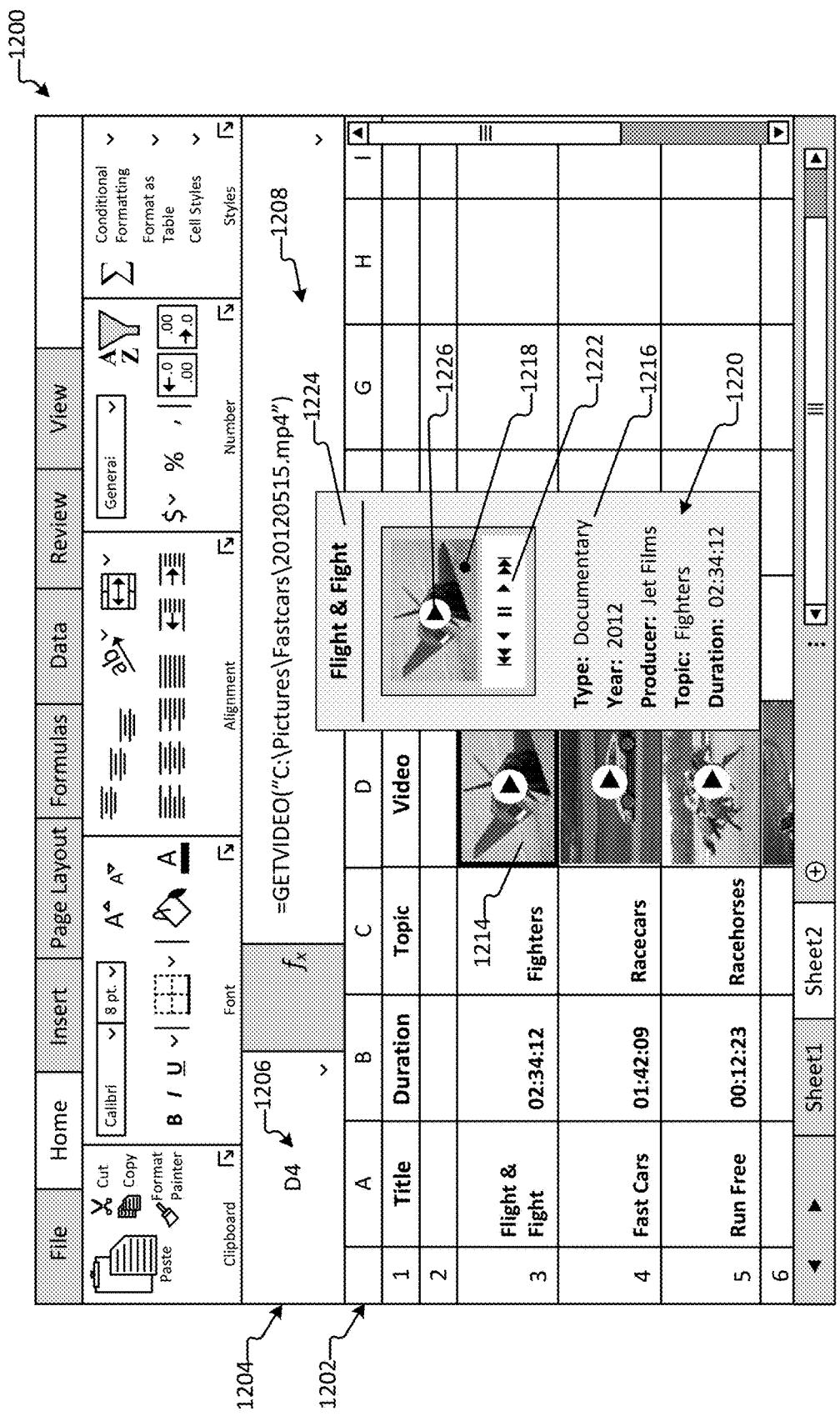
FIG. 12C illustrates an interface showing one or more video files and additional data associated with one or more cells of a spreadsheet, according to a third example embodiment.

FIG. 12C illustrates an interface showing one or more video files and additional data associated with one or more cells of a spreadsheet, according to a third example embodiment.

As illustrated, an interface 1200 of a spreadsheet application is provided. Interface 1200 includes a spreadsheet 1202 and a navigation ribbon 1204, including a cell identifier 1206 and a formula bar 1208. As further illustrated, cell D3 is selected, as indicated by thickened and/or colored outlining of the cell border of cell D3. As shown, a cell identifier 1206 (e.g., "D3") for the selected cell is displayed in navigation ribbon 1204. Additionally, formula bar 1208 displays a function calling a file locator, e.g., =GETVIDEO ("C:\Pictures\Flight&Fight\20120612.mp4") for the video file (i.e., video file 1214) displayed within cell D3.

In this case, additional data 1216 is not displayed in the same cell as video file 1214. Rather, additional data 1216 is displayed in a popup window 1220. For example, in response to selecting cell D3 (e.g., by right click, hover over, etc.), popup window 1220 may be displayed. Popup window 1220 displays a visual representation 1218 of video file 1214, along with additional data 1216, in an organized and formatted layout. For instance, popup window 1220 includes a full title (e.g., "Flight & Fight") in a header portion 1224 of popup window 1220. A visual representation 1218 identifying video file 1214, which is displayed with a play control 1226 and an interactive play bar 1222, which provides controls for "fast rewind" (or "skip back"), "rewind," "pause," "play," and "fast forward" (or "skip forward"). Further, additional data 1216 includes data descriptors for each piece of information. In this regard, popup window 1220 provides a user-friendly interface (e.g., organized and stylized) for viewing additional data associated with video file 1214 upon user selection.

As should be appreciated, the various devices, components, etc., described with respect to FIG. 12C are not intended to limit the systems and methods to the particular components described. Accordingly, additional configurations may be used to practice the methods and systems herein and/or some components described may be excluded without departing from the methods and systems disclosed herein.

Figure 13:
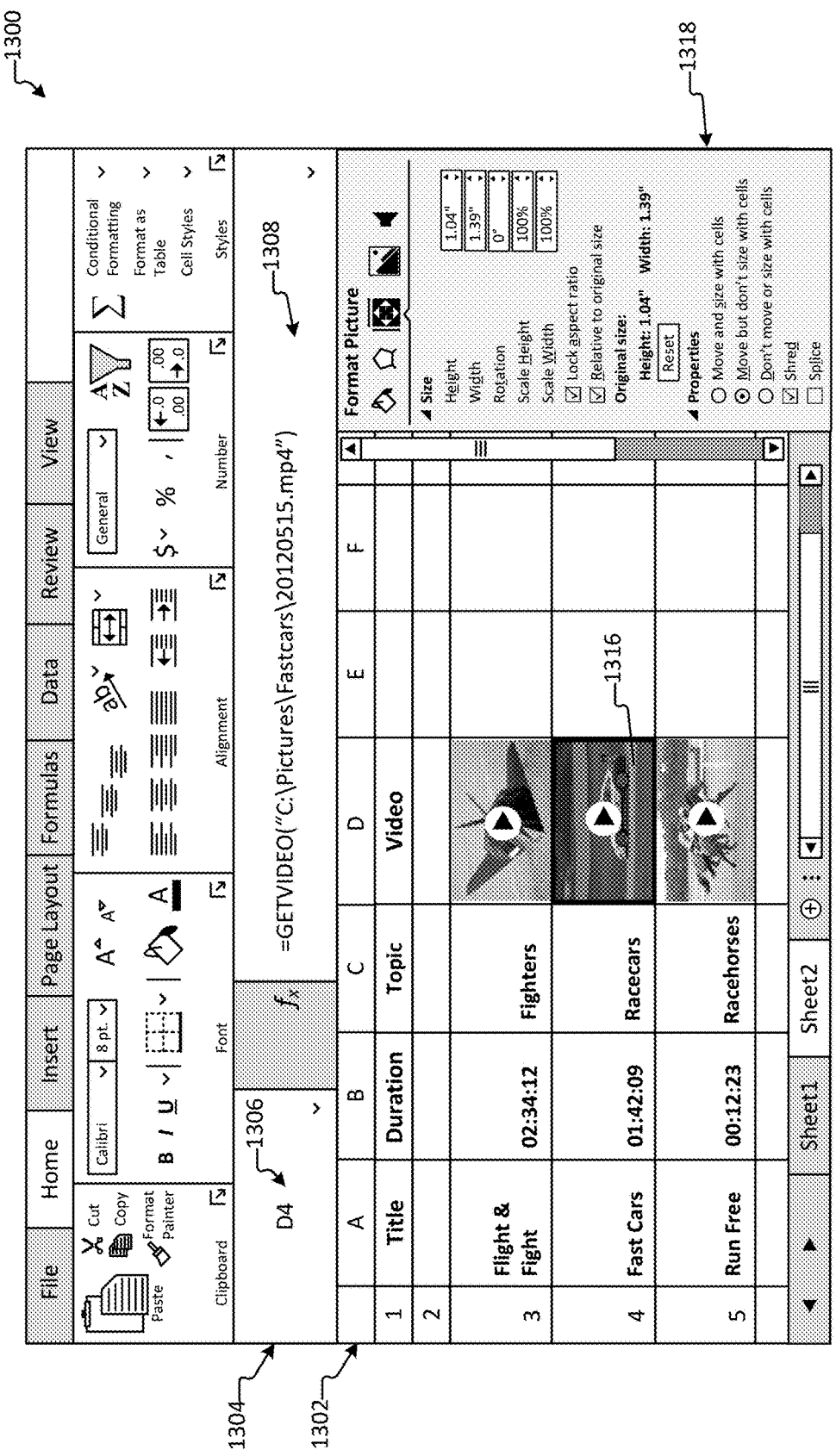
FIG. 13 illustrates an interface showing a settings toolbar for manipulating one or more attributes of a video file associated with a cell of a spreadsheet, according to an example embodiment.

FIG. 13 illustrates an interface showing a settings toolbar for manipulating one or more attributes of a video file associated with a cell of a spreadsheet, according to an example embodiment.

As illustrated, an interface 1300 of a spreadsheet application is provided. Interface 1300 includes a spreadsheet 1302 and a navigation ribbon 1304, including a cell identifier 1306 and a formula bar 1308. As further illustrated, cell D4 is selected, as indicated by thickened and/or colored outlining of the cell border of cell D4. As shown, cell identifier 1306 (e.g., "D4") for the selected cell is displayed in navigation ribbon 1304. Additionally, formula bar 1308 displays a function calling a file locator (e.g., GETVIDEO= ("C:\Pictures\Fastcars\20120515.mp4") for a video (i.e., video 1316) displayed within cell D4.

In some aspects, in response to selecting a cell that includes an associated video, a settings toolbar 1318 (or other interface) may be provided for manipulating the associated video. In other aspects, a settings toolbar 1318 may be provided in response to additional input (e.g., hover, right click) within a selected cell. Settings toolbar 1318 may include a number of tabs for viewing and manipulating various video attributes. For instance, a sizing tab may display video attributes directed to video size and orientation such as "height," "width," "rotation," "scale height," "scale width," "aspect ratio," as well as displaying an original size for the video. Additionally, other tabs associated with settings toolbar 1318 may provide video attributes, such as resolution, opacity, transparency, author, creation date/time, and the like (not shown). In some cases, e.g., where both a video and additional data are associated with a single cell, settings toolbar 1318 may provide relative attributes between the video and the additional data, such as contrast, alignment, background opacity and/or translucency, and the like (not shown).

In further aspects, settings toolbar 1318 may include a tab for viewing and manipulating image data and image attributes associated with a plurality of individual frames of the associated video. As should be appreciated, any number of video attributes may be displayed in settings toolbar 1318, or any other suitable interface. Moreover, settings toolbar 1318 may include a number of tabs for viewing and manipulating various audio attributes. For instance, a sound tab may display audio attributes including "volume," "pitch," "speed," "bitrate type," "bitrate" "channel type," and "channel." Additionally, other tabs associated with settings toolbar 1318 may provide audio attributes, such as resolution, codec, sample rate, frequency, amplitude, duration, creation date/time, and the like (not shown).

Settings toolbar 1318 may also expose one or more operations for manipulating video data (including image data and/or audio data) and video attributes (including image attributes and/or audio attributes) of an associated video. For example, input fields and/or UI controls (e.g., +/− controls) may be provided for one or more of the video attributes displayed by the settings toolbar 1318. In this regard, a user may directly input values for video attributes and/or adjust video attributes up or down based on user preference. For instance, with reference to video attributes displayed by the sizing tab above, values for "height," "width," "rotation," "scale height," and "scale width" may be adjusted by direct input and/or adjusted up or down using +/− controls. In some aspects, a preview (not shown) of an associated video may be provided by the settings toolbar 1318 such that changes to a video may be viewed prior to acceptance. Additionally or alternatively, a "reset" button may be provided to return adjusted parameters back to an original version of the video. As should be appreciated, the above examples of image attributes are not exhaustive and any video attribute may be surfaced and adjusted based on one or more exposed operations.

Settings toolbar 1318 may further provide UI controls for turning certain settings on or off. For instance, a selection may be provided for "locking aspect ratio" and a further selection may be provided for locking the aspect ratio "relative to an original size" of the video. With reference to sizing a visual representation of the video (e.g., for fitting and/or resizing a visual representation based on a size of the associated cell), additional selections may be provided to "move and size" the video with a cell, "move without sizing" the video with a cell, and "don't move or size" the video with a cell. Additional operations, such as "shredding" or "splicing" a video, as described above, may be provided. In further aspects, image data (e.g., an array of pixel values for rendering an individual frame of the video) may be surfaced and operations for manipulating the image data may be exposed to a user (not shown). In this way, image processing may be enabled for individual frames of a video within a spreadsheet. In some cases, some options may be disabled when certain settings are selected. For example, sizing options may be disabled when a "fit to cell" setting is selected. The above examples are provided for purposes of explanation only and should not be understood as limiting. Indeed, any of the operations described herein may be exposed via any suitable user interface for access to a user.

In other aspects of the present disclosure, rather than providing a settings toolbar (as illustrated by FIG. 13), a settings ribbon may be provided (not shown). For example, the settings ribbon may be provided upon selection of a "Video Format" tab (not shown). Options available in a settings ribbon (not shown) associated with a Video Format tab may include, for instance, moving a video from foreground to background, or background to foreground. Options may also including editing the video (e.g., touchup tools, etc.), adjusting colors, and/or adding artistic effects. Options for sizing the video, popping a video out of a cell, changing picture styles, changing picture borders, and/or changing video layout may also be provided. Any number of options for enabling operations on videos associated with cells may be provided in any suitable ribbon, tab, toolbar, and the like.

As should be appreciated, the various devices, components, etc., described with respect to FIG. 13 are not intended to limit the systems and methods to the particular components described. Accordingly, additional topology configurations may be used to practice the methods and systems herein and/or some components described may be excluded without departing from the methods and systems disclosed herein.

FIGS. 14-17 and the associated descriptions provide a discussion of a variety of operating environments in which aspects of the disclosure may be practiced. However, the devices and systems illustrated and discussed with respect to FIGS. 14-17 are for purposes of example and illustration and are not limiting of a vast number of computing device configurations that may be utilized for practicing aspects of the disclosure, as described herein.

Figure 14:
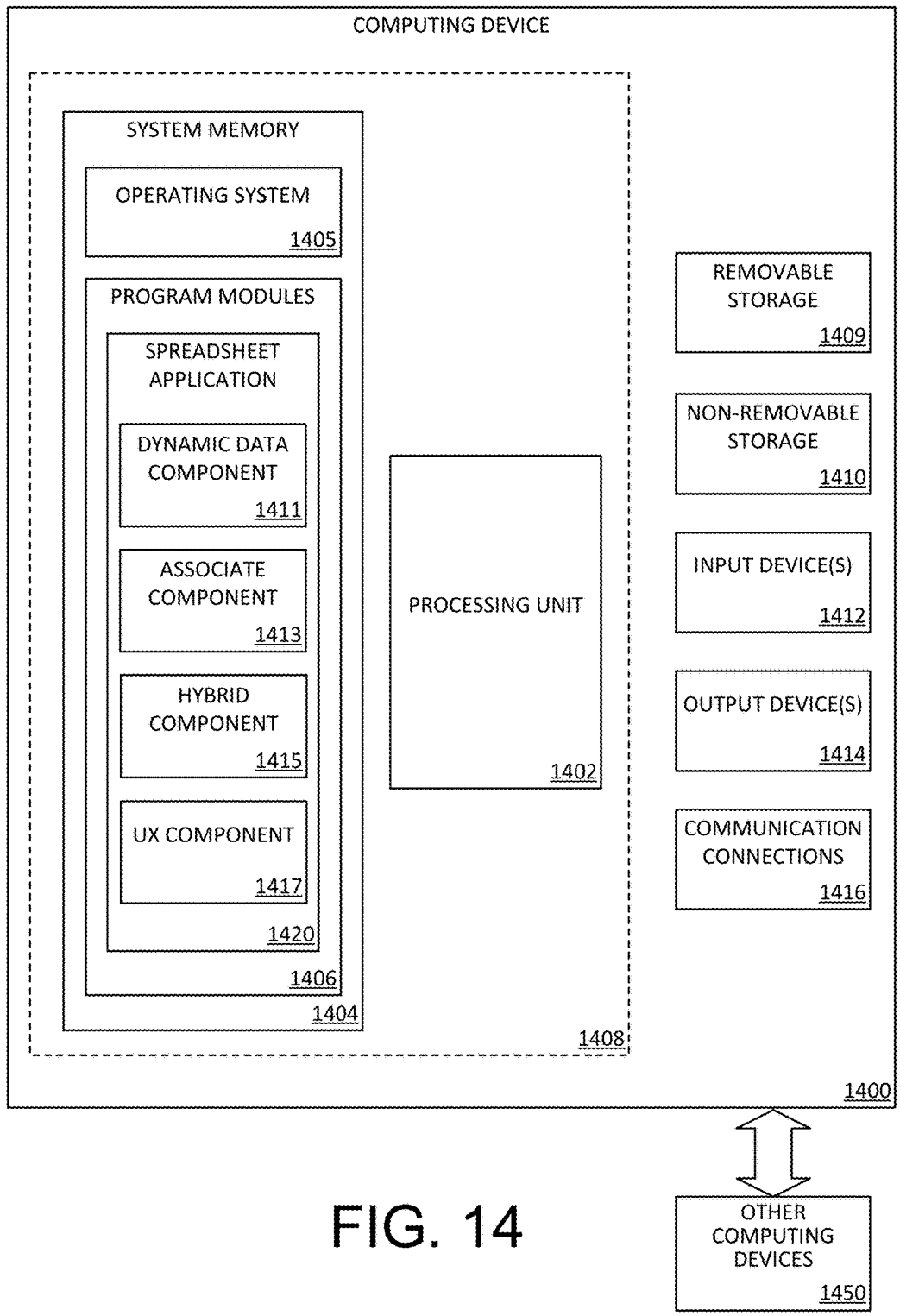
FIG. 14 is a block diagram illustrating example physical components of a computing device with which aspects of the disclosure may be practiced.

FIG. 14 is a block diagram illustrating physical components (e.g., hardware) of a computing device 1400 with which aspects of the disclosure may be practiced. The computing device components described below may have computer executable instructions for implementing a spreadsheet application 1420 on a computing device (e.g., server computing device 108 and/or client computing device 104), including computer executable instructions for spreadsheet application 1420 that can be executed to implement the methods disclosed herein. In a basic configuration, the computing device 1400 may include at least one processing unit 1402 and a system memory 1404. Depending on the configuration and type of computing device, the system memory 1404 may comprise, but is not limited to, volatile storage (e.g., random access memory), non-volatile storage (e.g., read-only memory), flash memory, or any combination of such memories. The system memory 1404 may include an operating system 1405 and one or more program modules 1406 suitable for running spreadsheet application 1420, such as one or more components with regard to FIG. 1 and, in particular, dynamic data component 1411 (corresponding to dynamic data component 112), associate component 1411 (e.g., including associate component 114 and/or attribute component 118), hybrid component 1413 (e.g., corresponding to hybrid component 116), and/or UX component 1417 (e.g., including operation component 120 and UX component 122).

The operating system 1405, for example, may be suitable for controlling the operation of the computing device 1400. Furthermore, embodiments of the disclosure may be practiced in conjunction with a graphics library, other operating systems, or any other application program and is not limited to any particular application or system. This basic configuration is illustrated in FIG. 14 by those components within a dashed line 1408. The computing device 1400 may have additional features or functionality. For example, the computing device 1400 may also include additional data storage devices (removable and/or non-removable) such as, for example, magnetic disks, optical disks, or tape. Such additional storage is illustrated in FIG. 14 by a removable storage device 1409 and a non-removable storage device 1410.

As stated above, a number of program modules and data files may be stored in the system memory 1404. While executing on the processing unit 1402, the program modules 1406 (e.g., spreadsheet application 1420) may perform processes including, but not limited to, the aspects, as described herein. Other program modules that may be used in accordance with aspects of the present disclosure, and in particular for associating video files with cells of a spreadsheet, may include dynamic data component 1411, associate component 1413, hybrid component 1415, and/or UX component 1417, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 14 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1400 may also have one or more input device(s) 1412 such as a keyboard, a mouse, a pen, a sound or voice input device, a touch or swipe input device, etc. The output device(s) 1414 such as a display, speakers, a printer, etc. may also be included. The aforementioned devices are examples and others may be used. The computing device 1400 may include one or more communication connections 1416 allowing communications with other computing devices 1450. Examples of suitable communication connections 1416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1404, the removable storage device 1409, and the non-removable storage device 1410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1400. Any such computer storage media may be part of the computing device 1400. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 15A:
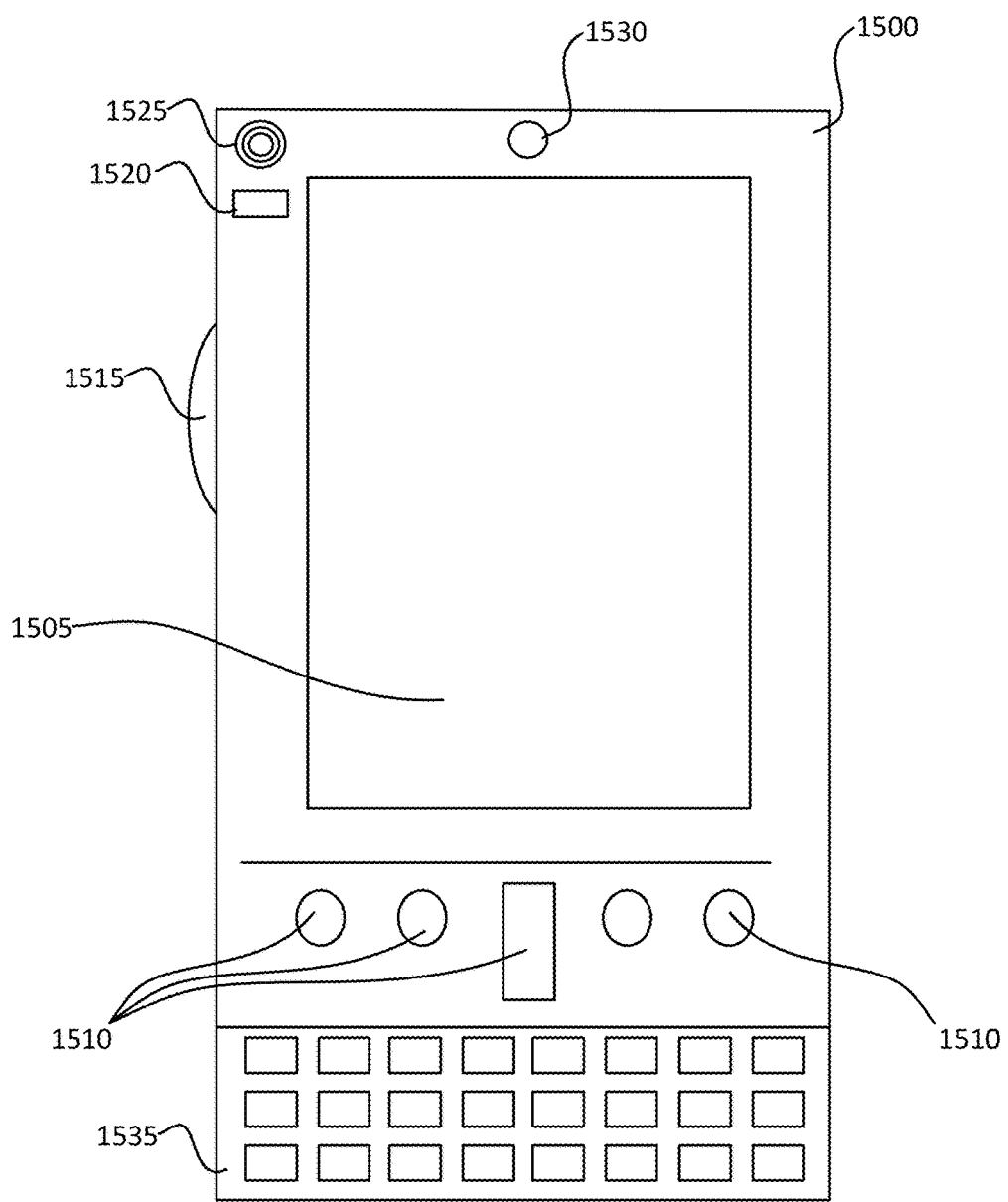
FIGS. 15A and 15B are simplified block diagrams of a mobile computing device with which aspects of the present disclosure may be practiced.
Figure 15B:
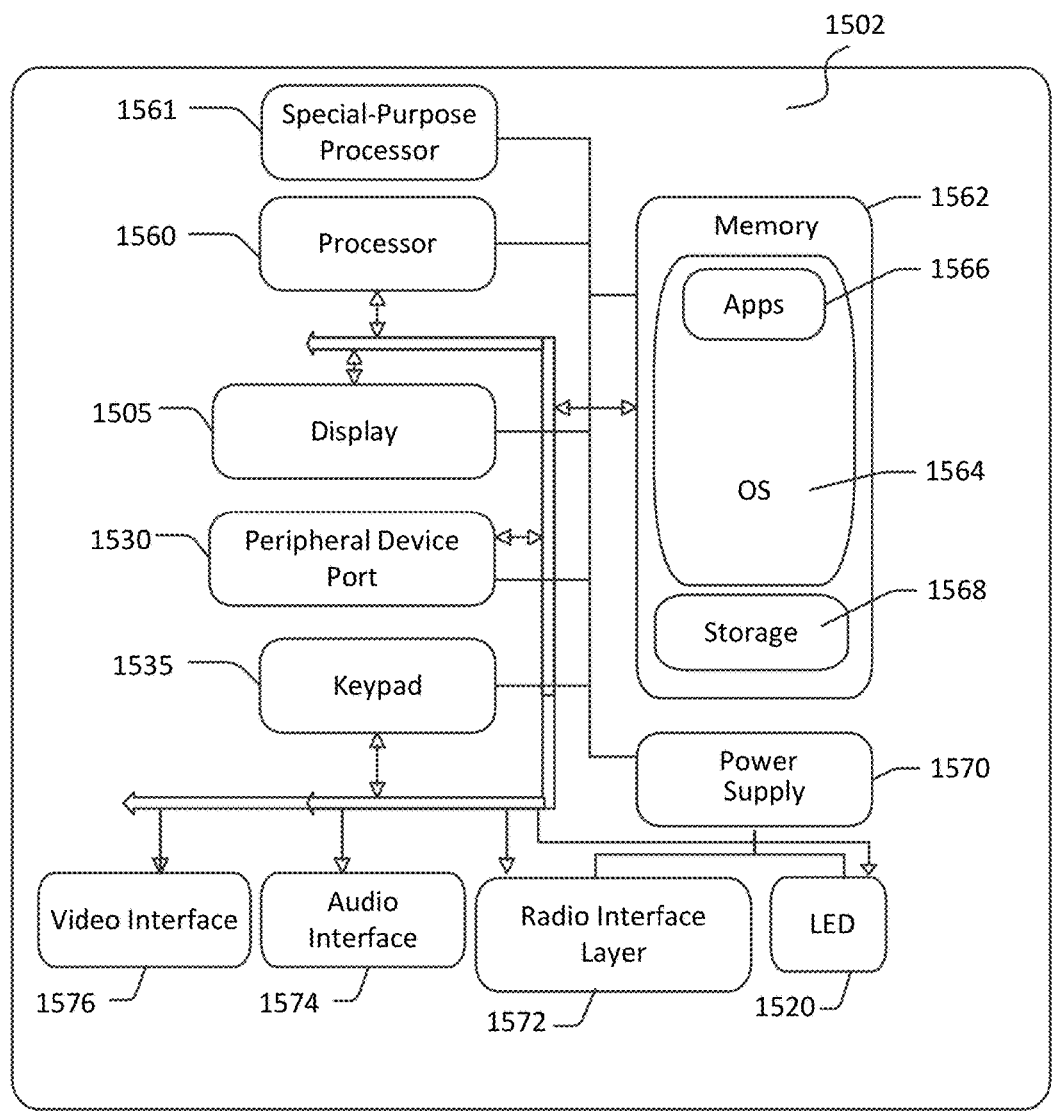

FIGS. 15A and 15B illustrate a mobile computing device 1500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 15A, one aspect of a mobile computing device 1500 for implementing the aspects is illustrated. In a basic configuration, the mobile computing device 1500 is a handheld computer having both input elements and output elements. The mobile computing device 1500 typically includes a display 1505 and one or more input buttons 1510 that allow the user to enter information into the mobile computing device 1500. The display 1505 of the mobile computing device 1500 may also function as an input device (e.g., a touch screen display). If included, an optional side input element 1515 allows further user input. The side input element 1515 may be a rotary switch, a button, or any other type of manual input element. In alternative aspects, mobile computing device 1500 may incorporate more or less input elements. For example, the display 1505 may not be a touch screen in some embodiments. In yet another alternative embodiment, the mobile computing device 1500 is a portable phone system, such as a cellular phone. The mobile computing device 1500 may also include an optional keypad 1535. Optional keypad 1535 may be a physical keypad or a "soft" keypad generated on the touch screen display. In various embodiments, the output elements include the display 1505 for showing a graphical user interface (GUI), a visual indicator 1520 (e.g., a light emitting diode), and/or an audio transducer 1525 (e.g., a speaker). In some aspects, the mobile computing device 1500 incorporates a vibration transducer for providing the user with tactile feedback. In yet another aspect, the mobile computing device 1500 incorporates input and/or output ports, such as an audio input (e.g., a microphone jack), an audio output (e.g., a headphone jack), and a video output (e.g., a HDMI port) for sending signals to or receiving signals from an external device.

FIG. 15B is a block diagram illustrating the architecture of one aspect of a mobile computing device. That is, the mobile computing device 1500 can incorporate a system (e.g., an architecture) 1502 to implement some aspects. In one embodiment, the system 1502 is implemented as a "smart phone" capable of running one or more applications (e.g., browser, e-mail, calendaring, contact managers, messaging clients, games, and media clients/players). In some aspects, the system 1502 is integrated as a computing device, such as an integrated personal digital assistant (PDA) and wireless phone.

One or more application programs 1566 may be loaded into the memory 1562 and run on or in association with the operating system 1564. Examples of the application programs include phone dialer programs, e-mail programs, personal information management (PIM) programs, word processing programs, spreadsheet programs, Internet browser programs, messaging programs, and so forth. The system 1502 also includes a non-volatile storage area 1568 within the memory 1562. The non-volatile storage area 1568 may be used to store persistent information that should not be lost if the system 1502 is powered down. The application programs 1566 may use and store information in the non-volatile storage area 1568, such as email or other messages used by an email application, and the like. A synchronization application (not shown) also resides on the system 1502 and is programmed to interact with a corresponding synchronization application resident on a host computer to keep the information stored in the non-volatile storage area 1568 synchronized with corresponding information stored at the host computer. As should be appreciated, other applications may be loaded into the memory 1562 and run on the mobile computing device 1500, including the instructions for associating one or more video files with one or more cells of a spreadsheet as described herein (e.g., dynamic data component, associate component, hybrid component, attribute component, operation component, and/or UX component, etc.).

The system 1502 has a power supply 1570, which may be implemented as one or more batteries. The power supply 1570 may further include an external power source, such as an AC adapter or a powered docking cradle that supplements or recharges the batteries. The system 1502 may also include a radio interface layer 1572 that performs the function of transmitting and receiving radio frequency communications. The radio interface layer 1572 facilitates wireless connectivity between the system 1502 and the "outside world," via a communications carrier or service provider. Transmissions to and from the radio interface layer 1572 are conducted under control of the operating system 1564. In other words, communications received by the radio interface layer 1572 may be disseminated to the application programs 1566 via the operating system 1564, and vice versa.

The visual indicator 1520 may be used to provide visual notifications, and/or an audio interface 1574 may be used for producing audible notifications via an audio transducer 1525 (e.g., audio transducer 1525 illustrated in FIG. 15A). In the illustrated embodiment, the visual indicator 1520 is a light emitting diode (LED) and the audio transducer 1525 may be a speaker. These devices may be directly coupled to the power supply 1570 so that when activated, they remain on for a duration dictated by the notification mechanism even though the processor 1560 and other components might shut down for conserving battery power. The LED may be programmed to remain on indefinitely until the user takes action to indicate the powered-on status of the device. The audio interface 1574 is used to provide audible signals to and receive audible signals from the user. For example, in addition to being coupled to the audio transducer 1525, the audio interface 1574 may also be coupled to a microphone to receive audible input, such as to facilitate a telephone conversation. In accordance with embodiments of the present disclosure, the microphone may also serve as an audio sensor to facilitate control of notifications, as will be described below. The system 1502 may further include a video interface 1576 that enables an operation of peripheral device 1530 (e.g., on-board camera) to record still images, video stream, and the like.

A mobile computing device 1500 implementing the system 1502 may have additional features or functionality. For example, the mobile computing device 1500 may also include additional data storage devices (removable and/or non-removable) such as, magnetic disks, optical disks, or tape. Such additional storage is illustrated in FIG. 15B by the non-volatile storage area 1568.

Data/information generated or captured by the mobile computing device 1500 and stored via the system 1502 may be stored locally on the mobile computing device 1500, as described above, or the data may be stored on any number of storage media that may be accessed by the device via the radio interface layer 1572 or via a wired connection between the mobile computing device 1500 and a separate computing device associated with the mobile computing device 1500, for example, a server computer in a distributed computing network, such as the Internet. As should be appreciated such data/information may be accessed via the mobile computing device 1500 via the radio interface layer 1572 or via a distributed computing network. Similarly, such data/information may be readily transferred between computing devices for storage and use according to well-known data/information transfer and storage means, including electronic mail and collaborative data/information sharing systems.

As should be appreciated, FIGS. 15A and 15B are described for purposes of illustrating the present methods and systems and are not intended to limit the disclosure to a particular sequence of steps or a particular combination of hardware or software components.

Figure 16:
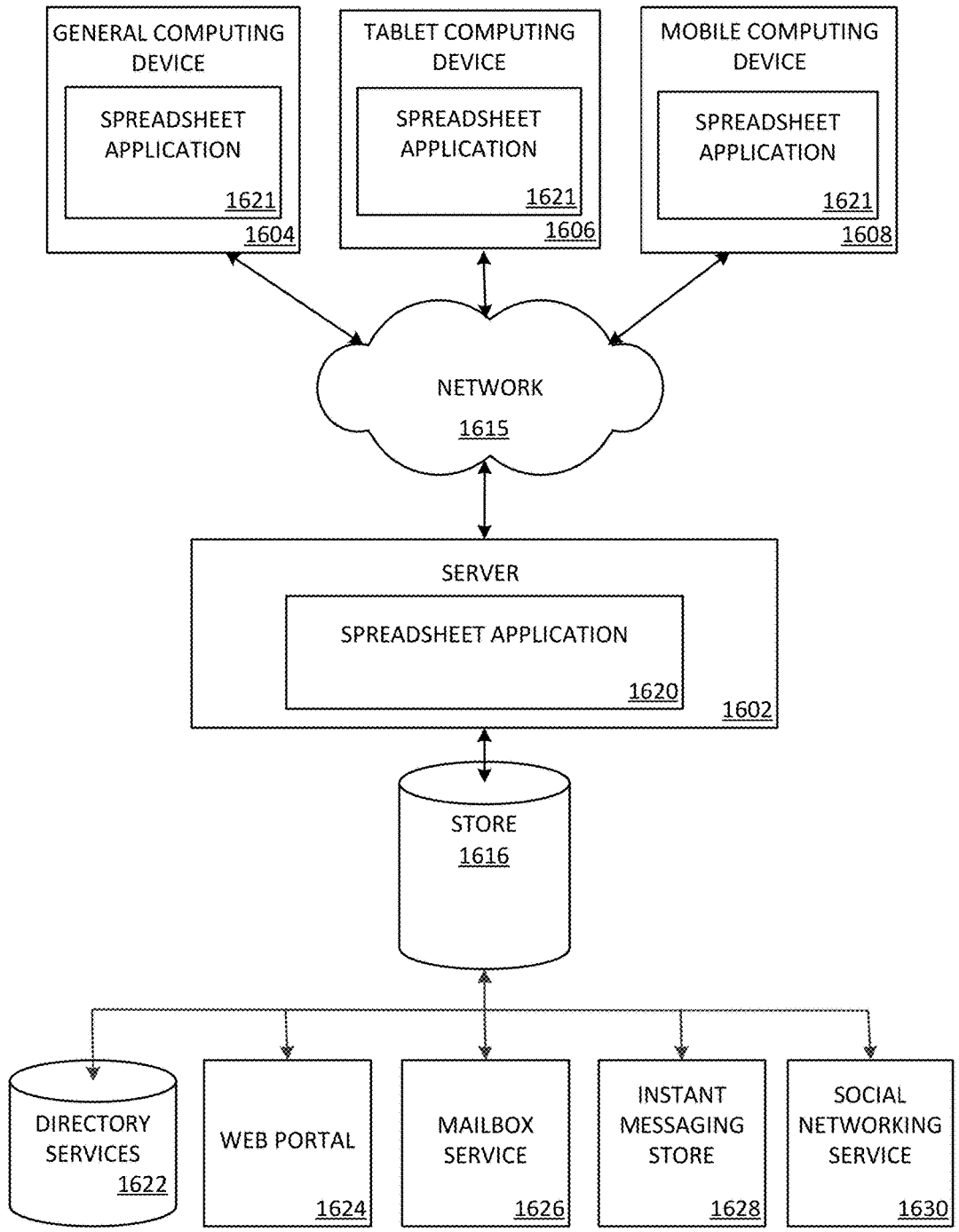
FIG. 16 is a simplified block diagram of a distributed computing system in which aspects of the present disclosure may be practiced.

FIG. 16 illustrates one aspect of the architecture of a system for processing data received at a computing system from a remote source, such as a general computing device 1604 (e.g., personal computer), tablet computing device 1606, or mobile computing device 1608, as described above. Content displayed at server device 1602 may be stored in different communication channels or other storage types. For example, various documents may be stored using a directory service 1622, a web portal 1624, a mailbox service 1626, an instant messaging store 1628, or a social networking service 1630. The spreadsheet application 1621 may be employed by a client that communicates with server device 1602, and/or the spreadsheet application 1620 may be employed by server device 1602. The server device 1602 may provide data to and from a client computing device such as a general computing device 1604, a tablet computing device 1606 and/or a mobile computing device 1608 (e.g., a smart phone) through a network 1615. By way of example, the computer system described above with respect to FIGS. 1-15 may be embodied in a general computing device 1604 (e.g., personal computer), a tablet computing device 1606 and/or a mobile computing device 1608 (e.g., a smart phone). Any of these embodiments of the computing devices may obtain content from the store 1616, in addition to receiving graphical data useable to either be pre-processed at a graphic-originating system or post-processed at a receiving computing system.

As should be appreciated, FIG. 16 is described for purposes of illustrating the present methods and systems and is not intended to limit the disclosure to a particular sequence of steps or a particular combination of hardware or software components.

Figure 17:
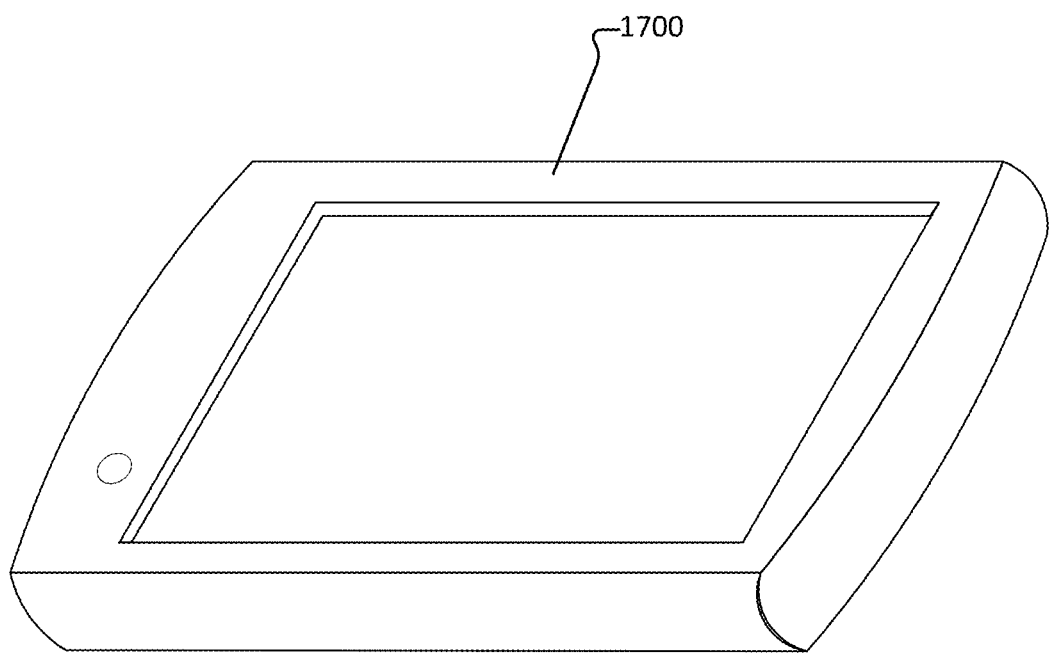
FIG. 17 illustrates a tablet computing device for executing one or more aspects of the present disclosure.

FIG. 17 illustrates an exemplary tablet computing device 1700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 17 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processing unit; and
   at least one memory storing computer executable instructions that, when executed by the at least one processing unit, cause the system to perform a method, the method comprising:
      receiving streaming data;
      associating the streaming data with at least one cell of a spreadsheet;
      dynamically displaying the streaming data within the at least one cell; and
      in response to associating the streaming data with the at least one cell, retrieving one or more parameters for the streaming data, comprising:
         referencing one or more data values associated with the one or more parameters of the streaming data in at least one formula; and
         performing an operation when a threshold of the at least one formula is met by the one or more data values.

2. The system of claim 1, wherein the streaming data comprises one of:
   a live data feed;
   streaming audio; and
   streaming video.

3. The system of claim 1, further comprising:
   providing a user interface for associating the streaming data with the at least one cell.

4. The system of claim 3, wherein receiving the streaming data comprises receiving a uniform resource locator (URL) for the live data feed in the user interface.

5. The system of claim 1, wherein the operation comprises one of:
   displaying a notification when the threshold is met; and
   sending a message when the threshold is met.

6. The system of claim 1, further comprising:
   in response to the operation, relocating the at least one cell within the spreadsheet.

7. The system of claim 6, further comprising one of:
   moving the streaming data with the at least one relocated cell; and
   not moving the streaming data with the at least one relocated cell.

8. The system of claim 1, further comprising surfacing the one or more parameters in a user interface in response to at least one of:
   hovering over the streaming data;
   right-clicking the at least one cell; and
   launching the user interface.

9. The system of claim 1, wherein the operation comprises one of: a sort operation and a filter operation.

10. A method for associating streaming data with at least one cell of a spreadsheet, the method comprising:
    providing a user interface for associating streaming data with at least one cell of a spreadsheet;
    receiving streaming data, wherein the streaming data comprises a live data feed;
    associating the streaming data with the at least one cell; and
    dynamically displaying the streaming data within the at least one cell of the spreadsheet comprising:
       pausing the live data feed;
       continuing to receive the live data feed into a cache; and
       restarting the live data feed by streaming the live data feed from the cache.

11. The method of claim 10, wherein the live data feed comprises one of:
    streaming audio; and
    streaming video.

12. The method of claim 10, the user interface further comprising:
    a play control for playing the streaming data;
    a pause control for pausing the streaming data;
    a stop control for stopping the streaming data; and
    a rewind control for rewinding the streaming data.

13. The method of claim 10, further comprising:
    sending control instructions to a device transmitting the streaming data.

14. The method of claim 13, wherein the device comprises one of:

a wearable device;
a camera;
a mobile device;
a sensor; and
an appliance.

15. The method of claim 10, further comprising:
surfacing one or more parameters of the streaming data in a user interface.

16. The method of claim 15, further comprising surfacing the one or more parameters in the user interface in response to at least one of:
hovering over the streaming data;
right-clicking the at least one cell; and
launching the user interface.

17. A computer-readable storage medium storing computer executable instructions that, when executed by at least one processing unit, cause a computing device to:
receive streaming data for association with at least one cell of a spreadsheet;
associate the streaming data with the at least one cell;
dynamically display the streaming data within the at least one cell; and
in response to associating the streaming data with the at least one cell, surface one or more parameters of the streaming data in response to one of:
hovering over the streaming data;
right-clicking the at least one cell; and
launching the user interface.

18. The computer-readable storage medium of claim 17, the computer executable instructions further causing the computing device to:
create a compound data type including the streaming data and additional data, wherein the compound data type comprises a plurality of fields;
dereference at least one field of the plurality of fields; and
perform an action on the at least one field.

19. The computer-readable storage medium of claim 17, the computer executable instructions further causing the computing device to:
create a compound data type including the streaming data and additional data, wherein the compound data type comprises a plurality of fields; and
construct a formula to retrieve a value for at least one of the plurality of fields.

20. The computer-readable storage medium of claim 17, the computer executable instructions further causing the computing device to:
create a compound data type including the streaming data and additional data; and
dynamically display an increased portion of the additional data within the at least one cell as the at least one cell is enlarged.

* * * * *